(12) United States Patent
Morris

(10) Patent No.: US 11,089,353 B1
(45) Date of Patent: *Aug. 10, 2021

(54) HOT KEY SYSTEMS AND METHODS

(71) Applicant: AMERICAN INVENTOR TECH, LLC, Waco, TX (US)

(72) Inventor: Robert Paul Morris, Madison, GA (US)

(73) Assignee: AMERICAN INVENTOR TECH, LLC, Waco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/929,044

(22) Filed: Jul. 14, 2020

Related U.S. Application Data

(63) Continuation of application No. 16/357,206, filed on Mar. 18, 2019, now Pat. No. 10,750,230, which is a continuation of application No. 15/694,760, filed on Sep. 1, 2017, now Pat. No. 10,397,639, which is a continuation-in-part of application No. 14/835,662, (Continued)

(51) Int. Cl.
| | |
|---|---|
| *H04N 9/80* | (2006.01) |
| *H04N 21/431* | (2011.01) |
| *H04N 21/4143* | (2011.01) |
| *G06F 3/00* | (2006.01) |
| *H04N 21/485* | (2011.01) |
| *H04N 21/439* | (2011.01) |
| *G06F 3/0484* | (2013.01) |
| *G11B 27/00* | (2006.01) |

(Continued)

(52) U.S. Cl.
CPC ........... *H04N 21/4312* (2013.01); *G06F 3/00* (2013.01); *G06F 3/0482* (2013.01); *G06F 3/04842* (2013.01); *G06F 3/04847* (2013.01); *G11B 27/00* (2013.01); *H04N 21/4143* (2013.01); *H04N 21/4396* (2013.01); *H04N 21/4438* (2013.01); *H04N 21/4852* (2013.01); *H04N 21/4854* (2013.01)

(58) Field of Classification Search
USPC .......................................................... 725/25
See application file for complete search history.

(56) References Cited

U.S. PATENT DOCUMENTS

| | | |
|---|---|---|
| 1,672,613 A | 6/1928 | Howell |
| 4,839,853 A | 6/1989 | Deerwester et al. |
| (Continued) | | |

FOREIGN PATENT DOCUMENTS

| | | |
|---|---|---|
| AU | 2002239940 A1 | 7/2002 |
| DE | 4301160 A1 | 7/1994 |
| (Continued) | | |

OTHER PUBLICATIONS

New Internet Explorer 5.5 Technologies Designed to Support Richer Interactive Web Application (Jul. 12, 2000).

(Continued)

*Primary Examiner* — William C Vaughn, Jr.
*Assistant Examiner* — Naod W Bela
(74) *Attorney, Agent, or Firm* — Patrick E. Caldwell, Esq.; The Caldwell Firm, LLC

(57) ABSTRACT

Methods and systems are described. In one aspect, a control user interface including selectable representations identifying a plurality of operating media players is presented. A user selection identifying a selected portion of the plurality of operating media players is received. And, an indication is provided allowing a media player in the selected portion access to a presentation device.

20 Claims, 20 Drawing Sheets

Related U.S. Application Data filed on Aug. 25, 2015, now abandoned, which is a continuation-in-part of application No. 14/604,664, filed on Jan. 23, 2015, now abandoned, which is a continuation-in-part of application No. 12/696,854, filed on Jan. 29, 2010, now abandoned, which is a continuation-in-part of application No. 12/705,638, filed on Feb. 15, 2010, now abandoned.

(51) Int. Cl.
*H04N 21/443* (2011.01)
*G06F 3/0482* (2013.01)

(56) References Cited

U.S. PATENT DOCUMENTS

| | | |
|---|---|---|
| 5,029,013 A | 7/1991 | Hiratsuka et al. |
| 5,062,060 A | 10/1991 | Kolnick |
| 5,072,412 A | 12/1991 | Henderson et al. |
| 5,159,334 A | 10/1992 | Baumert et al. |
| 5,227,771 A | 7/1993 | Kerr et al. |
| 5,297,039 A | 3/1994 | Kanaegami et al. |
| 5,311,207 A | 5/1994 | Kusumoto et al. |
| 5,371,847 A | 12/1994 | Hargrove |
| 5,487,143 A | 1/1996 | Southgate |
| 5,491,795 A | 2/1996 | Beaudet et al. |
| 5,530,865 A | 6/1996 | Owens et al. |
| 5,540,597 A | 7/1996 | Budman et al. |
| 5,577,187 A | 11/1996 | Mariani |
| 5,642,518 A | 6/1997 | Kiyama et al. |
| 5,671,295 A | 9/1997 | Miyake |
| 5,696,962 A | 12/1997 | Kupiec |
| 5,699,535 A | 12/1997 | Amro |
| 5,712,995 A | 1/1998 | Cohn |
| 5,721,829 A | 2/1998 | Dunn et al. |
| 5,737,560 A | 4/1998 | Yohanan |
| 5,742,285 A | 4/1998 | Ueda |
| 5,745,115 A | 4/1998 | Purple et al. |
| 5,757,371 A | 5/1998 | Oran et al. |
| 5,771,042 A | 6/1998 | Santos-Gomez |
| 5,778,256 A | 7/1998 | Darbee |
| 5,794,233 A | 8/1998 | Rubinstein |
| 5,805,167 A | 9/1998 | Cruyningen |
| 5,819,055 A | 10/1998 | MacLean et al. |
| 5,819,261 A | 10/1998 | Takahashi et al. |
| 5,838,318 A | 11/1998 | Porter et al. |
| 5,877,765 A | 3/1999 | Dickman et al. |
| 5,877,767 A | 3/1999 | Yohanan |
| 5,880,732 A | 3/1999 | Tryding |
| 5,895,465 A | 4/1999 | Guha |
| 5,910,802 A | 6/1999 | Shields et al. |
| 5,913,215 A | 6/1999 | Rubinstein et al. |
| 5,917,491 A | 6/1999 | Bauersfeld |
| 5,918,237 A | 6/1999 | Montalbano |
| 5,929,854 A | 7/1999 | Ross |
| 5,950,214 A | 9/1999 | Rivette et al. |
| 5,974,409 A | 10/1999 | Sanu et al. |
| 5,978,817 A | 11/1999 | Giannandrea et al. |
| 5,991,751 A | 11/1999 | Rivette et al. |
| 5,991,780 A | 11/1999 | Rivette et al. |
| 5,995,103 A | 11/1999 | Ashe |
| 5,999,907 A | 12/1999 | Donner |
| 6,008,809 A | 12/1999 | Brooks |
| 6,012,093 A | 1/2000 | Maddalozzo et al. |
| 6,014,663 A | 1/2000 | Rivette et al. |
| 6,018,714 A | 1/2000 | Risen et al. |
| 6,018,749 A | 1/2000 | Rivette et al. |
| 6,020,863 A | 2/2000 | Taylor |
| 6,025,841 A | 2/2000 | Finkelstein et al. |
| 6,025,842 A | 2/2000 | Filetto et al. |
| 6,028,602 A | 2/2000 | Weidenfeller et al. |
| 6,028,604 A | 2/2000 | Matthews et al. |
| 6,037,934 A | 3/2000 | Himmel et al. |
| 6,037,981 A | 3/2000 | Wilson et al. |
| 6,041,360 A | 3/2000 | Himmel et al. |
| 6,072,486 A | 6/2000 | Sheldon et al. |
| 6,072,491 A | 6/2000 | Yohanan |
| 6,081,829 A | 6/2000 | Sidana |
| 6,091,956 A | 7/2000 | Hollenberg |
| 6,100,890 A | 8/2000 | Bates et al. |
| 6,108,003 A | 8/2000 | Hall, Jr. et al. |
| 6,108,651 A | 8/2000 | Guha |
| 6,111,576 A | 8/2000 | Moreland et al. |
| 6,154,725 A | 11/2000 | Donner |
| 6,166,736 A | 12/2000 | Hugh |
| 6,173,251 B1 | 1/2001 | Ito et al. |
| 6,189,024 B1 | 2/2001 | Bauersfeld et al. |
| 6,212,541 B1 | 4/2001 | McAuliffe et al. |
| 6,230,171 B1 | 5/2001 | Pacifici et al. |
| 6,232,971 B1 | 5/2001 | Haynes |
| 6,239,798 B1 | 5/2001 | Ludolph et al. |
| 6,243,091 B1 | 6/2001 | Berstis |
| 6,252,597 B1 | 6/2001 | Lokuge |
| 6,263,314 B1 | 7/2001 | Donner |
| 6,266,059 B1 | 7/2001 | Matthews et al. |
| 6,275,862 B1 | 8/2001 | Sharma et al. |
| 6,310,631 B1 | 10/2001 | Cecco et al. |
| 6,314,423 B1 | 11/2001 | Himmel et al. |
| 6,339,767 B1 | 1/2002 | Rivette et al. |
| 6,353,827 B1 | 3/2002 | Davies et al. |
| 6,363,204 B1 | 3/2002 | Johnson et al. |
| 6,377,996 B1 | 4/2002 | Lumelsky et al. |
| 6,381,651 B1 | 4/2002 | Nishio et al. |
| 6,389,434 B1 | 5/2002 | Rivette et al. |
| 6,434,580 B1 | 8/2002 | Takano et al. |
| 6,437,527 B1 | 8/2002 | Rhodes et al. |
| 6,460,058 B2 | 10/2002 | Koppolu et al. |
| 6,473,752 B1 | 10/2002 | Fleming |
| 6,478,001 B1 | 11/2002 | Burns et al. |
| 6,493,702 B1 | 12/2002 | Adar et al. |
| 6,546,393 B1 | 4/2003 | Khan |
| 6,564,380 B1 | 5/2003 | Murphy |
| 6,571,241 B1 | 5/2003 | Nosohara |
| 6,571,295 B1 | 5/2003 | Sidana |
| 6,578,078 B1 | 6/2003 | Smith et al. |
| 6,601,173 B1 | 7/2003 | Mohler |
| 6,630,943 B1 | 10/2003 | Nason et al. |
| 6,661,436 B2 | 12/2003 | Barksdale et al. |
| 6,664,983 B2 | 12/2003 | Ludolph |
| 6,667,751 B1 | 12/2003 | Wynn et al. |
| 6,694,331 B2 | 2/2004 | Lee |
| 6,697,838 B1 | 2/2004 | Jakobson |
| 6,724,403 B1 | 4/2004 | Santoro et al. |
| 6,754,702 B1 | 6/2004 | Kennelly et al. |
| 6,781,611 B1 | 8/2004 | Richard |
| 6,788,315 B1 | 9/2004 | Kekic et al. |
| 6,798,358 B2 | 9/2004 | Joyce et al. |
| 6,883,170 B1 | 4/2005 | Garcia |
| 6,915,492 B2 | 7/2005 | Kurtenbach et al. |
| 6,957,395 B1 | 10/2005 | Jobs et al. |
| 6,961,731 B2 | 11/2005 | Holbrook |
| 6,973,456 B1 | 12/2005 | Elgart |
| 6,973,616 B1 | 12/2005 | Cottrille et al. |
| 6,993,722 B1 | 1/2006 | Greer et al. |
| 7,006,055 B2 | 2/2006 | Sukthankar et al. |
| 7,010,515 B2 | 3/2006 | Nakano |
| 7,010,755 B2 | 3/2006 | Anderson et al. |
| 7,028,253 B1 | 4/2006 | Lieberman et al. |
| 7,028,264 B2 | 4/2006 | Santoro et al. |
| 7,080,088 B1 | 7/2006 | Lau |
| 7,096,271 B1 | 8/2006 | Omoigui et al. |
| 7,114,129 B2 | 9/2006 | Awada et al. |
| 7,117,443 B1 | 10/2006 | Zilka et al. |
| 7,134,094 B2 | 11/2006 | Stabb et al. |
| 7,141,115 B2 | 11/2006 | Bedell et al. |
| 7,194,691 B1 | 3/2007 | Zilka et al. |
| 7,237,198 B1 | 6/2007 | Chaney |
| 7,254,784 B2 | 8/2007 | Chang |
| 7,305,625 B1 | 12/2007 | Zilka et al. |
| 7,346,850 B2 | 3/2008 | Swartz et al. |
| 7,346,855 B2 | 3/2008 | Hellyar et al. |
| 7,370,284 B2 | 5/2008 | Andrea et al. |
| 7,373,592 B2 | 5/2008 | Allyn |
| 7,386,784 B2 | 6/2008 | Capps et al. |

(56) References Cited

U.S. PATENT DOCUMENTS

| | | |
|---|---|---|
| 7,412,661 B2 | 8/2008 | Sellers et al. |
| 7,426,697 B2 | 9/2008 | Holecek et al. |
| 7,437,678 B2 | 10/2008 | Awada et al. |
| 7,454,511 B2 | 11/2008 | Weast |
| 7,478,326 B2 | 1/2009 | Holecek et al. |
| 7,478,339 B2 | 1/2009 | Pettiross et al. |
| 7,480,872 B1 | 1/2009 | Ubillos |
| 7,496,277 B2 | 2/2009 | Ackley et al. |
| 7,512,880 B2 | 3/2009 | Morris |
| 7,516,188 B2 | 4/2009 | Morris |
| 7,546,602 B2 | 6/2009 | Hejlsberg et al. |
| 7,552,397 B2 | 6/2009 | Holecek et al. |
| 7,581,192 B2 | 8/2009 | Stabb et al. |
| 7,595,810 B2 | 9/2009 | Louch |
| 7,617,510 B2 | 11/2009 | Zigmond et al. |
| 7,627,425 B2 | 12/2009 | Salmre et al. |
| 7,646,312 B2 | 1/2010 | Rosen |
| 7,661,069 B2 | 2/2010 | Lindsay et al. |
| 7,665,031 B2 | 2/2010 | Matthews et al. |
| 7,665,033 B2 | 2/2010 | Byrne et al. |
| 7,665,115 B2 | 2/2010 | Gallo et al. |
| 7,673,255 B2 | 3/2010 | Schechter et al. |
| 7,689,929 B2 | 3/2010 | Ruthfield et al. |
| 7,705,833 B2 | 4/2010 | Kim |
| 7,711,570 B2 | 5/2010 | Galanes et al. |
| 7,730,427 B2 | 6/2010 | Peters |
| 7,735,018 B2 | 6/2010 | Bakhash |
| 7,739,617 B2 | 6/2010 | Ording et al. |
| 7,769,794 B2 | 8/2010 | Moore et al. |
| 7,773,075 B2 | 8/2010 | Otsuka et al. |
| 7,783,990 B2 | 8/2010 | Amadio et al. |
| 7,796,190 B2 | 9/2010 | Basso et al. |
| 7,818,677 B2 | 10/2010 | Ruthfield et al. |
| 7,818,691 B2 | 10/2010 | Irvine |
| 7,839,419 B2 | 11/2010 | Hanggie et al. |
| 7,844,917 B2 | 11/2010 | Rigolet |
| 7,881,315 B2 | 2/2011 | Haveson et al. |
| 7,882,448 B2 | 2/2011 | Haug |
| 7,899,915 B2 | 3/2011 | Reisman |
| 7,920,932 B2 | 4/2011 | Igoe |
| 7,933,632 B2 | 4/2011 | Flynt et al. |
| 8,005,236 B2 | 8/2011 | Igoe |
| 8,010,900 B2 | 8/2011 | Hart et al. |
| 8,019,883 B1 | 9/2011 | Margulis |
| 8,056,016 B2 | 11/2011 | Kim et al. |
| 8,059,137 B2 | 11/2011 | Hanggie et al. |
| 8,060,631 B2 | 11/2011 | Collart et al. |
| 8,060,837 B2 | 11/2011 | Kano et al. |
| 8,117,225 B1 | 2/2012 | Zilka |
| 8,132,217 B2 | 3/2012 | Miyata |
| 8,146,132 B2 | 3/2012 | Igoe |
| 8,166,411 B2 | 4/2012 | Zhang |
| 8,171,429 B2 | 5/2012 | Bollman et al. |
| 8,191,003 B2 | 5/2012 | Brown et al. |
| 8,204,649 B2 | 6/2012 | Zhou et al. |
| D665,405 S | 8/2012 | Williams et al. |
| 8,249,627 B2 | 8/2012 | Olincy et al. |
| 8,266,541 B2 | 9/2012 | Ishibashi |
| 8,291,324 B2 | 10/2012 | Battat et al. |
| 8,302,026 B2 | 10/2012 | Wang et al. |
| 8,307,388 B2 | 11/2012 | Igoe et al. |
| 8,315,617 B2 | 11/2012 | Tadayon et al. |
| 8,320,026 B2 | 11/2012 | Tanaka |
| 8,321,038 B2 | 11/2012 | Igoe et al. |
| 8,326,486 B2 | 12/2012 | Moinzadeh et al. |
| 8,335,502 B2 | 12/2012 | Oesterling et al. |
| 8,340,730 B2 | 12/2012 | Pallotta |
| 8,341,541 B2 | 12/2012 | Holecek et al. |
| 8,355,751 B2 | 1/2013 | Dietz et al. |
| 8,356,258 B2 | 1/2013 | Matthews et al. |
| 8,379,058 B2 | 2/2013 | Kraut |
| 8,380,176 B2 | 2/2013 | Adler et al. |
| 8,380,864 B2 | 2/2013 | Bowra et al. |
| 8,381,127 B2 | 2/2013 | Singh et al. |
| 8,385,982 B2 | 2/2013 | Blanda et al. |
| 8,422,858 B2 | 4/2013 | Morris |
| 8,457,692 B2 | 6/2013 | Fyke et al. |
| 8,464,177 B2 | 6/2013 | Ben-Yoseph et al. |
| 8,468,227 B2 | 6/2013 | Vasudevan et al. |
| 8,479,117 B2 | 7/2013 | Starr |
| 8,490,019 B2 | 7/2013 | Jarrett et al. |
| 8,504,937 B2 | 8/2013 | Jobs et al. |
| 8,510,682 B2 | 8/2013 | Kusterer et al. |
| 8,527,013 B2 | 9/2013 | Guba et al. |
| 8,549,429 B2 | 10/2013 | Tsuruta et al. |
| 8,555,163 B2 | 10/2013 | Sood et al. |
| 8,555,185 B2 | 10/2013 | Louch et al. |
| 8,560,959 B2 | 10/2013 | Zaman et al. |
| 8,560,960 B2 | 10/2013 | Goossens et al. |
| 8,572,257 B2 | 10/2013 | Dua |
| 8,589,823 B2 | 11/2013 | Lemay et al. |
| 8,600,446 B2 | 12/2013 | Chiang et al. |
| 8,619,038 B2 | 12/2013 | Chaudhri et al. |
| 8,627,217 B2 | 1/2014 | Takatoshi |
| 8,633,900 B2 | 1/2014 | Jin et al. |
| 8,635,649 B2 | 1/2014 | Ward et al. |
| 8,661,361 B2 | 2/2014 | Morris |
| 8,667,415 B2 | 3/2014 | Rudolph et al. |
| 8,687,023 B2 | 4/2014 | Markiewicz et al. |
| 8,706,349 B2 | 4/2014 | Rector et al. |
| 8,769,428 B2 | 7/2014 | Mir et al. |
| 8,780,130 B2 | 7/2014 | Morris |
| 8,781,299 B2 | 7/2014 | Morris |
| 8,781,491 B2 | 7/2014 | Wright et al. |
| 8,787,731 B2 | 7/2014 | Morris |
| 8,799,495 B2 | 8/2014 | Wohlert et al. |
| 8,799,496 B2 | 8/2014 | Phillips et al. |
| 8,819,571 B2 | 8/2014 | Robert et al. |
| 8,830,270 B2 | 9/2014 | Zaman et al. |
| 8,850,052 B2 | 9/2014 | Rosenblatt et al. |
| 8,850,351 B2 | 9/2014 | Beharie et al. |
| 8,850,354 B1 | 9/2014 | Titov et al. |
| 8,869,027 B2 | 10/2014 | Louch et al. |
| 8,874,491 B2 | 10/2014 | Honkala |
| 8,893,033 B2 | 11/2014 | Donahue et al. |
| 8,922,575 B2 | 12/2014 | Garside et al. |
| 8,935,631 B2 | 1/2015 | Leonard et al. |
| 8,952,800 B2 | 2/2015 | Bentz et al. |
| 8,954,871 B2 | 2/2015 | Louch et al. |
| 8,972,860 B2 | 3/2015 | Corbett et al. |
| 8,983,264 B2 | 3/2015 | Morris |
| 8,990,733 B2 | 3/2015 | Deutsch et al. |
| 8,992,323 B2 | 3/2015 | Kelly et al. |
| 9,021,365 B2 | 4/2015 | Hicks et al. |
| 9,032,318 B2 | 5/2015 | Louch et al. |
| 9,043,712 B2 | 5/2015 | Santoro et al. |
| 9,066,199 B2 | 6/2015 | Forstall et al. |
| 9,086,785 B2 | 7/2015 | Chaudhri et al. |
| 9,104,294 B2 | 8/2015 | Forstall et al. |
| 9,141,262 B2 | 9/2015 | Nan et al. |
| 9,152,299 B2 | 10/2015 | McCann et al. |
| 9,195,321 B2 | 11/2015 | Laubach |
| 9,294,526 B2 | 3/2016 | George et al. |
| 9,342,208 B2 | 5/2016 | Howes et al. |
| 9,344,554 B2 | 5/2016 | Kim et al. |
| 9,423,923 B1 | 8/2016 | Morris |
| 9,423,938 B1 | 8/2016 | Morris |
| 9,423,954 B2 | 8/2016 | Morris |
| 9,471,217 B2 | 10/2016 | Shin et al. |
| 9,529,517 B2 | 12/2016 | Jitkoff et al. |
| 9,684,428 B2 | 6/2017 | Wu |
| 9,715,332 B1 | 7/2017 | Morris |
| 9,785,341 B2 | 10/2017 | Stallings et al. |
| 9,823,838 B2 | 11/2017 | Morris |
| 9,841,878 B1 | 12/2017 | Morris |
| 9,870,145 B2 | 1/2018 | Morris |
| 2001/0047404 A1 | 11/2001 | Suda |
| 2002/0007373 A1 | 1/2002 | Blair et al. |
| 2002/0019837 A1 | 2/2002 | Balnaves |
| 2002/0032659 A1 | 3/2002 | Waters |
| 2002/0035499 A1 | 3/2002 | Germeraad et al. |
| 2002/0042841 A1 | 4/2002 | Nishio et al. |
| 2002/0059076 A1 | 5/2002 | Grainger et al. |
| 2002/0070963 A1 | 6/2002 | Odero et al. |

(56) References Cited

U.S. PATENT DOCUMENTS

| | | |
|---|---|---|
| 2002/0077835 A1 | 6/2002 | Hagelin |
| 2002/0082778 A1 | 6/2002 | Barnett et al. |
| 2002/0091762 A1 | 7/2002 | Sohn et al. |
| 2002/0093528 A1 | 7/2002 | Grainger |
| 2002/0111953 A1 | 8/2002 | Snyder |
| 2002/0147742 A1 | 10/2002 | Schroeder |
| 2002/0169743 A1 | 11/2002 | Arnold et al. |
| 2002/0184095 A1 | 12/2002 | Scullard et al. |
| 2002/0191028 A1 | 12/2002 | Senechalle et al. |
| 2002/0196272 A1 | 12/2002 | Ramos et al. |
| 2003/0003892 A1 | 1/2003 | Makinen |
| 2003/0016241 A1 | 1/2003 | Burke |
| 2003/0018609 A1 | 1/2003 | Phillips et al. |
| 2003/0025676 A1 | 2/2003 | Cappendijk |
| 2003/0033295 A1 | 2/2003 | Adler et al. |
| 2003/0036945 A1 | 2/2003 | Vecchio et al. |
| 2003/0046307 A1 | 3/2003 | Rivette et al. |
| 2003/0046557 A1 | 3/2003 | Miller et al. |
| 2003/0076352 A1 | 4/2003 | Uhlig et al. |
| 2003/0096593 A1 | 5/2003 | Naboulsi |
| 2003/0135820 A1 | 7/2003 | Aasman |
| 2003/0172020 A1 | 9/2003 | Davies et al. |
| 2004/0017379 A1 | 1/2004 | Ajito et al. |
| 2004/0066414 A1 | 4/2004 | Czerwinski et al. |
| 2004/0078382 A1 | 4/2004 | Mercer et al. |
| 2004/0085328 A1 | 5/2004 | Maruyama et al. |
| 2004/0085367 A1 | 5/2004 | Hagarty |
| 2004/0181427 A1 | 9/2004 | Stobbs et al. |
| 2004/0193697 A1 | 9/2004 | Grosvenor et al. |
| 2004/0205537 A1 | 10/2004 | Graham et al. |
| 2004/0243938 A1 | 12/2004 | Weise et al. |
| 2004/0255029 A1 | 12/2004 | Manion et al. |
| 2005/0010876 A1 | 1/2005 | Robertson et al. |
| 2005/0010932 A1 | 1/2005 | Kohno et al. |
| 2005/0022135 A1 | 1/2005 | Waal |
| 2005/0059076 A1 | 3/2005 | Merkulov et al. |
| 2005/0081155 A1 | 4/2005 | Martin et al. |
| 2005/0166136 A1 | 7/2005 | Capps et al. |
| 2005/0192025 A1 | 9/2005 | Kaplan |
| 2005/0193330 A1 | 9/2005 | Peters |
| 2005/0195173 A1 | 9/2005 | McKay |
| 2005/0198584 A1 | 9/2005 | Matthews et al. |
| 2005/0202852 A1 | 9/2005 | Wada |
| 2005/0210416 A1 | 9/2005 | MacLaurin et al. |
| 2005/0240873 A1 | 10/2005 | Czerwinski et al. |
| 2005/0250458 A1 | 11/2005 | Graham et al. |
| 2005/0262254 A1 | 11/2005 | Sherwani |
| 2005/0268279 A1 | 12/2005 | Paulsen et al. |
| 2005/0286546 A1 | 12/2005 | Bassoli et al. |
| 2006/0002681 A1 | 1/2006 | Spilo et al. |
| 2006/0010395 A1 | 1/2006 | Aaltonen |
| 2006/0015246 A1 | 1/2006 | Hui |
| 2006/0033840 A1 | 2/2006 | Diehl et al. |
| 2006/0074550 A1 | 4/2006 | Freer et al. |
| 2006/0079214 A1 | 4/2006 | Mertama et al. |
| 2006/0085753 A1 | 4/2006 | Vance et al. |
| 2006/0110136 A1 | 5/2006 | Abecassis |
| 2006/0168528 A1 | 7/2006 | Gruen |
| 2006/0203758 A1 | 9/2006 | Tee et al. |
| 2006/0212795 A1 | 9/2006 | Cottrille et al. |
| 2006/0224992 A1 | 10/2006 | Rossi et al. |
| 2006/0236255 A1 | 10/2006 | Lindsay et al. |
| 2006/0248404 A1 | 11/2006 | Lindsay et al. |
| 2006/0248471 A1 | 11/2006 | Lindsay et al. |
| 2006/0271853 A1 | 11/2006 | Marcos et al. |
| 2006/0294130 A1 | 12/2006 | Soo et al. |
| 2006/0294470 A1 | 12/2006 | Marcos et al. |
| 2007/0005783 A1 | 1/2007 | Saint-Hillaire et al. |
| 2007/0021117 A1 | 1/2007 | McKenna et al. |
| 2007/0075131 A1 | 4/2007 | Alberth et al. |
| 2007/0086431 A1 | 4/2007 | Abu-Amara |
| 2007/0136778 A1 | 6/2007 | Birger et al. |
| 2007/0186180 A1 | 8/2007 | Morgan |
| 2007/0192726 A1 | 8/2007 | Kim et al. |
| 2007/0234221 A1 | 10/2007 | Ishibashi |
| 2007/0250788 A1 | 10/2007 | Rigolet |
| 2007/0265745 A1 | 11/2007 | Styles et al. |
| 2007/0271525 A1 | 11/2007 | Han et al. |
| 2007/0288715 A1 | 12/2007 | Boswell et al. |
| 2008/0005692 A1 | 1/2008 | Hoblit |
| 2008/0008439 A1 | 1/2008 | Liu et al. |
| 2008/0034317 A1 | 2/2008 | Fard et al. |
| 2008/0053233 A1 | 3/2008 | Sugiura |
| 2008/0070588 A1 | 3/2008 | Morin |
| 2008/0082784 A1 | 4/2008 | Mejdrich et al. |
| 2008/0109753 A1 | 5/2008 | Karstens |
| 2008/0109867 A1 | 5/2008 | Panabaker et al. |
| 2008/0115073 A1 | 5/2008 | Erickson et al. |
| 2008/0115081 A1 | 5/2008 | Sankaravadivelu et al. |
| 2008/0129528 A1 | 6/2008 | Guthrie |
| 2008/0148149 A1 | 6/2008 | Singh et al. |
| 2008/0155437 A1 | 6/2008 | Morris |
| 2008/0158189 A1 | 7/2008 | Kim |
| 2008/0163104 A1 | 7/2008 | Haug |
| 2008/0186282 A1 | 8/2008 | Nix et al. |
| 2008/0201751 A1 | 8/2008 | Ahmed et al. |
| 2008/0231546 A1 | 9/2008 | Li |
| 2008/0234488 A1 | 9/2008 | Ito et al. |
| 2008/0235580 A1 | 9/2008 | Gonze et al. |
| 2008/0235588 A1 | 9/2008 | Gonze et al. |
| 2008/0250319 A1 | 10/2008 | Lee et al. |
| 2008/0297483 A1 | 12/2008 | Kim et al. |
| 2009/0005983 A1 | 1/2009 | Mardell |
| 2009/0013282 A1 | 1/2009 | Mercer |
| 2009/0031243 A1 | 1/2009 | Kano et al. |
| 2009/0031247 A1 | 1/2009 | Walter et al. |
| 2009/0044138 A1 | 2/2009 | Rudolph et al. |
| 2009/0046545 A1 | 2/2009 | Blinnikka |
| 2009/0063178 A1 | 3/2009 | Pousti et al. |
| 2009/0070339 A1 | 3/2009 | Cho et al. |
| 2009/0094317 A1 | 4/2009 | Venkitaraman |
| 2009/0102744 A1 | 4/2009 | Ram |
| 2009/0106104 A1 | 4/2009 | Upendran et al. |
| 2009/0106357 A1 | 4/2009 | Igelman et al. |
| 2009/0138819 A1 | 5/2009 | Yu |
| 2009/0144661 A1 | 6/2009 | Nakajima et al. |
| 2009/0164641 A1 | 6/2009 | Rogers et al. |
| 2009/0164936 A1 | 6/2009 | Kawaguchi |
| 2009/0177966 A1 | 7/2009 | Chaudhri |
| 2009/0182889 A1 | 7/2009 | Hurst et al. |
| 2009/0188288 A1 | 7/2009 | Soma |
| 2009/0193351 A1 | 7/2009 | Lee et al. |
| 2009/0193358 A1 | 7/2009 | Mernyk et al. |
| 2009/0199128 A1 | 8/2009 | Matthews et al. |
| 2009/0219441 A1 | 9/2009 | Kurita |
| 2009/0228157 A1 | 9/2009 | Breed |
| 2009/0228824 A1 | 9/2009 | Forstall et al. |
| 2009/0228897 A1 | 9/2009 | Murray et al. |
| 2009/0249222 A1 | 10/2009 | Schmidt et al. |
| 2009/0249235 A1 | 10/2009 | Kim et al. |
| 2009/0254610 A1 | 10/2009 | Arthursson |
| 2009/0259711 A1 | 10/2009 | Drieu et al. |
| 2009/0295788 A1 | 12/2009 | Duncan et al. |
| 2009/0295905 A1 | 12/2009 | Civanlar et al. |
| 2009/0300552 A1 | 12/2009 | Bollman et al. |
| 2009/0303242 A1 | 12/2009 | Kraut |
| 2010/0011285 A1 | 1/2010 | Kawata et al. |
| 2010/0037154 A1 | 2/2010 | Marcos et al. |
| 2010/0066698 A1 | 3/2010 | Seo |
| 2010/0077346 A1 | 3/2010 | Kawashima et al. |
| 2010/0077347 A1 | 3/2010 | Kirtane et al. |
| 2010/0081385 A1 | 4/2010 | Lin et al. |
| 2010/0081475 A1 | 4/2010 | Chiang et al. |
| 2010/0082784 A1 | 4/2010 | Rosenblatt et al. |
| 2010/0088635 A1 | 4/2010 | Louch |
| 2010/0097357 A1 | 4/2010 | Lin |
| 2010/0138780 A1 | 6/2010 | Marano et al. |
| 2010/0148920 A1 | 6/2010 | Philmon et al. |
| 2010/0161813 A1 | 6/2010 | Avasarala |
| 2010/0169813 A1 | 7/2010 | Chang |
| 2010/0169814 A1 | 7/2010 | Zhang |
| 2010/0229090 A1 | 9/2010 | Newton et al. |
| 2010/0241989 A1 | 9/2010 | Wen |
| 2010/0248788 A1 | 9/2010 | Yook et al. |

(56) References Cited

U.S. PATENT DOCUMENTS

| | | |
|---|---|---|
| 2010/0257090 A1 | 10/2010 | West |
| 2010/0262931 A1 | 10/2010 | Woods et al. |
| 2010/0267332 A1 | 10/2010 | Lui |
| 2010/0269039 A1 | 10/2010 | Pahlavan et al. |
| 2010/0281372 A1 | 11/2010 | Lyons et al. |
| 2010/0297930 A1 | 11/2010 | Harris |
| 2010/0299597 A1 | 11/2010 | Shin et al. |
| 2010/0302172 A1 | 12/2010 | Wilairat |
| 2010/0306657 A1 | 12/2010 | Derbyshire et al. |
| 2010/0313225 A1 | 12/2010 | Cholas et al. |
| 2011/0012930 A1 | 1/2011 | Davis et al. |
| 2011/0029915 A1 | 2/2011 | Harris |
| 2011/0074794 A1 | 3/2011 | Felt et al. |
| 2011/0078733 A1 | 3/2011 | Lee |
| 2011/0113363 A1 | 5/2011 | Hunt et al. |
| 2011/0138313 A1 | 6/2011 | Decker et al. |
| 2011/0143769 A1 | 6/2011 | Jones et al. |
| 2011/0161485 A1 | 6/2011 | George et al. |
| 2011/0161868 A1 | 6/2011 | Green et al. |
| 2011/0173556 A1 | 7/2011 | Czerwinski et al. |
| 2011/0208336 A1 | 8/2011 | Cooper et al. |
| 2011/0219330 A3 | 9/2011 | Ando et al. |
| 2011/0231878 A1 | 9/2011 | Hunter et al. |
| 2011/0246904 A1 | 10/2011 | Pinto et al. |
| 2011/0252356 A1 | 10/2011 | Morris |
| 2011/0302528 A1 | 12/2011 | Starr |
| 2012/0011437 A1 | 1/2012 | James et al. |
| 2012/0023453 A1 | 1/2012 | Wagner |
| 2012/0032783 A1 | 2/2012 | Ahn et al. |
| 2012/0036443 A1 | 2/2012 | Ohmori et al. |
| 2012/0042275 A1 | 2/2012 | Neerudu et al. |
| 2012/0072867 A1 | 3/2012 | Schlegel |
| 2012/0081302 A1 | 4/2012 | Gimpl et al. |
| 2012/0084711 A1 | 4/2012 | Duarte et al. |
| 2012/0084713 A1 | 4/2012 | Desai et al. |
| 2012/0096397 A1 | 4/2012 | Ording et al. |
| 2012/0154424 A1 | 6/2012 | Klotzer |
| 2012/0167011 A1 | 6/2012 | Zaman et al. |
| 2012/0226817 A1 | 9/2012 | Woxblom et al. |
| 2012/0304114 A1 | 11/2012 | Wong et al. |
| 2013/0047117 A1 | 2/2013 | Deutsch et al. |
| 2013/0063442 A1 | 3/2013 | Zaman et al. |
| 2013/0063490 A1 | 3/2013 | Zaman et al. |
| 2013/0159857 A1 | 6/2013 | Zaloshnja |
| 2013/0198692 A1 | 8/2013 | Lin |
| 2013/0326401 A1 | 12/2013 | Os |
| 2013/0346564 A1 | 12/2013 | Warrick et al. |
| 2014/0136979 A1 | 5/2014 | Morotomi |
| 2014/0229891 A1 | 8/2014 | O'Byrne et al. |
| 2014/0245142 A1 | 8/2014 | Dresti et al. |
| 2015/0020101 A1 | 1/2015 | Brown et al. |
| 2015/0040057 A1 | 2/2015 | Smuga et al. |
| 2015/0128059 A1 | 5/2015 | Bakhash |
| 2015/0227283 A1 | 8/2015 | Luna et al. |
| 2015/0331571 A1 | 11/2015 | Chaudhri |
| 2015/0378518 A1 | 12/2015 | Heydlauf |
| 2016/0110076 A1 | 4/2016 | Reeves et al. |

FOREIGN PATENT DOCUMENTS

| | | |
|---|---|---|
| DE | 102009018682 A1 | 10/2010 |
| EP | 1030247 A2 | 8/2000 |
| EP | 1213874 A2 | 6/2002 |
| EP | 1672613 A2 | 6/2006 |
| EP | 1437571 B1 | 6/2012 |
| GB | 2339374 B | 10/2002 |
| JP | 2001224067 A | 8/2001 |
| JP | 2002366797 A | 12/2002 |
| JP | 2003054323 A | 2/2003 |
| JP | 3489237 B2 | 1/2004 |
| JP | 2004276782 A | 10/2004 |
| JP | 2004333319 A | 11/2004 |
| KR | 101592033 B1 | 2/2016 |
| WO | 1997017662 A1 | 5/1997 |
| WO | 1998055945 A1 | 12/1998 |
| WO | 1999010799 A1 | 3/1999 |
| WO | 2000011575 A1 | 3/2000 |
| WO | 2000057281 A1 | 9/2000 |
| WO | 2000060496 A2 | 10/2000 |
| WO | 2000075851 A1 | 12/2000 |
| WO | 2000060495 A8 | 2/2001 |
| WO | 2001073657 A1 | 10/2001 |
| WO | 2001084423 A2 | 11/2001 |
| WO | 2001084424 A2 | 11/2001 |
| WO | 2001084425 A2 | 11/2001 |
| WO | 2001084426 A2 | 11/2001 |
| WO | 2000052618 A9 | 1/2002 |
| WO | 2002005150 A2 | 1/2002 |
| WO | 2002015076 A1 | 2/2002 |
| WO | 2001035277 A9 | 5/2002 |
| WO | 2002059147 A2 | 8/2002 |
| WO | 2001054031 A3 | 10/2002 |
| WO | 2002086744 A1 | 10/2002 |
| WO | 2003044718 A2 | 5/2003 |
| WO | 2004022388 A1 | 3/2004 |
| WO | 2004098164 A2 | 11/2004 |
| WO | 2005109369 A1 | 11/2005 |
| WO | 2008136528 A1 | 11/2008 |
| WO | 2007070505 A3 | 12/2008 |
| WO | 2009014703 A1 | 1/2009 |
| WO | 2009011690 A3 | 4/2009 |
| WO | 2009112271 A1 | 9/2009 |
| WO | 2009143076 A2 | 11/2009 |
| WO | 2010035162 A3 | 5/2010 |
| WO | 2010129939 A1 | 11/2010 |
| WO | 2013184555 A1 | 12/2013 |

OTHER PUBLICATIONS

Notice of Allowance in U.S. Appl. No. 14/173,806 dated Jun. 21, 2017.
Notice of Allowance in U.S. Appl. No. 14/924,677 dated Jun. 13, 2016.
Notice of Allowance in U.S. Appl. No. 14/924,680 dated Jun. 20, 2016.
Notice of Allowance in U.S. Appl. No. 14/924,706 dated May 11, 2016.
Nurgo Software, "AquaSnap," available at https://web.archive.org/web/2010033008381 O/http://www.nurgo-software.com/products/aquasnap (posted on Mar. 30, 2010)hompage to "Winsplit Revolution," available at https://web.archive.org/web/20091001024135/http://www.winsplit-revolution.com/(posted on Oct. 1, 2009).
Office Action Summary from U.S. Appl. No. 14/924,677 dated Feb. 3, 2016.
Office Action Summary from U.S. Appl. No. 14/924,709 dated Feb. 22, 2017.
Office Action Summary in U.S. Appl. No. 12/956,008 dated Mar. 27, 2014.
Office Action Summary in U.S. Appl. No. 12/956,008 dated Jul. 31, 2013.
Office Action Summary in U.S. Appl. No. 12/819,215 dated Feb. 26, 2014.
Office Action Summary in U.S. Appl. No. 12/819,215 dated Mar. 2, 2015.
Office Action Summary in U.S. Appl. No. 12/819,215 dated Mar. 28, 2013.
Office Action Summary in U.S. Appl. No. 14/331,096 dated Jan. 15, 2016.
Office Action Summary in U.S. Appl. No. 14/924,677 dated Feb. 3, 2016.
Office Action Summary in U.S. Appl. No. 14/924,706 dated Jan. 20, 2016.
Office Action Summary in U.S. Appl. No. 15/934,909 dated Jun. 5, 2018.
Office Action Summary in U.S. Appl. No. 15/594,648 dated Jul. 14, 2017.
Office Action Summary in U.S. Appl. No. 15/594,649 dated Jul. 18, 2017.
Office Action Summary in U.S. Appl. No. 15/594,650 dated Jul. 10, 2017.

(56) References Cited

OTHER PUBLICATIONS

Office Action Summary in U.S. Appl. No. 12/696,854 dated Feb. 6, 2013.
Office Action Summary in U.S. Appl. No. 12/696,854 dated Aug. 12, 2014.
Office Action Summary in U.S. Appl No. 12/696,854 dated Sep. 13, 2012.
Office Action Summary in U.S. Appl. No. 13/790,082 dated Jan. 17, 2014.
Office Action Summary in U.S. Appl. No. 14/089,706 dated Jan. 27, 2014.
Office Action Summary in U.S. Appl. No. 14/604,664 dated May 12, 2017.
Office Action Summary in U.S. Appl. No. 14/604,664 dated Dec. 1, 2016.
Office Action Summary in U.S. Appl. No. 14/331,096 dated Sep. 12, 2016.
Office Action Summary in U.S. Appl. No. 14/331,096 dated Oct. 11, 2016.
Office Action Summary in U.S. Appl. No. 14/331,096 dated Jan. 13, 2017.
Office Action Summary in U.S. Appl. No. 14/331,096 dated Sep. 11, 2017.
Office Action Summary in U.S. Appl. No. 14/331,096 dated Jan. 24, 2017.
Office Action Summary in U.S. Appl. No. 14/924,684 dated Mar. 12, 2018.
Office Action Summary in U.S. Appl. No. 14/924,689 dated Feb. 26, 2018.
Office Action Summary in U.S. Appl. No. 14/924,706 dated Apr. 20, 2016.
Office Action Summary in U.S. Appl. No. 14/924,709 dated Feb. 22, 2017.
Office Action Summary in U.S. Appl. No. 14/924,709 dated Sep. 28, 2017.
Office Action Summary in U.S. Appl. No. 14/924,709 dated Oct. 24, 2017.
Office Action Summary in U.S. Appl. No. 14/924,709 dated Nov. 16, 2017.
Office Action Summary in U.S. Appl. No. 14/924,709 dated Dec. 14, 2017.
Office Action Summary in U.S. Appl. No. 14/977,733 dated Mar. 20, 2018.
Office Action Summary in U.S. Appl. No. 15/594,648 dated Apr. 24, 2018.
Office Action Summary in U.S. Appl. No. 15/594,649 dated Nov. 3, 2017.
Office Action Summary in U.S. Appl. No. 15/594,650 dated Jan. 31, 2018.
Office Action Summary in U.S. Appl. No. 12/868,767 dated Jan. 16, 2014.
Office Action Summary in U.S. Appl. No. 12/868,767 dated Dec. 31, 2012.
Office Action Summary in U.S. Appl. No. 12/868,767 dated Jul. 19, 2013.
Office Action Summary in U.S. Appl. No. 14/173,806 dated Dec. 2, 2015.
Gina Trapani, "Snap Any Window to Half the Screen Size in Windows 7" (Nov. 5, 2008), Lifehacker Blog Post, available at http://lifehacker.com/5077728/snap-any-window-to-half-thescreen-size-in-windows-7.
Google, "Google Toolbar API," 2007, available at https://www.engadget.com/2014/04/26/google-search-a-visual-history/.
Google, "Personalize Your Homepage," Google News, May 19, 2005, available at http://googlepress.blogspot.com/2005/05/personalize-your-homepage_19.html.
Google, "What is bug.n?," available at https://web.archive.org/web/20100326203241/http://code.google.com/p/bugn (posted on Mar. 26, 2010).
Gordon, Whitson "Cinch Brings Windows 7's Aero Snap to the Mac," LifeHacker, Dec. 22, 2009, available at https://lifehacker.com/5432194/cinch-brings-windows-7s-aero-snap-to-the-mac.
Greg Notess, "Google Universal and Its New Navigation," lnforamtion Today, Inc., May 29, 2007, available at http://newsbreaks.infotoday.com/NewsBreaks/Google-Universal-and-Its-New-Navigation-36281.asp.
Greg Sterling, "Marissa Mayer on iGoogle's New "Social Gadgets"," Search Engine Land, Aug. 6, 2009, available at https://searchengineland.com/google-brings-community-to-igoogle-with-social-gadgets-23654.
Homepage from "Soulid Studio" website, available at https://web.archive.org/web/20100515190349/http://www.soulidstudio.com/ (posted May 15, 2010).
Homepage from "Splitview" website, available at https://web.archive.org/web/20090314055048/http://www.splitview.com/ (posted Mar 14, 2009).
Homepage to "MaxTo," available at https://web.archive.org/web/20090522042853/http://www.maxto.net/ (posted May 22, 2009).
Hompage to "Winsplit Revolution" available at https://web.archive.org/web/20091001024135/http://www.winsplit-revolution.com/ (posted on Oct. 1, 2009).
Hp's Preliminary Invalidity Contentions in Civil Case No. 6:17-cv-00300-RWS (EDTX), Apr. 6, 2018.
Ina Fried, "Next version of Office heads to the browser," available at http://www.cnet.com/news/next-version-of-office-leads-to-the-browser/ (posted on Apr. 9, 2009).
Ina Fried, "Vista won't show fancy side to pirates," available at http://www.cnet.com/news/vista-wont-show-fancy-side-to-pirates/ (posted Apr. 14, 2006).
International Search Report and Written Opinion from PCT/US2013/043848, dated Oct. 22, 2013.
Internet Basics IE 5.5 p. 7: Release date for IE 5.5 Jul. 12, 2000.
Internet Explorer 5.X Basics Release Date for IE 5.5 Jul. 12, 2000.
Internet Explorer for Mac screenshots http://en.wikipedia.org/wiki/Internet.sub.--Explorer.sub.--for.sub.--Mac. 2001.
Jake Quist, "Big canvas, big opportunity," iGoogle Developer Blog, Oct. 16, 2008, available at http://googledeveloper.blogspot.com/2008/10/big-canvas-big-opportunity.html.
Jamie Lendino, "Wacom Cintiq 21UX," PC Mag, Mar. 23, 2010, available at https://www.pcmag.com/article2/0,2817,1978592,00.asp.
Jason Fitzpatrick, "Split Screen Slices Your Chrome Window into Two Panes," available at http://lifehacker.com/5511986/split-screen-slices-your-chrome-window-into-two-panes (posted on Apr. 8, 2010).
Jim Allchin, "The Sounds of Windows Vista," available at https://web.archive.org/web/20061110152317/http://windowsvistablog.com/blogs/windowsvista/archive/2006/11/09/the-sounds-of-windows-vista.aspx (posted on Nov. 9, 2006).
John R. Lavine et al., The Internet for Dummies, 11th Edition, Wiley Publishing, Inc. (2007).
Kate Greene "Your Phone as a Virtual Tour Guide," MIT Technology Review, May 17, 2007, available at https://www.technologyreview.com/s/407919/your-phone-as-a-virtual-tour-guide/.
Kiriaty and Goldshtein, "Inside Windows 7—Introducing the Taskbar APIs," available at https://msdn.microsoft.com/en-us/magazine/dd942846.aspx (posted Jul. 2009).
Flint Finley, "Microsoft Rolls Out Office Web Apps," available at http://readwrite.com/2010/06/08/microsoft-rolls-out-office-web (posted on Jun. 8, 2010).
Krati Dubey, "Google Toolbar 5 Download with Advanced Features Introduced," Tech Shout, Dec. 14, 2007, available at htps://www.techshout.com/internet/2007/14/google-toolbar-5-with-advanced-features-introduced/.
Lewis Butler, Revealing Mac Ss X's Hidden Single-Application Mode (Oct. 6, 2009).
Long Zheng, "From Microsoft patent to Windows reality: "X-ray browsing", circa 2005; Aero Peek, circa 2008," available at http://www.istartedsomething.com/20081130/from-microsoft-patent-to-windows-reality-x-ray-browsing-aero-peek/ (posted on Nov. 30, 2008).

(56) References Cited

OTHER PUBLICATIONS

Mark Chambers "How to Customize The Toolbar in Mac OS X Snow Leopard," Dummies, available at https://www.dummies.com/computers/macs/how-to-customize-the-toolbar-in-mac-os-x-snow-leopard/.
Mark Knichel, "Rich text signatures," Gmail Blog, Jul. 8, 2010, available at https://gmail.googleblog.com/2010/07/rich-text-signatures.html.
Martin Tomitsch "Trends and Evolution of Window Interfaces," Vienna University of Technology, 2004.
Matt Gundersen, "What's new with iGoogle," Google Blog, Oct. 16, 2008, available at https://googleblog.blogspot.com/2008/10/whats-new-with-igoogle.html.
Michael Liedtke "Google dubs personal home page 'iGoogle'", NBC News, Apr. 30, 2007, available at http://www.nbcnews.com/id/18405212/#.W5Fg_OhKhhF.
Microsoft Blog Post, "Windows Desktop Sharing API," Posted Mar. 8, 2007, available at https://blogs.technet.microsoft.com/enterprisemobility/2007/03/08/windows-desktop-sharing-api/.
Microsoft Developer Network "Object Binding in Visual Studio" 2010 http://msdn.microsoft.com/en-us/library/ms233815(v=vs.100).aspx last accessed Mar. 20, 2014.
Microsoft Developer Network "Object Binding Sample" Jul. 15, 2010 http://msdn.microsoft.com/en-us/library/8e36eeyx%28v=vs.90%29.aspx last accessed Mar. 20, 2014.
Microsoft Internet Explorer Ver. 6.0.2800 Copyright 1995-2001.
Microsoft press Computer Dictionary third Edition Microsoft Press 1997.
Microsoft Windows 1 Operating Environment Users Guide.
Microsoft Windows 1.0 Operating Environment Desktop Applications User's Guide.
Microsoft Windows 1.0 Operating Environment User's Guide.
Microsoft Windows 7 in Depth by Robert Cowart and Brian Knittel, pub. Sep. 2009.
Microsoft Windows 7 on Demand by Steve Johnson, Perspection, Inc., pub. Sep. 2009.
Microsoft Windows 7 Product Guide.
Microsoft, "Microsoft Office 2010 Hits Major Milestone and Enters Technical Preview," available at http://news.microsoft.com/2009/07/13/microsoft-office-2010-hits-major-milestone-and-enters-technical-preview/ (posted on Jul. 13, 2009.
Microsoft, "Microsoft to Extend Office to the Browser," available at http://news.microsoft.com/2008/10/28/microsoft-to-extend-office-to-the-browser/ (posted on Oct. 28, 2008).
Microsoft, "Microsoft Web Apps: Office Goes to the Web," available at http://news.microsoft.com/2009/09/17/microsoft-web-apps-office-goes-to-the-web/ (posted on Sep. 17, 2009).
Neowin, "WindowSpace v2.0 Beta—Snapping like in Windows 7," available at http://www.neowin.net/news/windowspace-v20-beta---snapping-like-in-windows-7 (posted Apr. 29, 2009).
Netscape Navigator v. 6.1 Released at least as early as Jun. 2001.
Office Online, available at https://en.wikipedia.org/wiki/Office_Online (page was last edited May 10, 2017).
Online Forum "Move icons around freely in Windows 7," Superuser, Jul. 24, 2009, available at https://superuser.com/questions/12401/move-icons-around-freely-in-windows-7.
Othman Laraki, "All buttoned up," Google Blog, Jan. 30, 2006, available at https://googleblog.blogspot.com/2006/01/all-buttoned-up.html.
Patricia Pantel Dekang Lin "A Statistical Corpus-Based Term Extractor" 2001.
Pfaffenberger B. (1995). Netscape Navigator 3.0 Surfing the Web and Exploring the Internet AP Professional: Chestnul Hill MA pp. xv-xvi 3 5-12 22 76-84 91-107 201-209 443.
Plumb, available at https://web.archive.org/web/20111201224224/http://palatialsoftware.com/plumb (posted Dec. 3, 2011).
Press Release, "Google Begins Move to Universal Search," Google News, May 16, 2007, available at https://googlepress.blogspot.com/2007/05/google-begins-move-to-universal-search_16.html.
Richard Leadbetter, "Digital Foundry vs. Halo: Reach beta," available at http://www.eurogamer.net/articles/digitalfoundry-vs-halo-reach-beta-article?page=3 (posted on Jan. 5, 2010).
Roberts Bill Solving the Value Equation Knowledge management Magazine Jan. 2001.
Roberts Ginger Derwent Information Global Patent Sources 1995.
Robust Software, User-Friendly and Very Responsive, available at http://www.faps.com/PC_DVR_H.264_.htm (posted date unknown).
Sarah Perez, "Microsoft Office Web Applications: Your Burning Questions Answered," available at https://channel9.msdn.com/blogs/coolstuff/microsoft-office-web-applications-your-burning-questions-answered (posted on Nov. 10, 2008).
Seth Rosenblatt "First Look: Touch-screen features in Windows 7" Jul. 17, 2009 http://www.cnet.com/videos/touch-screen-features-in-windows-7/ (last accessed Mar. 25, 2016).
Snap, available at http://web.archive.org/web/20150207101641/http://windows.microsoft.com/en-us/windows7/products/features/snap (posted on Feb. 7, 2015).
Split Screen Slices Your Chrome Window into Two Panes, available at http://lifehacker.com/5511986/split-screen-slices-your-chrome-window-into-two-panes (posted Apr. 8, 2010).
Steven Sinofsky "Designing Aero Snap" Mar. 17, 2009 https://blogs.msdn.microsoft.com/e7/2009/03/17/designing-aero-snap/#comments (last accesed Mar. 25, 2016).
Steven Sinofsky, "Designing Aero Snap" (Mar. 17, 2009), Microsoft Blog Post, available at https://blogs.msdn.microsoft.com/e7/2009/03/17/designing-aero-snap/.
Steven Sinofsky, "Touching Windows 7," available at http://blogs.msdn.com/b/e7/archive/2009/03/25/touching-windows-7.aspx (posted on Mar. 25, 2009).
SurfSaver.com Archived Webpages 66 pages. (Feb. 19, 2009).
The Dual Screen Tablet: Toshiba Libretto W100, available at http://sensegadget.blogspot.com/2010/08/dual-screen-tablet-toshiba-libretto.html (posted Aug. 11, 2010).
Tiling window manager, available at https://en.wikipedia.org/wiki/Tiling_window_manager#Third-party_addons (page was last edited Feb. 5, 2017).
Tony Ruscoe, "Google Toolbar 5 for Internet Explorer Released," Blogoscoped, Dec. 12, 2007, available at http://blogoscoped.com/archive/2007-12-12-n84.html.
U.S. Appl. No. 12/868,767 filed Aug. 26, 2010.
Underdahl B. (2000). Opera Web Browser for Dummies IDB Books Worldwide Inc.: Foster City CA pp. 9-16 28-32 36-37 40-42 46-53 67-93 97 152-153 185-189.
Use Aero Snap with Internet Explorer 9 Tabs in Windows 7 available at http://www.howtogeek.com/howto/29090/use-aero-snap-with-ie-9-tabs-in-windows-7/ (posted Sep. 16, 2010).
Vladislav Kaznacheev, "Google Toolbar 5 now available in Firefox," Google Blog, Sep. 26, 2008, available at https://googleblog.blogspot.com/2008/09/google-toolbar-5-now-available-in.html.
Warren Teitelman, "Ten Years of Window Systems—A Retrospective View," available at https://web.archive.org/web/20100316102701/http://www.chilton-computing.org.uk/infiliterature/books/wm/p004.htm (posted on Mar. 10, 2010).
Welcome to Windows 7, by Microsoft, pub. 2009.
Windawesome, available at https://web.archive.org/web/20110309204453/http://windawesome.codeplex.com/ (posted on Mar. 9, 2011).
Window tiling history, available at https://web.archive.org/web/20100330011025/http://mnemonikk.org/talks/tiling-wm.en.html (posted on Mar. 30, 2010).
Windows 7 Feature Focus: Aero Snaps, available at http://winsupersite.com/windows-7/windows-7-feature-focus-aero-snaps (posted Oct. 6, 2010).
Windows 7 Secrets by Paul Thurrott & Rafael Rivera, pub. Sep. 8, 2009.
Windows Aero, available at https://en.wikipedia.org/wiki/Windows_Aero (page was last edited May 19, 2017).
Windows Tips and Tricks, https://www.rescomp.berkeley.edu/resources/software/windowsshortcuts/,- 2010, last accessed Nov. 22, 2013.
www.open-ideas.org—Open Ideas retrieved Apr. 6, 2001.

(56) References Cited

OTHER PUBLICATIONS www.uspto.gov retrieved from the Internet Archive Wayback Machine Dec. 19, 2000.
www.uspto.gov retrieved from the Internet Archive Wayback Machine Jul. 6, 2000.
www.uspto.gov retrieved from the Internet Archive Wayback Machine Nov. 22, 2004.
www.uspto.gov retrieved from the Internet Archive Wayback Machine Nov. 8, 2004.
Xerox Star, available at https://web.archive.org/web/20100101040301/http://toastytech.com/guis/star.html (posted on Jan. 31, 2010).
Youtube Video and Transcript, "Intel Wireless Display Demo | Intel," Uploaded Jan. 10, 2010, available at https://www.youtube.com/watch?v=5Gm4ADoMFus.
Youtube Video and Transcript, "Office Live Meeting Demo 1: Join a meeting," Uploaded Jan. 8, 2008, available at https://www.youtube.com/watch?v=h9MYNKVgOW8.
Youtube Video and Transcript, "Office Live Meeting Demo 1: Join a meeting," Uploaded Jan. 8, 2008, available at https://www.youtube.com/watch?v=h9MYNKVg0W8.
Youtube Video, "Explore full-screen gadgets and tabs in iGoogle," Published Apr. 27, 2009, available at https://www.youtube.com/watch?v=ZxLczLXWIzc.
Youtube Video, "Google Toolbar 5: Learn about new features," Published Nov. 27, 2007, available at https://www.youtube.com/watch?v=M9Whs0lpK_g.
Youtube Video, "Google Toolbar for Firefox, version 5," Published Sep. 25, 2008, available at https://www.youtube.com/watch?v=FN3xzsoZK4U.
Youtube Video, "Mac OS X 10.6—Snow Leopard; Expose inside Spaces," published Aug. 30, 2009, available at https://www.youtube.com/watch?v=U7gb1mC599Y.
Youtube Video, "PA3D: Early zoomable user interface (ZUI)," Published Oct. 29, 2008, available at https://www.youtube.com/watch?v=5JzaEUJ7IbE.
Youtube Video, "Pad++: X Technical Conference (Part 1 of 2)," Published Oct. 29, 2008, available at https://www.youtube.com/watch?v=681P1gRLmZw.
Youtube Video, "Pad++: X Technical Conference (Part 2 of 2)," Published Oct. 29, 2008, available at https://www.youtube.com/watch?v=rZVtJHVyrxl.
Youtube Video, "Snow Leopard Expose and Dock Expose—Mac OS X 10.6," published Aug. 31, 2009, available at https://www.youtube.com/watch?v=9AoAZnHFJ5E.
ZaneA, "HashTWM," available at https://web.archive.org/web/20100303233018/http://github.com/ZaneA/HashTWM (published Oct. 25, 2009).
Zinstall, available at https://web.archive.org/web/20110301052528/http://www.zinstall.com/products/twinsplay (posted Mar. 1, 2011).
ZTE's Invalidity Contentions in Civil Case No. 6:17-cv-00300-RWS (EDTZ), Apr. 6, 2018.
"All the Widgets SIGGRAPH Video Review" Brad Myers 1990.
"Mac OS X Snow Leopard," Wikipedia Article, last updated Aug. 14, 2018, available at https://en.wikipedia.org/wiki/Mac_OS_X_Snow_Leopard.
"NextWindow 2700 Touch Overlay Installation Guide," v.1.6, Next Window Ltd. 2009, available at https://www.clarybusinessmachines.com/products/files/nextwindow/2700_installation.pdf.
"NextWindow Latest Technical Information," Web Archive Webpage, Jul. 29, 2009, available at https://web.archive.org/web/20090729070634/http://www.nextwindow.com:80/support/latest_tech_info.html.
"Windows 3.1 Screen Shots," Toasty Tech, available at http://toastytech.com/guis/win31.html.
"Windows 3.1x" Wikipedia Article, last updated Aug. 31, 2018, available at https://en.wikipedia.org/wiki/Windows_3.1x.
"Windows 7," Wikipedia Article, last updated Aug. 31, 2018 available at https://en.wikipedia.org/wiki/Windows_7.
"Windows NT," Wikipedia Article, last updated Aug. 29, 2018, available at https://en.wikipedia.org/wiki/Windows_NT.

"Windows XP," Wikipedia Article, last updated Sep. 5, 2018, available at https://en.wikipedia.org/wiki/Windows_XP.
"A performance comparison of current and previous generation Dell Latitude notebook systems," Principled Technologies (Oct. 2009).
"Comparison of tiling window managers," available at https://wiki.archlinux.org/index.php?title=Comparison_of_tiling_window_managers&oldid=112641 (posted on Jul. 26, 2010).
"Dell and Windows 7—The Wait is Over," Dell Press Release (Oct. 22, 2009).
"GroupBar: The TaskBar Evolved" Greg Smith, Patrick Baudisch, George Robertson, Mary Czerwinski, Brian Meyers, Daniel Robbins, and Donna Andrews, available at http://rajatorrent.com.patrickbaudisch.com/publications/2003-Smith-OZCH103-GroupBar.pdf.
"Making computer behavior consistent: the OSF/Motif graphical user interface" Deininger, Axel O; Fernandez, Charles V Publication info: Hewlett-Packard Journal 41.n3: p6(7). Hewlett Packard Company. (Jun. 1990) available at http://www.hpl.hp.com/hpjournal/pdfs/IssuePDFs/1990-06.pdf.
100 open source gems—part 2, available at http://www.tuxradar.com/content/100-open-source-gems-part-2 (posted on May 21, 2009).
Adario Strange, "Google Intros Universal Search, NAV Bar and Cross Language Retrieval," Wired, May 16, 2007, available at https://www.wired.com/2007/05/google-intros-u/.
Alex Chitu, "The New iGoogle, Publicly Launched," Google Operating System Blog, Oct. 16, 2008, available at https://googlesystem.blogspot.com/2008/10/new-igoogle-publicly-launched.html#gsc.tab=0.
Archived Webpages from Blink.com 74 pages. (Feb. 2, 2009).
Archived Webpages from Clickmarks.com 58 pages. (Oct. 5, 2008).
Archived Webpages from SpotOn.com 74 pages. (Oct. 14, 2008).
Archived-Apple TV: Using AirTunes http://supportapple.com/kb/HT3291,—Nov. 19, 2008, last accessed Nov. 22, 2013.
B. Bederson et al., A Zooming Web Browser, University of New Mexico Computer Science Department (1996).
Billy Steele, "Google Search: A visual history," Apr. 26, 2014, available at https://www.engadget.com/2014/04/26/google-search-a-visual-history/.
Brad A Myers "A Taxonomy of Window Manager User Interfaces," IEEE, Sep. 1988.
Brad A Myers "The User Interface for Sapphire," IEEE, Dec. 1984.
Brad Hill, World Wide Web Searching for Dummies, 2nd Edition, IDG Books Worldwide, Inc. (1997).
Bradley Horowitz, "A fall sweep," Google Blog, Oct. 14, 2011, available at https://googleblog.blogspot.com/2011/10/fall-sweep.html.
Brs & West Scientific and Technical information Center USPTO Jun. 1999 p. 4.
Chakrabarti S. et al. (2000). "Using Memex to Archive and Mine Community Web Browsing Experience" Computer Networks 33:669-684.
CNET video, "Touch-screen features in Windows 7: CNET First Look" (Jul. 17, 2009), CNET Video Post, available at https://www.cnet.com/videos/touch-screen-features-in-windows-7 I.
Comparison of extensible window managers, available at http://sawfish.wikia.com/wiki/Comparison_of_extensible_window_managers (posted date unknown).
Comparison of tiling window managers, available at https://wiki.archlinux.org/index.php/Comparison_of_tiling_window_managers (page was last edited Jan. 17, 2017).
Dan Pupius, "Code changes to prepare Gmail for the future," Gmail Blog, Oct. 29, 2007, available at https://gmail.googleblog.com/2007/10/code-changes-to-prepare-gmail-for.html.
Danny Sullivan, "Google's New Navigational Links: An Illustrated Guide," Search Engine Land, May 16, 2007, available at https://searchengineland.com/googles-new-navigational-links-an-illustrated-guide-11233.
David Pogue, Mac OS X Snow Leopard: The Missing Manual (2009).
Dialog Pocket Guide The Dialog Corporation Copyright Date of 1998.
Dialog Pocket Guide The Dialog Corporation Copyright Date of 2001.

(56) References Cited

OTHER PUBLICATIONS

Divvy for Mac OS X, available at https://web.archive.org/web/20100514104937/http://mizage.com/divvy (posted on May 14, 2010).
Divvy, available at http://www.slant.co/topics/1249/viewpoints/1/~what-are-the-best-window-managers-for-windows-divvy (posted date unknown).
Donation Coder, "Grid Move," available at https://web.archive.org/web/20100208182814/http://jgpaiva.dcmembers.com/ gridmove.html (posted on Feb. 8, 2010).
East 1.1 Enhancements Scientific and Technical Information Center USPTO Jul. 2000 pp. 5-86.
East Search Screen Showing Copyright Date of 1999.
Extended European Search Report in Application No. 13170578.2, dated Nov. 29, 2013.
First Alliance "Security Camera Systems for Your Business or Home," available at https://web.archive.org/web/20100615200435/http://www.faps.com/PC_DVR_H.264__htm (psoted on Jun. 15, 2010).
Frakes, Dan, "TwoUp and SizeUp organize multiple windows," MacWorld, Sep. 24, 2009, available at https://www.macworld.com/article/1142976/twoupsizeup.html.
Freedman Alan The Computer Desktop Encycloedia AMACOM 1996.
George Robertson et al "The Task Gallery: A 3D Window Manager," Microsoft Research, Apr. 1, 2000, available at https://www.microsoft.com/en-us/research/publication/the-task-gallery-a-3d-window-manager/.
Getting Started with PatentLab-11; a Sample Analysis Scenario Included Wisdomain Inc. Version 1.1 May 6, 2000.

HOT KEY SYSTEMS AND METHODS

RELATED APPLICATIONS

This application is a continuation of and claims priority to U.S. patent application Ser. No. 16/357,206, entitled "HOT KEY SYSTEMS AND METHODS," filed Mar. 18, 2019, which in turn is a continuation of and claims priority to U.S. patent application Ser. No. 15/694,760, entitled "HOT KEY SYSTEMS AND METHODS," filed Sep. 1, 2017, now, U.S. patent Ser. No. 10/397,639, which in turn is a continuation-in-part of, and claims priority to U.S. patent application Ser. No. 14/835,662, entitled "METHODS, SYSTEMS, AND COMPUTER PROGRAM PRODUCTS FOR CONTROLLING PLAY OF MEDIA STREAMS," filed Aug. 25, 2015, which is a continuation-in-part of, and claims priority to U.S. patent application Ser. No. 14/604,664, entitled "METHODS, SYSTEMS, AND COMPUTER PROGRAM PRODUCTS FOR CONTROLLING PLAY OF MEDIA STREAMS," filed Jan. 23, 2015, which is a continuation-in-part of, and claims priority to: 1) U.S. patent application Ser. No. 12/696,854, entitled "METHODS, SYSTEMS, AND COMPUTER PROGRAM PRODUCTS FOR CONTROLLING PLAY OF MEDIA STREAMS," filed Jan. 29, 2010; and 2) U.S. patent application Ser. No. 12/705,638, entitled "METHODS, SYSTEMS, AND COMPUTER PROGRAM PRODUCTS FOR DELAYING PRESENTATION OF AN UPDATE TO A USER INTERFACE," filed Feb. 15, 2010.

APPLICATIONS INCORPORATED BY REFERENCE

U.S. patent application Ser. No. 12/705,638, entitled "METHODS, SYSTEMS, AND COMPUTER PROGRAM PRODUCTS FOR DELAYING PRESENTATION OF AN UPDATE TO A USER INTERFACE," filed Feb. 15, 2010, incorporates by reference U.S. patent application Ser. No. 12/696,854, entitled "METHODS, SYSTEMS, AND COMPUTER PROGRAM PRODUCTS FOR CONTROLLING PLAY OF MEDIA STREAMS," filed Jan. 29, 2010; and U.S. patent application Ser. No. 12/691,042 filed on Jan. 21, 2010 entitled "METHODS, SYSTEMS, AND COMPUTER PROGRAM PRODUCTS FOR COORDINATING PLAYING OF MEDIA STREAMS. The following are each incorporated herein by reference in their entirety for all purposes: U.S. patent application Ser. No. 12/696,854, entitled "METHODS, SYSTEMS, AND COMPUTER PROGRAM PRODUCTS FOR CONTROLLING PLAY OF MEDIA STREAMS," filed Jan. 29, 2010; U.S. patent application Ser. No. 12/691,042 filed on Jan. 21, 2010 entitled "METHODS, SYSTEMS, AND COMPUTER PROGRAM PRODUCTS FOR COORDINATING PLAYING OF MEDIA STREAMS"; and U.S. patent application Ser. No. 12/705,638, entitled "METHODS, SYSTEMS, AND COMPUTER PROGRAM PRODUCTS FOR DELAYING PRESENTATION OF AN UPDATE TO A USER INTERFACE," filed Feb. 15, 2010.

BACKGROUND

When applications attempt to play more than one media stream on current devices, some or all the applications are allowed access to the presentation devices of the device, for example a display device and/or an audio device. While some systems attempt to manage network bandwidth usage between and/or among media players that are operating at the same time. Access to a presentation device by applications playing media streams on the same device is not managed. The media streams played by corresponding applications are played on a presentation device regard for other media streams usage of the presentation device. Watching a video or listening to song with interference from other audio streams and video streams is a common experience.

When listening to a song and browsing the web, many web sites include audio in their web pages. The web page audio plays despite the fact that a song is already be played by a music player application. This often leads to an unpleasant listening experience. If a user locates multiple videos and accesses them in multiple browser windows and/or tabs the videos play as if the user is able to watch all of them at the same time. Videos in windows that are obscured by other windows or that are minimized continue to play as if there was someone watching. Some web pages do wait to detect that they are visible before beginning to play a stream, but these pages play their streams without regard for other media players playing and/or otherwise accessing a display or speakers to play one or more media streams.

For audio, a user can adjust the volume, and turn audio on and off for a device. Similarly, a user can turn a display off and/or adjust its brightness. Controlling multiple applications using a display and/or audio devices requires using application provided controls to control and coordinate use of a display and/or audio device, if an application provides a user interface controls for these functions. Web applications behave similarly.

Accordingly, there exists a need for methods, systems, and computer program products for controlling play of media streams.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A presentation device is provided comprising: a non-transitory memory storing instructions and a plurality of applications including a first media player application, a second media player application, and a third application; a touchscreen; and one or more processors in communication with the non-transitory memory and the touchscreen, wherein the one or more processors execute the instructions to: present, utilizing the touchscreen, a first media player application window associated with the first media player application; detect, utilizing the touchscreen, a hot key user input; in response to the detection of the hot key user input, present, utilizing the touchscreen, a control user interface adjacent and exterior to the first media player application window associated with the first media player application, the control user interface including selectable representations identifying a subset of the plurality of applications that are executed, the selectable representations including: a second media player application window representation associated with the second media player application and having a first z-order attribute, and a third application window representation associated with the third application and having a second z-order attribute; detect, utilizing the touchscreen, a selection of one of the selectable representations of the control user interface including the second media player application window representation associated with the second media player application; in response to the detection of the selection of the one of the selectable representations of the control user interface, indicate that the second media player application is allowed to play one or more media streams in addition to the first media player application being allowed to play one or more other media streams, where the first media player application window associated with the first media player application is simultaneously presented, utilizing the touchscreen, with a second media player application window associated with the second media player application, such that the first media player application window is presented with at least one first input control and the second media player application window is presented with at least one second input control, the at least one first input control and the second input control each including at least one of a play input control or a pause input control; detect, utilizing the touchscreen, a selection of the at least one first input control presented with the first media player application window; in response to the detection of the selection of the at least one first input control presented with the first media player application window, present, utilizing the touchscreen, a first media stream in the first media player application window; detect, utilizing the touchscreen and while the first media stream is being presented in the first media player application window, a selection of the at least one second input control presented with the second media player application window; and in response to the detection of the selection of the at least one second input control presented with the second media player application window while the first media stream is being presented in the first media player application window, pause the presentation of the first media stream in the first media player application window, and present, utilizing the touchscreen, a second media stream in the second media player application window.

Another presentation device is provided comprising: a non-transitory memory storing instructions and a plurality of applications including a first media player application, a second application, and a third media player application; a touchscreen; and one or more processors in communication with the non-transitory memory and the touchscreen, wherein the one or more processors execute the instructions to: present, utilizing the touchscreen, a first media player application window associated with the first media player application that is allowed to play one or more media streams, where the first media player application window is presented with at least one first input control including at least one of a play input control or a pause input control; detect, utilizing the touchscreen, a selection of a hot key; in response to the detection of the selection of the hot key, present, utilizing the touchscreen, a control user interface adjacent and exterior to the first media player application window associated with the first media player application, the control user interface including selectable representations identifying a subset of the plurality of applications that are executed, the selectable representations including: a second application window representation associated with the second application and having a first z-order attribute, and a third media player application window representation associated with the third media player application and having a second z-order attribute; detect, utilizing the touchscreen, a selection of one of the selectable representations of the control user interface including the second application window representation associated with the second application; in response to the detection of the selection of the one of the selectable representations of the control user interface including the second application window representation associated with the second application, present, utilizing the touchscreen, the second application window, where the second application window associated with the second application is simultaneously presented, utilizing the touchscreen, with the first media player application window associated with the first media player application; detect, utilizing the touchscreen, a selection of a visual element presented in connection with the first media player application window associated with the first media player application; and in response to the detection of the selection of the visual element presented in connection with the first media player application window associated with the first media player application, indicate that the third media player application is allowed to play at least one media stream, and present, utilizing the touchscreen, the at least one media stream in the third media player application window.

Yet another presentation device is provided comprising: a non-transitory memory storing instructions and a plurality of applications including a first media player application, a second media player application, and a third application; a touchscreen; and one or more processors in communication with the non-transitory memory and the touchscreen, wherein the one or more processors execute the instructions to: present, utilizing the touchscreen, a first media player application window associated with the first media player application; detect, utilizing the touchscreen, a user input in connection with a hot key; in response to the detection of the user input in connection with the hot key, present, utilizing the touchscreen, a control user interface adjacent and exterior to the first media player application window associated with the first media player application, the control user interface including selectable representations identifying a subset of the plurality of applications that are the subject of execution, the selectable representations including: a second media player application window representation associated with the second media player application and having a first z-order attribute, and a third application window representation associated with the third application and having a second z-order attribute; detect, utilizing the touchscreen, a selection of one of the selectable representations of the control user interface including the second media player application window representation associated with the second media player application; in response to the detection of the selection of the one of the selectable representations of the control user interface, indicate that the second media player application is allowed to play one or more media streams in addition to the first media player application being allowed to play one or more other media streams, where the first media player application window associated with the first media player application is simultaneously presented, utilizing the touchscreen, with a second media player application window associated with the second media player application, such that the first media player application window is presented with at least one first input control and the second media player application window is presented with at least one second input control, the at least one first input control and the second input control each including at least one of a play input control or a pause input control; detect, utilizing the touchscreen, a selection of the at least one first input control presented with the first media player application window; in response to the detection of the selection of the at least one first input control presented with the first media player application window, present, utilizing the touchscreen, a first media stream in the first media player application window; detect, utilizing the touchscreen, a selection of the at least one second input control presented with the second media player application window; in response to the detection of the selection of the at least one second input control presented with the second media player application window, present, utilizing the touchscreen, a second media stream in the second media player application window; determine whether at least one of the subset of the plurality of applications ceases operating; and in response to the determination that the at least one of the subset of the plurality of applications ceases operating, remove one of the selectable representations from the control user interface that corresponds with the at least one of the subset of the plurality of applications.

Other methods and systems are described for controlling play of media streams. In one aspect, the method includes presenting a media control user interface including selectable representations identifying a plurality of operating media players configured for accessing a first presentation device. The method further includes receiving a user selection identifying a selected portion of the plurality. The method still further includes indicating a media player, in the selected portion, is allowed access to the first presentation device to play a media stream.

Further, a system for controlling play of media streams is described. The system includes an execution environment including an instruction processing unit configured to process an instruction included in at least one of a media control user interface element handler component, a media selection component, and an access director component. The system includes the media control user interface element handler component configured for presenting a media control user interface including selectable representations identifying a plurality of operating media players configured for accessing a first presentation device. The system further includes the media selection component configured for receiving a user selection identifying a selected portion of the plurality. The system still further includes the access director component configured for indicating a media player, in the selected portion, is allowed access to the first presentation device to play a media stream.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Prior to describing the subject matter in detail, an exemplary device included in an execution environment that may be configured according to the subject matter is described. An execution environment includes an arrangement of hardware and, optionally, software that may be further configured to include an arrangement of components for performing a method of the subject matter described herein.

Figure 1:
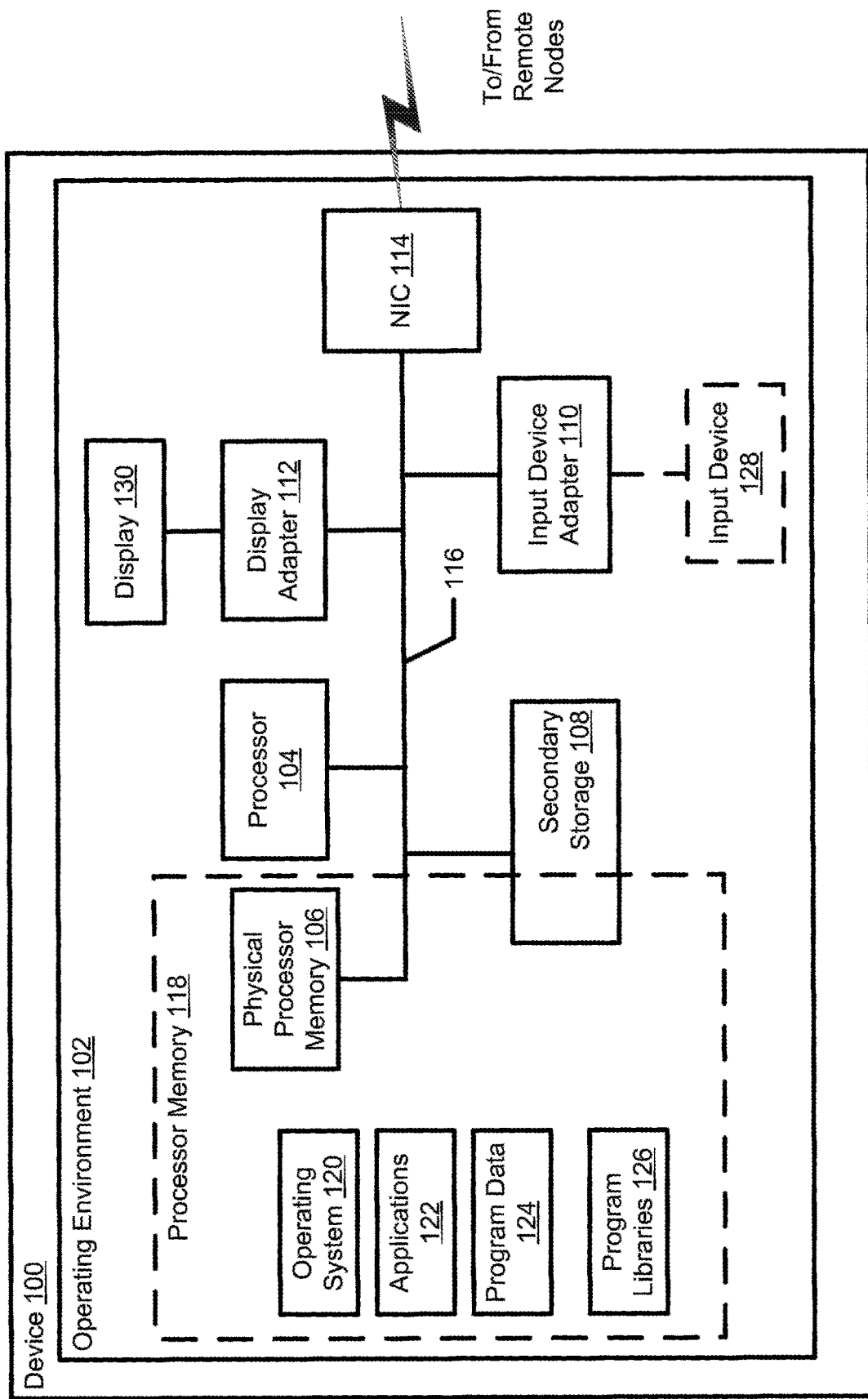
FIG. 1 is a block diagram illustrating an exemplary hardware device included in and/or otherwise providing an execution environment in which the subject matter may be implemented.

Those of ordinary skill in the art will appreciate that the components illustrated in FIG. 1 may vary depending on the execution environment implementation. An execution environment includes or is otherwise provided by a single device or multiple devices, which may be distributed. An execution environment may include a virtual execution environment including software components operating in a host execution environment. Exemplary devices included in or otherwise providing suitable execution environments for configuring according to the subject matter include personal computers, servers, hand-held and other mobile devices, multiprocessor systems, consumer electronic devices, and network-enabled devices such as devices with routing and/or switching capabilities.

With reference to FIG. 1, an exemplary system for configuring according to the subject matter disclosed herein includes hardware device 100 included in execution environment 102. Device 100 includes an instruction processing unit illustrated as processor 104; physical processor memory 106 including memory locations that are identified by addresses in a physical address space of processor 104; secondary storage 108; input device adapter 110; a presentation adapter for presenting information to a user illustrated as display adapter 112; a communication adapter, such as network interface card (NIC) 114, for communicating via a network; and bus 116 that couples elements 104-114.

Bus 116 may comprise any type of bus architecture. Examples include a memory bus, a peripheral bus, a local bus, a switching fabric, etc. Processor 104 is an instruction execution machine, apparatus, or device and may comprise a microprocessor, a digital signal processor, a graphics processing unit, an application-specific integrated circuit (ASIC), a field programmable gate array (FPGA), etc.

Processor 104 may be configured with one or more memory address spaces in addition to the physical memory address space. A memory address space includes addresses that identify corresponding locations in a processor memory. An identified location is accessible to a processor processing an address that is included in the address space. The address is stored in a register of the processor and/or identified in an operand of a machine code instruction executed by the processor.

FIG. 1 illustrates processor memory 118 may have an address space including addresses mapped to physical memory addresses identifying locations in physical processor memory 106. Such an address space is referred to as a virtual address space, its addresses are referred to as virtual memory addresses, and its processor memory is known as a virtual processor memory. A virtual processor memory may be larger than a physical processor memory by mapping a portion of the virtual processor memory to a hardware memory component other than a physical processor memory. Processor memory 118 illustrates a virtual processor memory mapped to physical processor memory 106 and to secondary storage 108. Processor 104 may access physical processor memory 106 without mapping a virtual memory address to a physical memory address.

Thus at various times, depending on the address space of an address processed by processor 104, the term processor memory may refer to physical processor memory 106 or a virtual processor memory as FIG. 1 illustrates.

Program instructions and data are stored in physical processor memory 106 during operation of execution environment 102. In various embodiments, physical processor memory 106 includes one or more of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Processor memory may also include nonvolatile memory technologies such as nonvolatile flash RAM (NVRAM), ROM, or disk storage. In some embodiments, it is contemplated that processor memory includes a combination of technologies such as the foregoing, as well as other technologies not specifically mentioned.

In various embodiments, secondary storage 108 includes one or more of a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide volatile and/or nonvolatile storage of computer readable instructions, data structures, program components and other data for the execution environment 102. As described above, when processor memory 118 is a virtual processor memory, at least a portion of secondary storage 108 is addressable via addresses in a virtual address space of the processor 104.

A number of program components may be stored in secondary storage 108 and/or in processor memory 118, including operating system 120, one or more applications programs (applications) 122, program data 124, and other program code and/or data components as illustrated by program libraries 126.

Execution environment 102 may receive user-provided commands and information via input device 128 operatively coupled to a data entry component such as input device adapter 110. An input device adapter may include mechanisms such as an adapter for a keyboard, a touch screen, a pointing device, etc. An input device included in execution environment 102 may be included in device 100 as FIG. 1 illustrates or may be external (not shown) to the device 100. Execution environment 102 may support multiple internal and/or external input devices. External input devices may be connected to device 100 via external data entry interfaces supported by compatible input device adapters. By way of example and not limitation, external input devices may include a microphone, joystick, game pad, satellite dish, scanner, or the like. In some embodiments, external input devices may include video or audio input devices such as a video camera, a still camera, etc. Input device adapter 110 receives input from one or more users of execution environment 102 and delivers such input to processor 104, physical processor memory 106, and/or other components operatively coupled via bus 116.

Output devices included in an execution environment may be included in and/or external to and operatively coupled to a device hosting and/or otherwise included in the execution environment. For example, display 130 is illustrated connected to bus 116 via display adapter 112. Exemplary display devices include liquid crystal displays (LCDs), light emitting diode (LED) displays, and projectors. Display 130 presents output of execution environment 102 to one or more users. In some embodiments, a given device such as a touch screen functions as both an input device and an output device. An output device in execution environment 102 may be included in device 100 as FIG. 1 illustrates or may be external (not shown) to device 100. Execution environment 102 may support multiple internal and/or external output devices. External output devices may be connected to device 100 via external data entry interfaces supported by compatible output device adapters. External output devices may also be connected to bus 116 via internal or external output adapters. Other peripheral output devices, not shown, such as speakers and printers, tactile, motion producing devices, and other sense detectable output devices may be connected to device 100. As used herein the term display includes image projection devices.

A device included in or otherwise providing an execution environment may operate in a networked environment using logical connections to one or more devices (not shown) via a communication interface. The terms communication interface and network interface are used interchangeably. Device 100 illustrates network interface card (NIC) 114 as a network interface included in execution environment 102 to operatively couple device 100 to a network. The terms network node and node in this document both refer to a device having a network interface operatively coupled to a network.

A network interface included in a suitable execution environment, such as NIC 114, may be coupled to a wireless network and/or a wired network. Examples of wireless networks include a BLUETOOTH network, a wireless personal area network (WPAN), a wireless 802.11 local area network (LAN), and/or a wireless telephony network (e.g., a cellular, PCS, or GSM network). Examples of wired networks include a LAN, a fiber optic network, a wired personal area network, a telephony network, and/or a wide area network (WAN). Such networking environments are commonplace in intranets, the Internet, offices, enterprise-wide computer networks and the like. In some embodiments, NIC 114 or a functionally analogous component includes logic to support direct memory access (DMA) transfers between processor memory 118 and other components.

In a networked environment, program components depicted relative to execution environment 102, or portions thereof, may be stored in a remote storage device, such as, on a server. It will be appreciated that other hardware and/or software to establish a communications link between the node illustrated by device 100 and other network nodes may be included.

Figure 2:
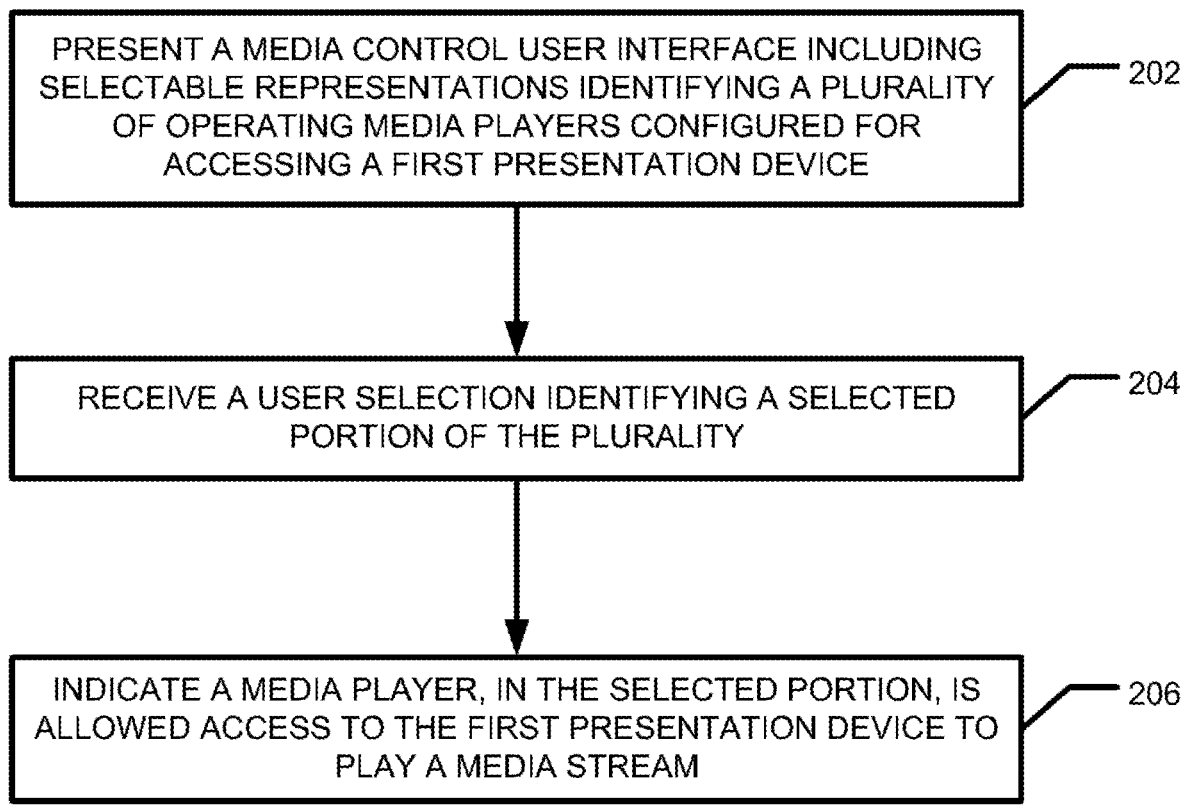
FIG. 2 is a flow diagram illustrating a method for controlling play of media streams according to an aspect of the subject matter described herein.
Figure 3:
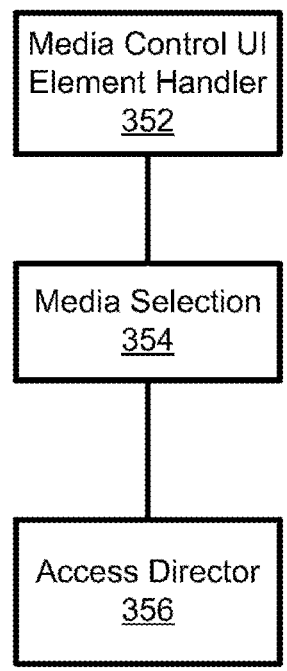
FIG. 3 is block a diagram illustrating an arrangement of components for controlling play of media streams according to another aspect of the subject matter described herein.

FIG. 2 is a flow diagram illustrating a method for controlling play of media streams according to an exemplary aspect of the subject matter described herein. FIG. 3 is a block diagram illustrating an arrangement of components for controlling play of media streams according to another exemplary aspect of the subject matter described herein. The method depicted in FIG. 2 may be carried out by some or all of the exemplary arrangements and their analogs.

A system for controlling play of media streams includes an execution environment, such as execution environment 102, including an instruction processing unit, such as processor 104, configured to process an instruction included in at least one of a media control user interface element handler component, a media selection component, and an access director component. The components illustrated in FIG. 3 and/or their analogs may be adapted for performing the method illustrated in FIG. 2 in a number of execution environments. A description is first provided in terms of execution environment 102.

With reference to FIG. 2, block 202 illustrates the method includes presenting a media control user interface including selectable representations identifying a plurality of operating media players configured for accessing a first presentation device. Accordingly, a system for controlling play of media streams includes means for presenting a media control user interface including selectable representations identifying a plurality of operating media players configured for accessing a first presentation device. For example, as illustrated in FIG. 3, media control user interface element handler component 352 is configured for presenting a media control user interface including selectable representations identifying a plurality of operating media players configured for accessing a first presentation device.

One or more output devices, such as display 130, and one or more input devices, such as input device 128, may be accessed in presenting and/or otherwise providing a media control user interface. An exemplary media control user interface is illustrated by media control sidebar 404 in browser window 402 in FIG. 4. Browser window 402 and media control sidebar 404 may be presented by one or more visual interface element handlers of a browser application included in applications 122.

Figure 4:
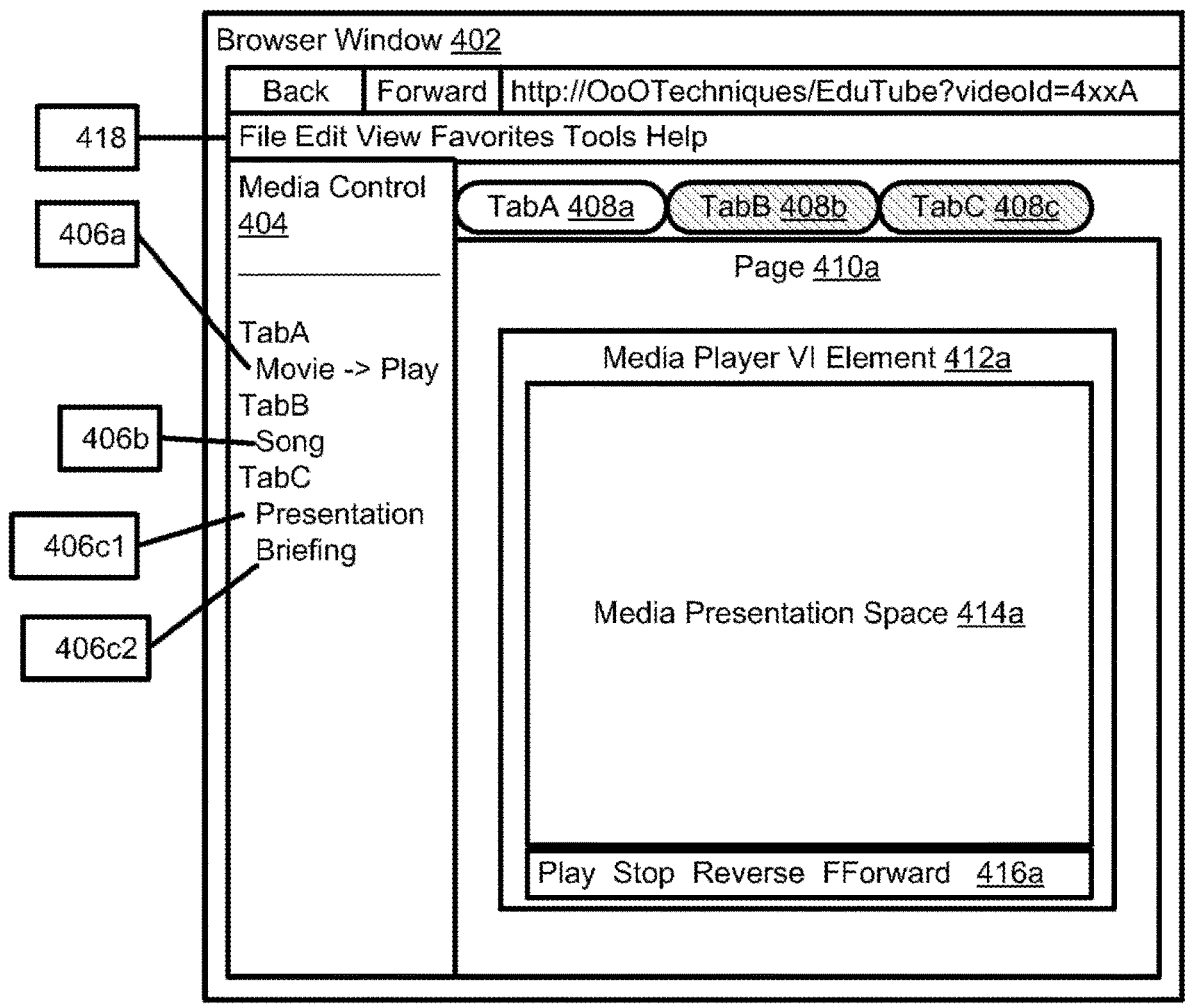
FIG. 4 is a diagram illustrating a user interface presented by a display according to an aspect of the subject matter described herein.

The visual components of the user interface in FIG. 4 are referred to herein as visual interface elements. A visual interface element may be a visual component of a graphical user interface (GUI). Exemplary visual interface elements include windows, textboxes, various types of button controls including check boxes and radio buttons, sliders, list boxes, drop-down lists, spinners, various types of menus, toolbars, ribbons, combo boxes, tree views, grid views, navigation tabs, scrollbars, labels, tooltips, text in various fonts, balloons, and dialog boxes. A media control user interface may include one or more of the exemplary elements listed. Those skilled in the art will understand that this list is not exhaustive. The terms visual representation, visual component, and visual interface element are used interchangeably in this document.

Other types of user interface components, also referred to as user interface elements, include audio output components referred to as audio interface elements, tactile output components referred to a tactile interface elements, and the like.

A visual interface (VI) element handler (VIEH) component, as the term is used in this document, includes a component configured to send information representing a program entity for presenting a visual representation of the program entity by a display. The visual representation is presented based on the sent information. The sent information is referred to herein as representation information.

Representation information includes data in one or more formats including image formats such as JPEG, video formats such as MP4, markup language data such as HTML and other XML-based markup, and/or instructions such as those defined by various script languages, byte code, and/or machine code. For example, a web page received by a browser from a remote application provider may include HTML ECMAScript, and/or byte code for presenting one or more user interface elements included in a user interface of the remote application.

Components configured to send information representing a program entity for presenting other types of output representations by other types of presentations devices include audio interface element handlers, tactile interface element handlers, and the like.

A program entity is an object included in and/or otherwise processed by an application or other program component. A representation of a program entity may be represented and/or otherwise maintained in a presentation space.

As used in this document the term presentation space refers to a storage region allocated and/or otherwise provided for storing an audio, visual, tactile, and/or other sensory data component for presentation on a presentation device. For example a buffer for storing a video frame is a presentation space. A presentation space may be contiguous or non-contiguous. A presentation space may have a virtual as well as a physical representation. A presentation space may include a storage location in processor memory, secondary storage, a memory of a presentation adapter device, and storage medium of the first presentation device. A screen of a display is another example of a presentation space.

A presentation device may be included in an execution environment hosting an adaptation of the arrangement of components in FIG. 3 or an analog of the arrangement. Alternatively or additionally, a presentation device may be accessed via a network and may be included in and/or otherwise operatively coupled to a node included in and/or otherwise providing another execution environment.

A presentation device for presenting a media stream and/or for presenting some or all of a media control user interface may be a visual, audio, tactile, and other device for presenting a human detectable output. In addition to and/or instead of display devices, audio devices are commonly included in and/or operatively coupled to many devices and network nodes. Some devices include and/or are operatively coupled to presentation devices that provide tactile output and are configured to play streams of tactile data. A few devices currently exist that are configured to emit odors that users may smell. Odor data can be provided as a stream. Thus in various aspects a presentation device may include a visual, an audio, tactile, and/or odor producing presentation device. Correspondingly, exemplary media streams include a video or image data stream, an audio stream, and a stream of other presentable sensory data.

As used herein, the term media player refers to a component and/or an arrangement of components configured to present a media stream on a presentation device. A media player may include software and/or hardware components configured to access one or more types of presentation devices. Access may be direct and/or indirect. An audio player, video player, and/or or other media player type may process and play audio data, video data, and/or other media data, respectively, in a compressed and/or uncompressed format. A multimedia player includes and/or otherwise controls more than one media player for playing different types of media streams together and sometimes in a synchronized manner. A movie player is an example of a multimedia player.

Media streams may be included in a media container. Exemplary audio container formats include WAV, AIFF, and XMF. Exemplary container formats for video data include 3GP, ASF, MP4, and OGG. Containers for video formats often are defined to include audio and other type of data streams.

An operating media player is a media player that has received a request or has otherwise been instructed to access an identified media stream to play on a presentation device. An operating media player remains an operating media player in various states of processing the identified media stream. Exemplary processing states include an initialization state including preparation and/or initialization for playing the identified media stream; a play state for playing the media stream; and a suspended state including pausing and/or seeking prior to, during, and/or after a play state, A selectable representation includes a user interface element that may be associated with a detected user input event for selecting a media player represented and/or otherwise identified by the selectable representation. Exemplary visual interface elements that may include and/or may be selectable representations include windows, dialog boxes, textboxes, various types of button controls including check boxes and radio buttons, list boxes, drop-down lists, spinners, list items, menus, menu items, toolbars, ribbons, combo boxes, tree views, and grid views. Those skilled in the art will understand that this list is not exhaustive.

The exemplary media control user interface, media control sidebar 404, includes media identifiers 406 as selectable representations identifying media streams of a number of operating media players presented in tabs 408. For example, tabA 408*a* includes page 410 visual interface element including a media player visual interface element 412*a* illustrating a user interface of a media player operating in and/or with the browser application.

Media player visual interface element 412*a* includes a presentation space, media presentation space 414*a*, for presenting a video stream played by the media player via display 130. Media identifier 406*a* identifies a movie playing and/or requested for playing in media presentation space 414*a*. Media identifier 406*a* identifies a movie multi-media player included in and/or otherwise interoperating with a web application provider of media page 410. The exemplary movie multi-media player includes a video media player for accessing display 130 and an audio media player for accessing audio presentation device (not shown).

Similarly, media identifier 406*b* is a selectable representation of an operating audio media player included in and/or otherwise interoperating with an application providing content for tabB 408*b*. The operating audio media player has been requested and/or otherwise instructed to access the audio presentation device to play the song identified by media identifier 406*b*. Media identifiers 406*c* are respective selectable representations of an operating video media player and an operating audio media player included in and/or otherwise interoperating with an application providing content for tabC 408*c*. The operating video media player associated with tabC 408*c* is configured to access display 130 device to play a video of a corporate presentation identified by media identifier 406*c*1. The operating audio media player identified by media identifier 406*c*2 and associated with tabC 408*c* is configured to access the audio presentation device to play the audio portion of a briefing associated with the presentation.

Returning to FIG. 4, media control sidebar 404 may be updated with a selectable representation of an operating media player in a new tab (not shown) and/or an operating media player in one or more of tabs 408 when the operating media player is detected and/or otherwise identified. The selectable representation of the detected operating media player may be added to media control sidebar 404. When a media player is no longer operating, a corresponding selectable representation in media control sidebar 404 may be removed.

For example, if a user input is received that results in closing tabB 408*b*, media identifier 406*b* is removed from media control sidebar 406. Presenting a media control user interface may include adding a selectable representation of an operating media player to and/or removing a selectable representation identifying a media player from the media control user interface.

Presenting a media control user interface may include opening, resizing, restoring from a minimized state, assigning input focus to, and changing a z-order attribute of a user interface element included in the media control user interface.

A selectable representation of an operating media player may identify an operating media player directly and/or indirectly. In FIG. 4, operating media players are identified by corresponding media streams. A representation of a media container including more than one media stream identifies the operating media players that are configured to present the media streams in the container.

Media control sidebar 404 is presented so that a user may provide input corresponding to any of various user interface elements illustrated in FIG. 4 while media control sidebar 404 is also presented. In another aspect, a media control user interface may be modal forcing a user to interact with the media control user interface while it is presented.

As described above, a selectable representation may be added to a media control user interface in response to detecting an operating media player. An operating media player may be detected based on an access for a presentation device for playing a media stream via the presentation device by the operating media player. A selectable representation may be removed in response to detecting and/or otherwise determining the represented operating media player is no longer operating. Thus, a media control user interface may be presented in response to a detected event. Presenting includes updating the selectable representations and/or opening, resizing, restoring from a minimized state, assigning input focus to, and changing a z-order attribute of a user interface element included in the media control user interface in response to a detected event.

A detected event may be associated with a media control user interface in a number of ways. A particular user input may be configured as a hot key for indicating a media control user interface is to be presented. For example, some or all of the content presented in tabC 408*c* may be retrieved while tabC 408 is behind another tab 408. The content may include an operating media player and/or otherwise cause a media player to become operational to play a media stream included in and/or otherwise accessible via the content. A script included in the content may automatically instruct the operating media player to begin playing the media stream. The user may be watching a movie played by an operating media player in media presentation space 414*a* in tabA 408*a*. User input for the hotkey may be received from the user to present media control sidebar 404 allowing the user to control which operating media players may play their corresponding streams.

An event associated with an operating media player may be detected by an operating media player; a component of a presentation subsystem, such as a graphics library; a presentation adapter, such a display adapter 112; a presentation device, such as display 130; one or more applications 122, such as the internet browser presenting browser window 402 in FIG. 4; and a client operating in an internet browser of a network application provider and/or the network application provider as described above with respect to FIG. 4.

An event may be detected by a component based on one or more interprocess communication mechanisms such as a hardware interrupt, a software interrupt, a pipe, and/or a message queue. An event may be detected base on a message received via a network such as request from a browser and/or a response from a server hosted application. An event may be detected based on a function and/or method call to an event detecting component and/or other process including execution of a machine code branch instruction.

In an aspect, an event associated with a media control user interface includes detecting an access to a presentation device. Detecting an event may include detecting access to a first presentation device by a first operating media player to play a media stream while another operating media player in the plurality is playing a media stream via the first presentation device. The event may be detected as and/or otherwise based on an access to a resource for playing the media stream by the first operating media player via the first presentation device.

Exemplary resources in various aspects that may be included in an operating media player access to a presentation device include one or more of a semaphore; a lock; a presentation space such as display and/or audio buffer; a component of a user interface subsystem and/or library; a component of a user interface element; a component of an audio subsystem and/or library; a display adapter and/or resource of a display adapter; a display device and/or resource of a display device; an audio adapter and/or resource of an audio adapter, an audio presentation device and/or resource of an audio presentation device; a tactile output subsystem and/or resource of a tactile output subsystem; a tactile output device and/or resource of a tactile output device; an access control component and/or resource of an access control component; a serialization component; and/or a resource of a serialization component; and/or a synchronization component and/or resource of a synchronization component.

In various aspects, an event associated with an access to a presentation device by an operating media player may be detected by access director component 356 and/or an analog. Access detector component 356 may be included in an operating media player application included in applications 122; program libraries 126; operating system 120; a communications component for sending and/or receiving a media stream and/or for sending and/or receiving a resource for accessing a presentation device; an input processing component configured to detect an input for accessing a presentation device; display adapter 112 and/or other presentation adapter(s); a presentation device driver; the presentation device accessed, an internet browser, a client of a network application operating in and/or or otherwise processed by the internet browser, the network application, and a proxy mediating communication between the network application and the browser.

An access to a presentation device by an operating media player may be detected via an access to any program addressable entity and/or resource included in accessing the presentation device. An access to a presentation device may be detected by any component included in the operation of accessing the presentation device.

For example, in FIG. 1 an application 122 may receive an indication such as a user input detected by input device 128 to present data on display 130. In receiving the indication, an access to display 130 may be detected. Access to a corresponding presentation device may be detected via an application 122 access of a function, a method, a data element, and/or other program entity included in and/or otherwise processed by a program library 126 and/or operating system 122 to play a media stream. For example, access to a memory location for buffering a media stream may be detected. In certain contexts, such an access is included in accessing display 130 and/or display adapter 112.

Those skilled in the art will see based on the descriptions included this document that access director component 356 may be included in and/or interoperate with any component configured to prepare for and/or access a presentation device, and/or configured to access a resource processed in accessing a presentation device. For example, in various aspects, access director component 356 and/or an analogs may be included in a media player application included in applications 122; program libraries 126; operating system 120; a communications component for sending and/or receiving a media stream and/or for sending and/or receiving a resource for accessing a presentation device; an input processing component configured to detect an input for accessing a presentation device; display adapter 112 and/or other presentation adapter(s); a presentation device driver; the presentation device accessed, an internet browser, a client of a network application operating in and/or or otherwise processed by the internet browser, the network application, and a proxy mediating communication between the network application and the browser.

In another aspect, access director component 356 and/or media control user interface element handler component 352 may be a configured to be informed of an access and/or access attempt rather than or in addition to being a component included in accessing a presentation device. For example, media control user interface element handler component 352 or an analog may be informed of an access to a presentation device by a component providing a resource and/or service for accessing the presentation device and/or a component configured to access the presentation device directly. Access director component 356 and/or media control user interface element handler component 352 may be a routine that is called prior to and/or during an access of a presentation device.

Returning to FIG. 2, block 204 illustrates the method further includes receiving a user selection identifying a selected portion of the plurality. Accordingly, a system for controlling play of media streams includes means for receiving a user selection identifying a selected portion of the plurality. For example, as illustrated in FIG. 3, media selection component 354 is configured for receiving a user selection identifying a selected portion of the plurality.

A user selection of one or more selectable representations, such as one or more media identifiers 406 in FIG. 4, may be received by media selection component 354, in response to one or more user inputs detected by input device 128. FIG. 4 illustrates a user selection corresponding to media identifier 406a. Media identifier 406a identifies one or more media players based on the number and type of media streams included in the represented movie. Movies typically include multiple streams such as an audio stream and a video stream. A corresponding movie playing application may include an operating media player for the audio stream and an operating media player for the video stream. The two operating media players may be included in a single application or separate applications.

In an aspect, media selection component 354 and/or media control user interface element handler component 352 may limit the number of selectable representations identified in a user selection. For example, a user selection may be limited to a single selectable representation. A selectable representation may identify one or more operating media players. In FIG. 4, media control sidebar 404 may allow only one media identifier 406 to be selected at a time. Alternatively or additionally, media selection component 354 and/or media control user interface element handler component 352 may receive a user selection via a media control user interface that identifies a single operating media player in a user selection. In media control sidebar 404, media identifier 406a for the movie associated with tabA 408a may be represented as separate selectable representations for the audio player of the movie's audio stream and the video player for the movie's video stream.

In an aspect, media selection component 354 and/or media control user interface element handler component 352 may limit a user selection to one or more selectable representations that together identify a single operating media player per presentation device. In another aspect, the number of operating media players that can be identified via a user selection may vary determined by media selection component 354 and/or media control user interface element handler component 352 based on the type of media stream. For example, a user selection may identify multiple video players but only a single audio player. What a user selection may contain may be configurable by a user.

In an aspect, a user selection may identify presentation media identifier 406c1 in response to a user input. The presentation media identifier identifies a video operating media player associated with content of tabC 408c. A user input for selecting song audio media identifier 406b may be detected identifying an audio operating media player for briefing audio media identifier 406c2 associated with content of tabB 408b. The user selection received via the user inputs identifies two operating media players with different media types that a user may consider compatible. That is, the user may view the video of presentation while listening to the song without perceiving the playing of the two media streams as interfering with one another.

If the user desired to listen to the audio portion of the presentation, the user may select the briefing media identifier 406c2 rather than the song media identifier 406, in order to identify an audio operating media player for the audio stream of a briefing that corresponds to the video of the presentation in which the briefing occurred and/or otherwise is associated with by tabC 408c.

A received user selection identifies one or more operating media players and media streams and may include all selectable representations. Selectable representation(s) not included in the user selection identify an unselected portion of operating media players. A user selection may identify selected operating media players and implicitly identify unselected operating media players or vice versa. A user selection may explicitly identify selected operating media players and unselected operating media players.

Alternatively or additionally, a selected operating media player may be identified in a user selection in response to a user input received via another application. For example, in FIG. 4. a user input corresponding to tabB 408b may be detected. The change in visibility of tabB 408b and tabA 408a may be detected by media selection component 354. The change may identify media identifier 406b is selected including information identifying the operating media player represented in a corresponding received user selection, and implicitly and/or explicitly identifying an operating media player represented by media identifier 406a as not selected.

Alternatively, the user may select tabB 408b to make it visible, and then select a play user interface control presented in content of tabB 408b. In response to receiving the play input, media selection component 354 may receive a user selection identifying the operating media player represented by media identifier 406b.

In an aspect, a user input may be received for closing tabA 408a. As result the selectable representation illustrated by media identifier 406a may be removed from media control sidebar 404. In a further aspect, all selectable representations may remain unselected until a user input is received. In another aspect, one or more operating media players with user interfaces that become visible as a result of closing tabA 408a may be identified by a user selection in response to the user input received to close tabA 408a.

In an aspect, a selectable representation presented in a media control interface may be associated with a particular input whether the media control user interface has input focus for the corresponding input device or not. A user selection may be received identifying the selectable representation in response to detecting the particular input. For example, in FIG. 4 the order the selectable representations 406 are presented in media control sidebar 404 may associate a number with each. Presentation media identifier 406c1 may be associated with the number 3, since it is listed as the third selectable representation. A press of a 3 key on a keyboard and/or keypad when detected with a second input such as an <alt> key press may identify presentation media identifier 406c1 identifying the operating media player it represents in a user selection received by media selection component 354.

In another aspect, an input may be defined to allow a user to navigate through the selectable representations whether the media control user interface has input focus or not. For example, a combination key sequence, such as an <F10> key and a directional key such as an up or down arrow may be defined to navigate through selectable representations whether the media control user interface has input focus or not. A selectable representation may be automatically included in a user selection received by media selection component 354 during navigation or additional user input may be required to include the current selectable representation in a user selection.

Returning to FIG. 2, block 206 illustrates the method yet further includes indicating a media player, in the selected portion, is allowed access to the first presentation device to play a media stream. Accordingly, a system for controlling play of media streams includes means for indicating a media player, in the selected portion, is allowed access to the first presentation device to play a media stream. For example, as illustrated in FIG. 3, an access director component 356 is configured for indicating a media player, in the selected portion, is allowed access to the first presentation device to play a media stream.

In FIG. 3, access director component 356 may indicate a media player identified by a user selection is allowed to access a presentation device to play a media stream in a variety of ways. Analogously, access director component 356 may indicate a media player not identified as selected in the user selection is not allowed access to a presentation device to play a media stream.

In an aspect, access director component 356 indicates access is allowed by calling and/or otherwise instructing an operating media player identified as selected by a user selection to change its mode of operation to play mode. Similarly, access director component 356 may instruct the operating media player to enter a mode other than play mode in indicating access is not allowed for playing a media stream.

In another aspect, access director component 356 may detect access by an operating media player to a first presentation device by being a component included in and/or otherwise intercepting data sent from the operating media player to the presentation device. Access director component 356 may process the data for presentation as configured, and/or pass it along unprocessed for presenting by the presentation device, thus indicating the operating media player is allowed to play the media stream via the accessed presentation device.

In yet another aspect, access director component 356 may include and/or otherwise make use of a serialization mechanism such as a semaphore or lock. Access director component 356 may indicate access is allowed by not blocking and/or by unblocking a thread of execution for presenting a media stream of a selected operating media player on a presentation device. Alternatively or additionally, access director component 356 may indicate access is allowed by being included in and/or otherwise interoperating with a thread/process scheduler to put one or more threads of a selected operating media player for playing a media stream in a run state. Indicating access is not allowed may analogously be performed and/or otherwise provided for by access director component 356 by causing one or more threads for playing the first media stream to be blocked from and/or queued for execution by processor 104.

Indicating access is allowed may further include sending and/or receiving a message via a network to and/or from, respectively, a remote node where either the node hosting access director component 356 or the remote node is operatively coupled to a presentation device for presenting a media stream. Access director component 356 may be adapted to operate in a client node, a server node, and/or an intermediary node such as a proxy server. Indicating an operating media player is not allowed access to presentation device to play a media stream may be performed similarly.

Access director component 356 may control access to one or more resources requested by an operating media player for accessing a presentation device. A resource may be required for playing the stream and/or required for permission to play the stream. In various aspects, access director component 356 may indicate access is allowed by allowing access to any resource and/or otherwise providing information giving permission to access a presentation device. Analogously, in various aspects access director component 356 may indicate access is not allowed by preventing access to any requested resource for playing a media stream on a presentation device and/or otherwise providing information denying permission to access the presentation device.

In another aspect, selected operating media players identified in a user selection may be ordered. Access director component 356 may provide indications allowing access to a presentation device to the identified operating media players according to the order. For example, access may be serialized or controlled by some other type of access policy.

A media control user interface may be presented until a user selection is received, until a close input is received, and/or until a timeout of a timer associated with the media control user interface is detected. In response to receiving a user selection and/or the detected timeout, a media control user interface may be closed, minimized, have input focus removed, resized, and/or have an associated z-order attribute and/or other visual attribute changed.

Coordination and control of media streaming as described herein may prevent incomprehensible and sometimes unpleasant user experiences resulting from media streams playing simultaneously in an uncoordinated manner. Further, coordination and control of play of multiple media streams according to the subject matter described herein may save resources. For example, battery life may be extended in battery powered devices and less energy may be used in devices connected to an electricity grid.

The components illustrated in FIG. 3 may be adapted for performing the method illustrated in FIG. 2 in a number of execution environments. Adaptations of the components illustrated in FIG. 3 for performing the method illustrated in FIG. 2 are described operating in exemplary execution environment 502 illustrated in various aspects as execution environment 502a in FIG. 5a, execution environment 502b in FIG. 5b, and execution environment 502c in FIG. 5c. A further adaptation of the components illustrated in FIG. 3 for performing the method illustrated in FIG. 2 is described operating in exemplary execution environment 602 illustrated in FIG. 6.

FIG. 1 illustrates key components of an exemplary device that may at least partially provide and/or otherwise be included in an exemplary execution environment, such as those illustrated in FIG. 5a, FIG. 5b, FIG. 5c, and FIG. 6. The components illustrated in FIG. 3, FIG. 5a, FIG. 5b, FIG. 5c, and FIG. 6 may be included in or otherwise combined with the components of FIG. 1 to create a variety of arrangements of components according to the subject matter described herein. FIG. 7 illustrates a user node 702 as an exemplary device included in and/or otherwise adapted for providing any of execution environments 502 illustrated in FIG. 5a, FIG. 5b, and FIG. 5c each illustrating a different adaptation of the arrangement of components in FIG. 3. As illustrated in FIG. 7, user node 702 is operatively coupled to network 704 via a network interface, such as NIC 114. Alternatively or additionally, an adaptation of execution environment 502 includes and/or is otherwise provided by a device that is not operatively coupled to a network.

Figure 5A:
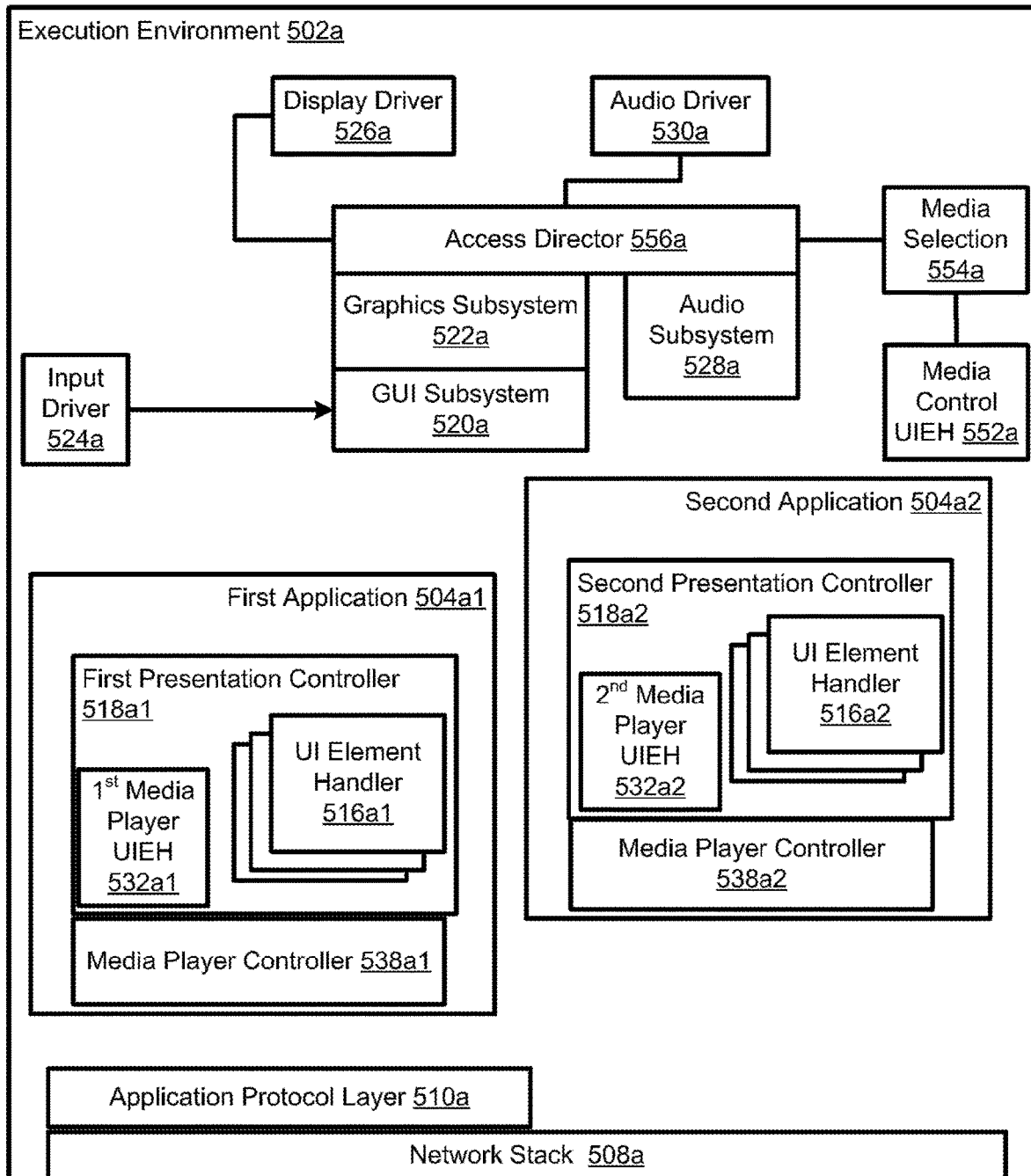
FIG. 5a is a block a diagram illustrating an arrangement of components for controlling play of media streams according to another aspect of the subject matter described herein.

FIG. 5a illustrates an adaptation of the arrangement of components in FIG. 3 configured to interoperate with various presentation components provided by execution environment 502a. The arrangement is illustrated operating external to operating media player applications illustrated as first application 504a1 and second application 504a2.

Figure 5B:
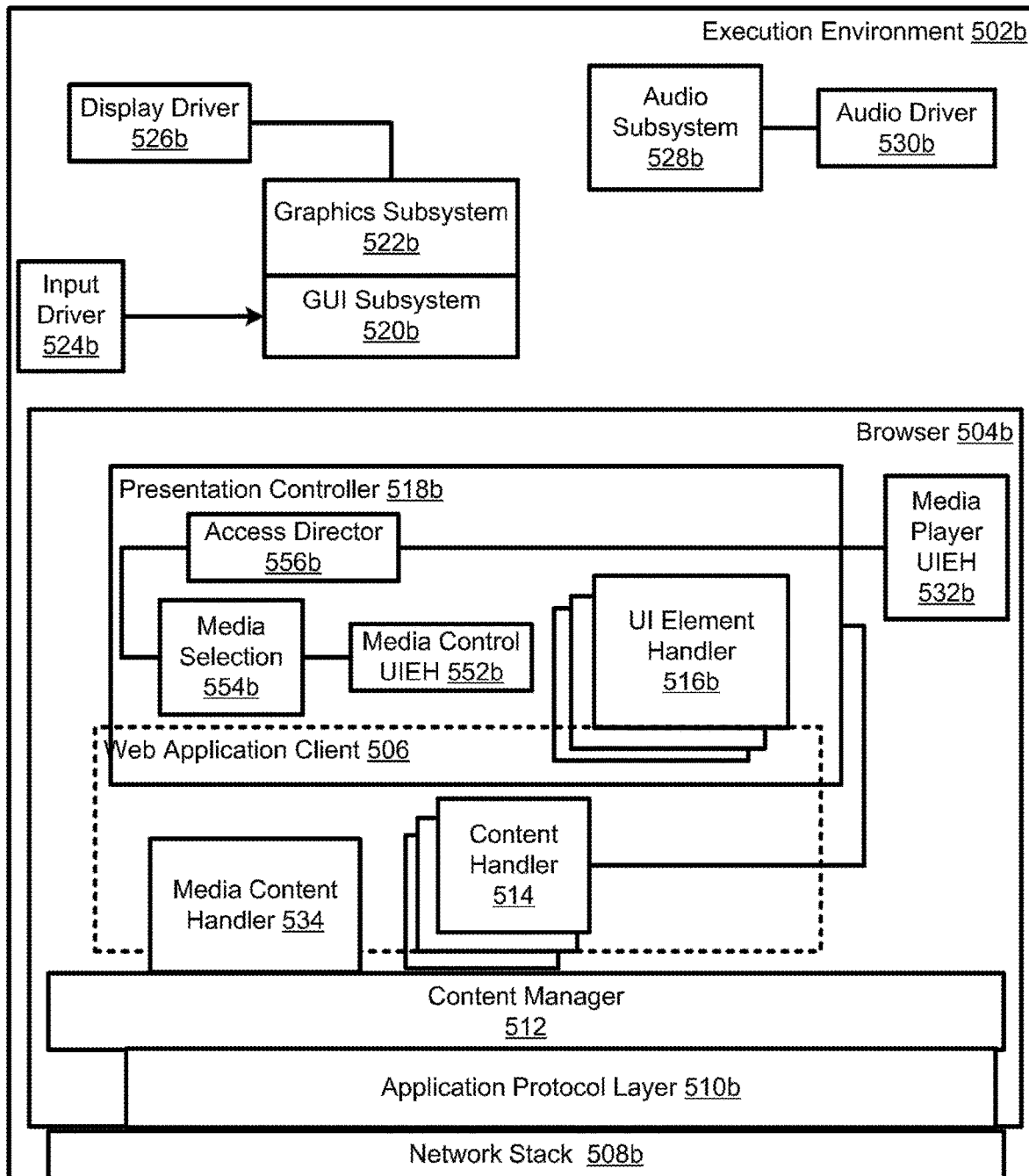
FIG. 5b is a block a diagram illustrating an arrangement of components for controlling play of media streams according to another aspect of the subject matter described herein.

FIG. 5b illustrates an adaptation of the arrangement of components in FIG. 3 operating as browser components or components of a browser extension such as a plug-in. Application 504b is illustrated as a browser operating in execution environment 502b providing at least part of an execution environment for web application client 506 received from a remote application provider. FIG. 5b also illustrates an adaptation or analog of the components in FIG. 3 operating at least partially external to one or more web applications serviced by the arrangement and browser 504b.

Figure 5C:
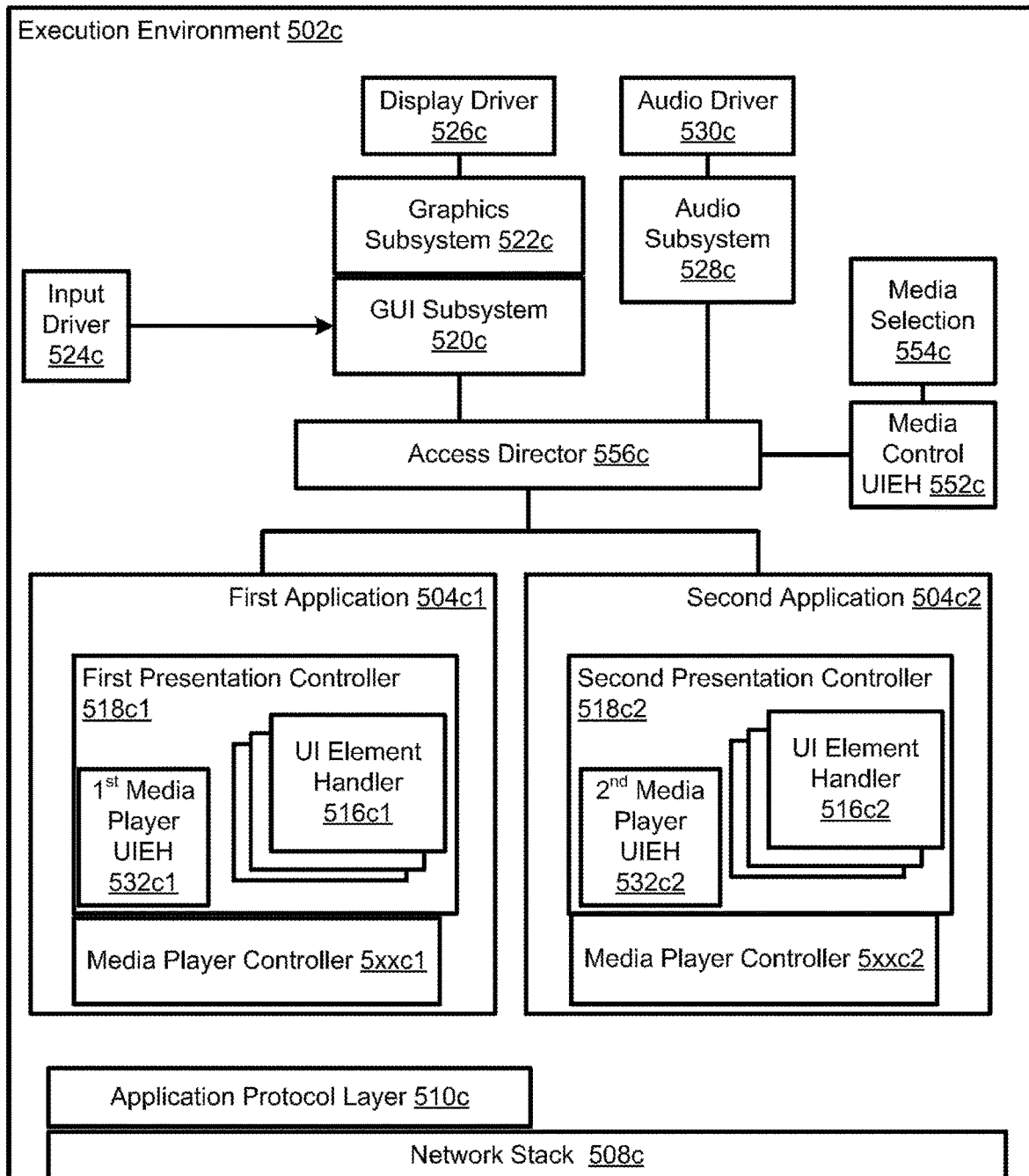
FIG. 5c is a block a diagram illustrating an arrangement of components for controlling play of media streams according to another aspect of the subject matter described herein.

FIG. 5c illustrates an arrangement of components in FIG. 3 adapted to operate as an interceptor of communications between operating media player applications illustrated as first application 504c1 and first application 504c2, and various presentation components provided by execution environment 502c.

Component identifiers including letters in their identifiers in the figures are referred to collectively using the respective identifiers without the postfix including the letters and are, in some cases referred to generically across the figures in the same manner when the including description may apply to some or all adaptations of components.

Figure 6:
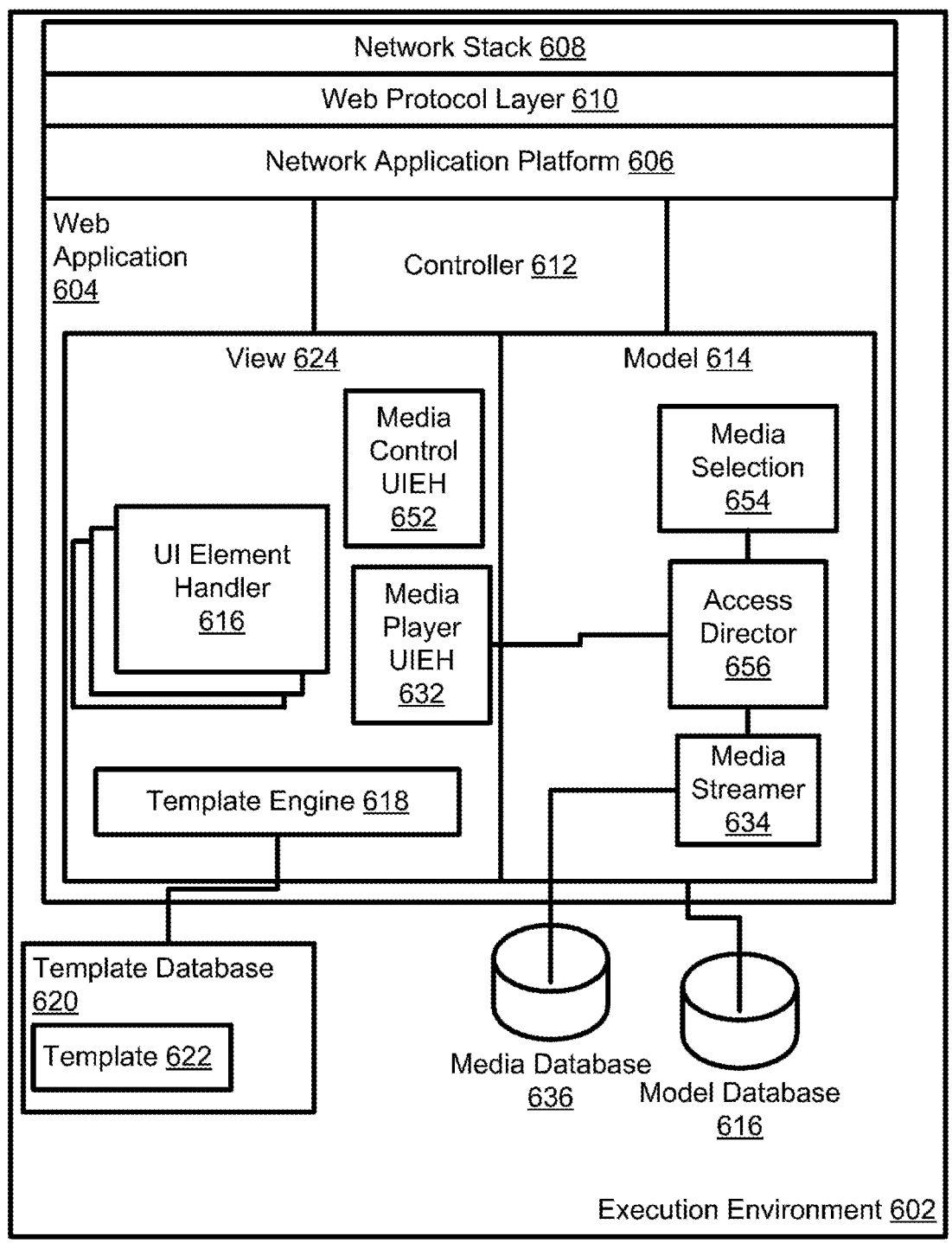
FIG. 6 is a block a diagram illustrating an arrangement of components for controlling play of media streams according to another aspect of the subject matter described herein.
Figure 7:
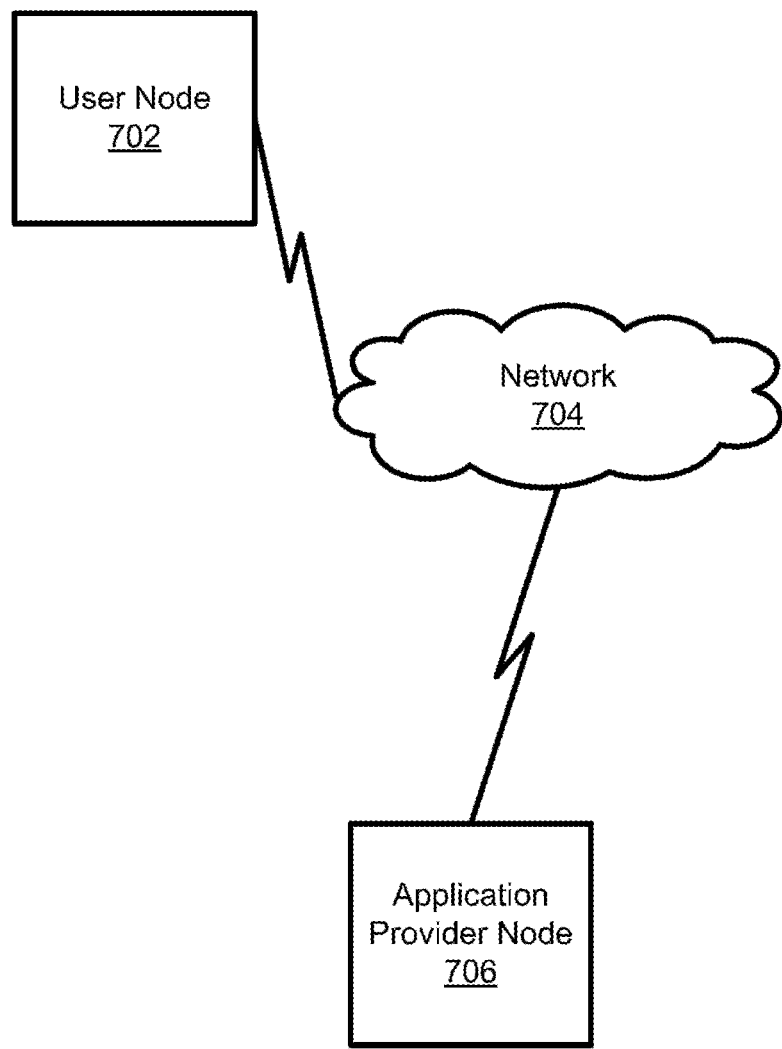
FIG. 7 is a network diagram illustrating an exemplary system for controlling play of media streams according to an aspect of the subject matter described herein.

FIG. 6 illustrates a remote application provider as web application 604 hosting yet another adaptation or analog of the arrangement of components in FIG. 3. Network application platform 606 may include a web server and/or a network application framework known to those skilled in the art.

Execution environment 502 as illustrated in FIG. 5a, FIG. 5b, and in FIG. 5c may include and/or otherwise be provided by a device such as user node 702 illustrated in FIG. 7. User node 702 may communicate with one or more application providers, such as network application platform 606 operating in execution environment 602. Execution environment 602 may include and/or otherwise be provided by application provider node 706 in FIG. 7. User node 702 and application provider node 706 may each include a network interface operatively coupling each respective node to network 704.

FIG. 5a, FIG. 5b, and in FIG. 5c illustrate network stacks 508 configured for sending and receiving messages over a network, such as the Internet, via the network interface of a user node 702. FIG. 6 illustrates network stack 608 serving an analogous role in application provider node 706. Network stack 508 and network stack 608 may support the same protocol suite, such as TCP/IP, or may communicate via a network gateway or other protocol translation device and/or service. Application 504b in FIG. 5b and network application platform 606 as illustrated in FIG. 6 may interoperate via their respective network stacks; network stack 508 and network stack 608.

FIG. 5a, FIG. 5b, FIG. 5c illustrate applications 504, and FIG. 6 illustrates web application 604, respectively, which may communicate via one or more application layer protocols. FIG. 5a, FIG. 5b, and FIG. 5c illustrate application protocol layer 510 exemplifying one or more application layer protocols. Exemplary application protocol layers include a hypertext transfer protocol (HTTP) layer and instant messaging and presence protocol, XMPP-IM layer. FIG. 6 illustrates a compatible application protocol layer as web protocol layer 610. Matching protocols enabling user node 702 to communicate with application provider node 706 via network 704 in FIG. 7 are not required if communication is via a protocol gateway or other translator.

In FIG. 5b, application 504b may receive web application client 506 in one more messages sent from web application 604 via network application platform 606 and/or sent from web application 604 via network application platform 606 via the network stacks, network interfaces, and optionally via an application protocol layer in each respective execution environment. In FIG. 5b, application 504b includes content manager 512. Content manager 512 may interoperate with one or more of the application layer components 510b and/or network stack 508b to receive the message or messages including some or all of web application client 506.

Web application client 506 may include a web page for presenting a user interface for web application 604. The web page may include and/or reference data represented in one or more formats including hypertext markup language (HTML) and/or markup language, ECMAScript or other scripting language, byte code, image data, audio data, and/or machine code.

In an example, in response to a request received from browser 504b, controller 612, in FIG. 6, may invoke model subsystem 614 to perform request specific processing. Model subsystem 614 may include any number of request processors for dynamically generating data and/or retrieving data from model database 616 based on the request. Controller 612 may further invoke template engine 618 to identify one or more templates and/or static data elements for generating a user interface for representing a response to the received request. FIG. 6 illustrates template database 620 including an exemplary template 622. FIG. 6 illustrates template engine 618 as a component of view subsystem 624 configured for returning responses to processed requests in a presentation format suitable for a client, such as browser 504b. View subsystem 624 may provide the presentation data to controller 612 to send to application 504b in response to the request received from application 504b. Web application client 506 may be sent to application 504b via network application platform 606 interoperating with network stack 608 and/or application layer 610.

While the example describes sending web application client 506, in response to a request, web application 604 additionally or alternatively may send some or all of web application client 506 to browser 504b via one or more asynchronous messages. An asynchronous message may be sent in response to a change detected by web application 606. A publish-subscribe protocol such as the presence protocol specified by XMPP-IM is an exemplary protocol for sending messages asynchronously in response to a detected change.

The one or more messages including information representing web application client 506 may be received by content manager 512 via one or more of the application protocol layers 510b and/or network stack 508b as described above. FIG. 5b illustrates browser 504b includes one or more content handler components 514 to process received data according to its data type, typically identified by a MIME-type identifier. Exemplary content handler components 514 include a text/html content handler for processing HTML documents; an application/xmpp-xml content handler for processing XMPP streams including presence tuples, instant messages, and publish-subscribe data as defined by various XMPP specifications; one or more video content handler components processing video streams of various types; and still image data content handler components for processing various images types. Content handler components 514 process received data and provide a representation of the processed data to one or more user interface element handlers 516b.

User interface element handlers 516 are illustrated in presentation controller 518 in FIG. 5a, FIG. 5b, and FIG. 5c. A presentation controller 518 may manage the visual, audio, and other types of output components of its including application as well as receive and route detected user and other inputs to components and extensions of its including application. A user interface element handler 516b in various aspects may be adapted to operate at least partially in a content handler 514 such as the text/html content handler and/or a script content handler. Additionally or alternatively a user interface element handler 516 may operate in an extension of its including application, such as a plug-in providing a virtual machine for script and/or byte code.

Figure 8:
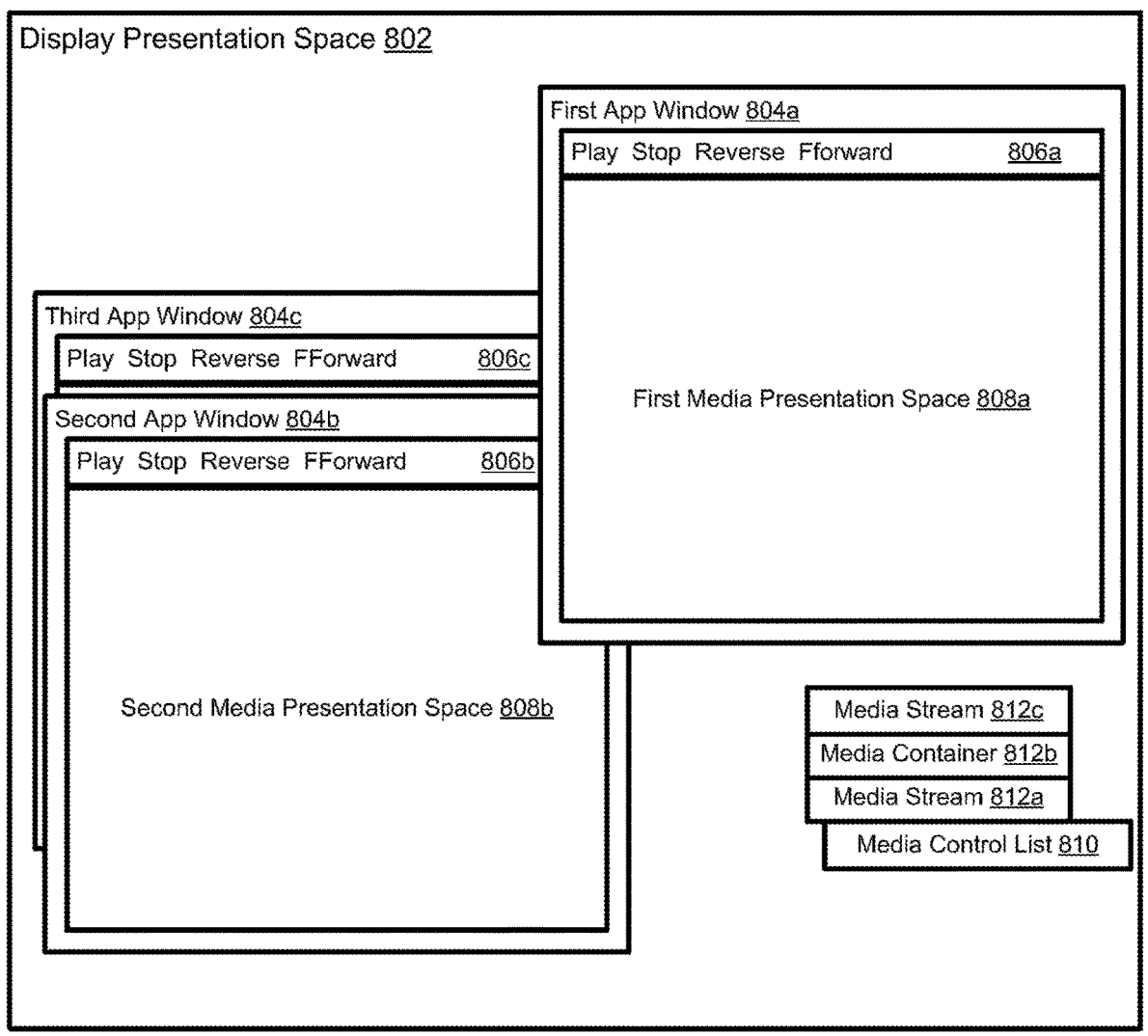
FIG. 8 is a diagram illustrating a user interface presented by a display according to an aspect of the subject matter described herein.

FIG. 8 illustrates a presentation space 802 of display 130 including application windows 804 of several operating media player applications 504, web application client 506, and/or web application 604. FIG. 8 is used to illustrate user interfaces of applications 504 operating in execution environments in FIG. 5a, FIG. 5b, and FIG. 5c and web application 604 in FIG. 6. In some contexts an execution environment in a specific figure is referred to and in other contexts the user interfaces of applications 504 are described as if the execution environments in FIG. 5a, FIG. 5b, and FIG. 5c are a single execution environment 502.

Application windows 804 illustrate a number of user interface elements commonly found in media player user interfaces. Application windows 804 include respective command bars 806 with input controls for receiving user input to change the operational state of the respective operating media players represented. Application windows 804 also include respective user interface elements providing respective presentation spaces 808 for presenting video media streams. Second App Window 804b may be a browser window or tab presented by browser 504b in FIG. 5b. Second app window 804b may include a user interface of a web application provided by a remote node, such as web application 604 in application provider node 706.

The various user interface elements of applications 504 and web application 604 described above are presented by one or more user interface element handlers 516, 616. In an aspect illustrated in FIG. 5a, FIG. 5b, and in FIG. 5c, a user interface element handler 516 of one or more of the applications 504 is configured to send representation information representing a visual interface element, such as command bar 806 illustrated in FIG. 8, to GUI subsystem 520. GUI subsystem 520 may instruct graphics subsystem 522 to draw the visual interface element in a region of display presentation space 802 in FIG. 8, based on representation information received from a corresponding user interface element handler 516.

Input may be received corresponding to a user interface element via input driver 524. For example, a user may move a mouse to move a pointer presented in display presentation space 802 over an operation identified in command bar 806. The user may provide an input detected by the mouse. The detected input may be received by GUI subsystem 520 via input driver 524 as an operation indicator based on the association of the shared location of the pointer and the operation identifier in display presentation space 802.

FIG. 5a-c illustrate media control user interface element handler components 552 as adaptations of and/or analogs of media control user interface element handler component 352 in FIG. 3. One or more media control user interface element handler components 552 may operate in execution environment 502. Accordingly, a system for controlling play of media streams includes means for presenting a media control user interface including selectable representations identifying a plurality of operating media players configured for accessing a first presentation device. For example, as illustrated in FIG. 5a-c, media control user interface element handler component 552 is configured for presenting a media control user interface including selectable representations identifying a plurality of operating media players configured for accessing a first presentation device.

FIG. 5a-c, FIG. 5b, and FIG. 5c illustrate various adaptations of media control user interface element handler component 552 in FIG. 3. Those skilled in the art will see based on the descriptions included this document that media control user interface element handler component 352 may be included in and/or interoperate with any component configured to generate and/or detect an event that, in response, invokes the execution of media control user interface element handler component 352 to present a media control user interface.

FIG. 5a, illustrates media control user interface element handler component 552a operatively coupled to and/or otherwise included in a layer in presentation subsystems of execution environment 502a. Graphics subsystem 522a may communicate with display driver 526a via access director component 556a to communicate with display adapter 128 and display 130 to present image data, such as frames of a video stream, on display 130. Audio subsystem 528a may communicate with audio driver 530a via access director component 556a, analogously. Presentation subsystems for other types of sensorial data may be configured similarly. Image and audio data may be presented as instructed by applications 504a in FIG. 5a.

First app window 804a in FIG. 8 illustrates an exemplary user interface presented by display 130 as directed by, for example, first application 504a1. Applications 504a in FIG. 5a are illustrated including media player user interface element handlers (UIEH) 532a configured to interoperate with GUI subsystem 520a and/or audio subsystem 528a to present one or more video and/or audio streams on display 130 and/or an audio presentation device (not shown), respectively.

Access director component 556a may intercept, receive, and/or otherwise detect one or more communications between graphics subsystem 522a and display driver 526a detecting an event including and/or based on an access to display 130 for playing a video stream by first media player UIEH 532a1 of first application 504a1 in first media presentation space 808a. Access director component 556a may intercept, receive, and/or otherwise detect one or more communications between audio subsystem 528a and audio driver 530a detecting access to the audio presentation device for playing an audio stream by, for example, second media player UIEH 532a2 of second application 504a2. One or more of applications 504a may include a multimedia player accessing display driver 526a and audio driver 530a via media control user interface element handler component 552a.

In response to an event based on detecting an access to a presentation device, access director component 556a may invoke media control user interface element handler component 552a to present a media control user interface. The invocation may be direct or indirect via another component, such as media selection component 554a.

An exemplary media control user interface is illustrated in FIG. 8 as media control list 810 presented in display presentation space 802. Display presentation space 802 may be provided by display 130 as a screen and/or a projected image. Media control list 810 may be presented by media control user interface element handler component 552a. As illustrated, media control list 810 includes selectable representations identifying operating media players as media identifiers 812 identifying media streams of a number of operating media players with visual interface elements in application windows 804.

For example, first app window 804a includes a media player visual interface element including command bar 806a and first media presentation space 808a for presenting a video stream played by an operating media player included in and/or interoperating with first application 504a. The operating media player in first application 504a1 includes first media player user interface handler 532a1 for controlling input and output, and media player controller 538a1 for receiving and processing a video stream for presenting via display 130. Media identifier 812a identifies the operating media player of first application 504a.

A selection representation may represent a media container including one or more media streams of one or more types. Thus a selection representation may represent more than one operating media player. Media container identifier 812b illustrates a selectable representation identifying a media container including a video stream for presenting in media presentation space 808b. Another media identifier 812c is also illustrated identifying a media stream and, thus, an operating media player for presenting a media stream associated with third app window 804c.

Returning to FIG. 8, media control list 810 may be updated with a selectable representation in response to detecting an access to a presentation device by an operating media player preparing to play a media stream on a presentation device. The selectable representation of the detected operating media player may be added to media control list 810. In an aspect, media control list may be hidden and/or minimized prior to detecting the access and presented, as illustrated in FIG. 8, in response to detecting the access event.

In an aspect, an event associated with media control list 810 includes an access to display 130 by first application 504b1. The event may be detected by access director component 556a. Another operating media player included in second application 504a2 may be playing a media stream in presentation space 802 in FIG. 8 while the event occurs and/or is otherwise detected. The event may be detected as and/or otherwise based on an access to a resource for playing the media stream, such a request for a buffer by graphics subsystem 522a to display driver 526a intercepted by access director component 556a.

In response to detecting the access, access director component 556a may interoperate, directly and/or indirectly with media control user interface element handler component 552a to present media control list 810 including a selectable representation of the detected operating media player.

FIG. 5b, illustrates media control user interface element handler component 552b included in browser 504b. Browser 504b may include one or more content handlers 514 for processing media streams and data in various formats as described above. Content handlers for streaming media data are illustrated as media content handler 534. A media content handler 534 may present a media stream on a presentation device via media player UIEH 532b. A browser may include one or more media player UI element handlers, just as it may include one or more media content handlers 534. A media player UIEH 532b may access a presentation device via interoperating with GUI subsystem 520b, audio subsystem 528b, and/or other sensorial presentation subsystem as described above.

In an aspect, at least part of a media player UIEH 532b may be included in web application client 506 provided by a remote application, such as web application 604 in FIG. 6 operating in application provider node 706 in FIG. 7. In another aspect, media player UIEH 532b may be included in an extension of browser 504b. Media player UIEH 532b is shown operating outside presentation controller 518b to illustrate media player UIEH 532b as an extension of browser 504b. In still another aspect, media player UIEH may be included in a media player application external to browser 504b.

In an aspect, media control sidebar 404 in FIG. 4 may be presented by media control user interface element handler component 552b. As described above, media control user interface element handler component 552b may present media control sidebar 404, in response to an event.

For example, a hotkey or a browser input control may be associated with media control sidebar 404. A corresponding user input may be received by input driver 524b and communicated to GUI subsystem 520b for identifying an application to process the input. GUI subsystem may identify browser 504b while browser window 402 and/or a visual component of browser window 402 has input focus. Media control user interface element handler component 552b may be invoked directly and/or indirectly by GUI subsystem 520b to present media control sidebar 404.

Additionally or alternatively, access director component 556b may mediate access between a media content handler 534 and a media player UIEH 532b in the various aspects to detect an event for presenting media control sidebar 404.

Access director component 556b may be included in presenting a media stream and/or otherwise may intercept, receive, or otherwise detect one or more communications between content handler 534 and media player UIEH 532b detecting access to a presentation device for playing a media stream by an operating media player, such as remote client application 506 and/or web application 604. In an aspect, remote client application 506 accesses media player UIEH 532b via access director component 556b to play a video stream in second media presentation space 414b (not visible) in tabB 408b in FIG. 4.

In response to detecting, the access director component 556b may interoperate with media control user interface element handler component 552b to present media control sidebar 404.

FIG. 5c illustrates media control user interface element handler component 552c operatively coupled to access director component 556c. Access director component 556c is illustrated as a layer between applications 504c and presentation subsystems of execution environment 502c. First application 504c1, for example, may communicate with GUI subsystem 520c to access display adapter 128 and display 130 to present a video. Second application 504c2 may communicate with audio subsystem 528c to access an audio presentation device via audio driver 530c to play an audio stream. Applications 504c may interoperate with presentation subsystems for other types of sensorial data and may be configured similarly.

Third app window 804c in FIG. 8 illustrates a user interface presented by display 130 as directed by, for example, first application 504c1. Applications 504c in FIG. 5c are illustrated including media player user interface element handlers 532c configured to interoperate with GUI subsystem 520c and/or audio subsystem 528c to, respectively, present one or more video and/or audio streams on display 130 and/or an audio presentation device (not shown). Access director component 556c may intercept, receive, or otherwise detect one or more communications between first application 504c1 and GUI subsystem 520c and/or audio subsystem 528c to detect access to display 130 for playing a video stream, for example by first media player UIEH 532c1 of first application 504c1 in third media presentation space 808c (hidden in FIG. 8). Access director component 556c may intercept, receive, or otherwise detect one or more communications between, for example, second application 504c2 and audio subsystem 528c detecting access to the audio presentation device for playing an audio stream by second media player UIEH 532c2. One or more of applications 504c may include a multimedia player accessing GUI subsystem 522c and audio subsystem 528c via access director component 556c. Access director component 556c may mediate access between an application 504c and a presentation subsystem, such as GUI subsystem 520c, to detect an event for presenting media control list 810.

Access director component 556c may be included in presenting a media stream and/or otherwise may intercept, receive, or otherwise detect one or more communications between a media player application, such as first application 504c1, and a presentation subsystem component, such as GUI subsystem 520c and/or audio subsystem 528c. Access director component 556c may detect access to a presentation device for playing a media stream by an operating media player by intercepting and/or otherwise mediating communication between application 504c1 and one or more presentation subsystem components. In response to detecting the access, access director component 556c may interoperate with media control user interface element handler component 552c to present media control list 810.

Alternatively or additionally, a user may provide an input for presenting media control list 810 in FIG. 8 via input driver 524 in FIG. 5a, FIG. 5b, and/or FIG. 5c. Input driver 524 may communicate input information, in response to detecting the user input, to GUI subsystem 520. GUI subsystem 520 may include a window manager (not shown) for coordinating the presentation of various user interface elements in display presentation space 802. When an input associated with media control list 810 is detected, GUI subsystem 520 may provide the input information and/or a representation of the input information to media control user interface handler 532 for processing. One or more user inputs may be defined to instruct media controller user interface handler 532 to update, change, and/or otherwise present media control list 810.

An event may include a change in a media player, such as change in a media player's operational state or mode. For example, a media player's operational state may change from play mode to pause mode halting access to a presentation device for presenting a media stream paused by the change in operational state. This may make the presentation device available for access by another operating media player among several operating media players. In response to the change in operational state, a media control interface may be presented to allow the user to select another media player from the several operational media players.

FIG. 5a-c illustrates media selection component 554 as an adaptation of and/or analog of media selection component 354 in FIG. 3. One or more media selection components 554 may operate in execution environment 502. Accordingly, a system for controlling play of media streams includes means for receiving a user selection identifying a selected portion of the plurality. For example, as illustrated in FIG. 5a-c, media selection component 554 is configured for receiving a user selection identifying a selected portion of the plurality.

A user selection of one or more selectable representations, such as one or more media identifiers 812, in FIG. 8, may be received by media selection component 554, in response to one or more user inputs detected by input driver 524, FIG. 8 illustrates no currently selected selectable representation in media control list 810. This may be the situation based on user desire and corresponding input to not select and/or unselect the selectable representations.

In an aspect, when a new operating media player accessing a particular presentation device is detected, the new operating media player may be paused and/or otherwise prevented from further access to the presentation device. This prevents, for example, audio streams from overplaying one another causing the user to miss part of one or more audio streams. The user is allowed to select which media streams or streams to allow access to the presentation device. Thus, when a new operating media player is detect, for example it may be preparing to play a media stream by requesting needed resources, it may be excluded from a current user selected portion of operating media players. Media control list 810 may be presented in response including a selectable representation of the new operating media player. The media player may be prevented and/or otherwise not allowed to play a media stream on a corresponding presentation device until it is selected and included in a received user selection.

In a further aspect, in response to detecting a new operating media player accessing a particular presentation device, all operating media players accessing the particular presentation device may be prevented further access to the particular device to play their respective media streams. The user is allowed to select which media player(s) to allow access to the presentation device. A new operating media player may be detected, for example preparing to play a media stream by requesting a needed resource. In either aspect, media control list 810 may be presented with a selectable representation for the newly detected operating media player in response to detecting the new operating media player. The media player may be prevented and/or otherwise not allowed to play a media stream on a corresponding presentation device until it is selected and included in a received user selection.

In an aspect, a user input may be received, causing a change in an attribute of an operating media player. For example, a user may select a user interface element of an operating media player application to make it visible from a hidden state behind another user interface element. In response to the user input, a user selection may be received identifying one or more operating media players based on the detected event. Other exemplary events include a change in an input focus attribute, a z-order attribute, a type of operating media player and/or media stream, and a measure for a user's ability to sense an output such as visibility measure for a media presentation space.

FIG. 5a-c illustrates access director component 556 as an adaptation of and/or analog of access director component 356 in FIG. 3. One or more access director components 556 may operate in execution environment 502. Accordingly, a system for controlling play of media streams includes means for indicating a media player, in the selected portion, is allowed access to the first presentation device to play a media stream. For example, as illustrated in FIG. 5a-c, access director component 556 is configured for indicating a media player, in the selected portion, is allowed access to the first presentation device to play a media stream.

In FIG. 5a, access director component 556a is illustrated operatively coupled to media selection component 554a. Access director component 556a may interoperate with media selection component 554a to receive information identifying a media player in the selected portion of the plurality of operating media players. Indicating access is allowed or not allowed may be perform in a variety of ways according to different aspects of the arrangement of components.

In one aspect illustrated in FIG. 5a, access director component 556a may indicate an operating media player is allowed to play a media stream by passing intercepted invocations and/or data to a driver for a targeted presentation device. In another aspect illustrated in FIG. 5b, access director component 556b may indicate an operating media player is allowed to play a media stream by passing intercepted data from media content handler 534 to media player UIEH 532b allowing access to the targeted presentation device(s). In still another aspect, in FIG. 5c, access director component 556c may indicate an operating media player is allowed to play a media stream by passing intercepted data from media player UIEH 532c to GUI subsystem 520a, graphics subsystem 522a, audio subsystem 528a, and/or other presentation components allowing access to the targeted presentation device(s).

Alternatively or additionally, in FIG. 5a, FIG. 5b, and FIG. 5c, access director component 556 may receive a request for permission to access a presentation device. Alternatively or additionally, presentation access component 556 may block or allow a requesting thread to run based on the user selection received by user selection component 554 as described above. In another aspect, access director component 556 may respond to a request for permission providing a play or a no-play parameter and/or indicator to the calling component. The calling component may access or not access a corresponding presentation device based on the parameter provided.

FIG. 6 illustrates media control user interface element handler component 652 as an adaptation of and/or analog of media control user interface element handler component 352 in FIG. 3. One or more media control user interface element handler components 652 may operate in execution environment 602. Accordingly, a system for controlling play of media streams includes means for presenting a media control user interface including selectable representations identifying a plurality of operating media players configured for accessing a first presentation device. For example, as illustrated in FIG. 6, media control user interface element handler component 652 is configured for presenting a media control user interface including selectable representations identifying a plurality of operating media players configured for accessing a first presentation device.

FIG. 6, illustrates media control user interface element handler component 652 included in view subsystem 624 of web application 604. Web application 604 may include one or more operating media players. In FIG. 6, a media player includes a media player UIEH 632 for providing a representation of media players for presentation on a client such as browser 504b operating in user node 702. An operating media player in web application 604 may further include a component, illustrated as media streamer 634.

One or more media streamers 634 may be configured for streaming media data to a remote client. A media streamer 634 may stream data to a user node 702 for presenting in a presentation device, such as display 130. The media stream data sent may be presented in a presentation space, such a media presentation space 414a in a media player user interface. The media player user interface may be presented by web application client 506 operating in browser 504b based on representation information provided by media player user interface element handler 632.

A web application may include one or more media player UIEHs 632, just as it may include one or more media streamers 634. A media player UIEH 632 may access a presentation device via communication with browser 504b and/or web application client 506 via network 704.

Media control sidebar 404 in FIG. 4 may be presented by user device 702 based on representation information sent by media control user interface element handler component 652 operating in application provider device 706. As describe above, media control user interface element handler component 652 may present media control sidebar 404 in response to an event.

For example, in FIG. 4 browser window 402 includes menu bar 418 with a "view" menu. A menu item in the "view" menu may be associated with media control sidebar 404. A corresponding user input may be received for the menu item by user device 702 and sent in a message to application provider device 706 via network 704 as described above. The message may be received by controller 612. Controller 612 may route the input information and/or information otherwise based on the detected input to media selection component 654. Media selection component 654 may provide information to media control user interface element handler 652 identifying operating media players. The information may identify selected and unselected operating media players. Media control user interface element handler 652 may generate representation information for media control sidebar 404 and send the representation information to browser 504b and/or web application client 506 to present media control sidebar 404.

Access director component 656 may be a component included in presenting a media stream and/or otherwise may intercept, receive, or otherwise detect one or more communications between content streamer 634 and media player UIEH 632 detecting access to a presentation device for playing a media stream by an operating media player.

In response to detecting, the access director component 656 may interoperate with media control user interface element handler component 652 to present media control sidebar 404.

FIG. 6, illustrates access director component 656 included in web application 604. Web application 604 may provide and/or identify a media stream to be played in a remote application client 506, illustrated in FIG. 5b. In one aspect, access director component 656 may be a request handler included in model subsystem 614. When a web application client that includes and/or references a media stream for playing on a client, such as user node 702, is detected, an operating media player access to a presentation device of user node 702 is detected.

In another aspect, access director component 652 may be configured to process a message from user node 702 informing web application of a detected access to a presentation device for playing a media stream.

Access director component 656 may detect operating media player accesses for media streams provided by and/or otherwise identified by web application 604. Access director component 656 may detect operating media player accesses for media streams provided by and/or otherwise identified by network applications interoperating with network application platform 606 and/or otherwise operating in execution environment 602.

Access director component 656 may be configured to operate in and/or with network application platform 606, in an aspect. In yet another aspect, access director component 656 may receive access information for detecting operating media player accesses to one or more presentation devices of a remote client, such as user device 702, to detect operating media player accesses for applications 504 operating in user device 702 other than and/or in addition to browser 504b.

Second app window 804b in FIG. 8 and browser window 402 both illustrate exemplary user interfaces presentable by display 130 as directed by web application 604 via web application client 506 in FIG. 5b. Access director 656 may be included in presenting a media stream and/or otherwise intercept, receive, or otherwise detect one or more communications between media streamer 634 and media player UIEH 632 detecting access to a presentation device for playing a media stream by an operating media player, such as remote client application 506. In an aspect, media player UIEH 632 generates and/or otherwise accesses some or all of web application client 506 to provide to browser 504b. A request for web application client 506 may be received. Media player UIEH 632 may be invoked to generate some or all of the response data. Accesses to media player UIEH 632 may be mediated via access director component 656 to play a video stream in media presentation space 414b in FIG. 4 or in second media presentation space 808b in FIG. 8 on display 130 of user device 702.

FIG. 6 illustrates media selection component 654 as an adaptation of and/or analog of media selection component 354 in FIG. 3. One or more media selection components 654 may operate in execution environment 602. Accordingly, a system for controlling play of media streams includes means for receiving a user selection identifying a selected portion of the plurality. For example, as illustrated in FIG. 6, media selection component 654 is configured for receiving a user selection identifying a selected portion of the plurality.

A user selection of one or more selectable representations, such as one or more media identifiers 406a, in FIG. 4, may be received by media selection component 654, in a message sent from user node 702, in response to one or more user inputs.

Operation of various adaptations of media selection components is described above. Operation of media selection component is analogous with communication via a network included in some aspects.

For example, as described above, in an aspect, a user input may be received, causing a change in an attribute of an operating media player in user node 702. A user may select tabB 408b in FIG. 4 to make it visible from a hidden state behind tabA 408a. In response to the user input, a message may be sent via network 704 in FIG. 7 to web application 604. The message may identify one or more media players included in and/or operating in association with content of tabB 408b. The information identifying the media player(s) may be received by media selection component 654. In response, media selection component 654 is configured to identify and/or otherwise receive identifiers of media players currently in the selected portion of operating media players it controls in user node 702. The selected portion of operating media players may include the media players in tabB 408b as included in the selection portion, and one or more media players associated with tabA 408a as not included in the selected portion based on the change in visible tabs.

FIG. 6 illustrates access director component 656 as an adaptation of and/or analog of access director component 356 in FIG. 3. One or more access director components 656 may operate in execution environment 602. Accordingly, a system for controlling play of media streams includes means for indicating a media player, in the selected portion, is allowed access to the first presentation device to play a media stream. For example, as illustrated in FIG. 6, access director component 656 is configured for indicating a media player, in the selected portion, is allowed access to the first presentation device to play a media stream.

In FIG. 6, access director component 656 may indicate an operating media player is allowed to play a media stream by passing intercepted invocations and data to media player UIEH 632 for a presenting on a presentation device of a client node, such as user node 702. In FIG. 6, access director component 656 may indicate an operating media player is allowed to play a media stream by passing intercepted data from media streamer 634 to media player UIEH 632.

Alternatively or additionally, in FIG. 6, access director component 556 may receive a request for permission to access media player UIEH 632, media streamer 634, and/or another component included in playing a media stream. Access director component 656 may block or allow a requesting thread to run based on whether a corresponding operating media player is included in a selected portion of a plurality of operating media players identified by media selection component 654. In another aspect, access director component 656 may respond to a request for permission providing a parameter and/or other indication that access is allowed or not allowed. The requesting component may access or not access a corresponding presentation device based on the return value and/or indication.

It is noted that the methods described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include in one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

Prior to describing the subject matter in detail, an exemplary device included in an execution environment that may be configured according to the subject matter is described. An execution environment is an arrangement of hardware and, optionally, software that may be further configured to include an arrangement of components for performing a method of the subject matter described herein.

Figure 9:
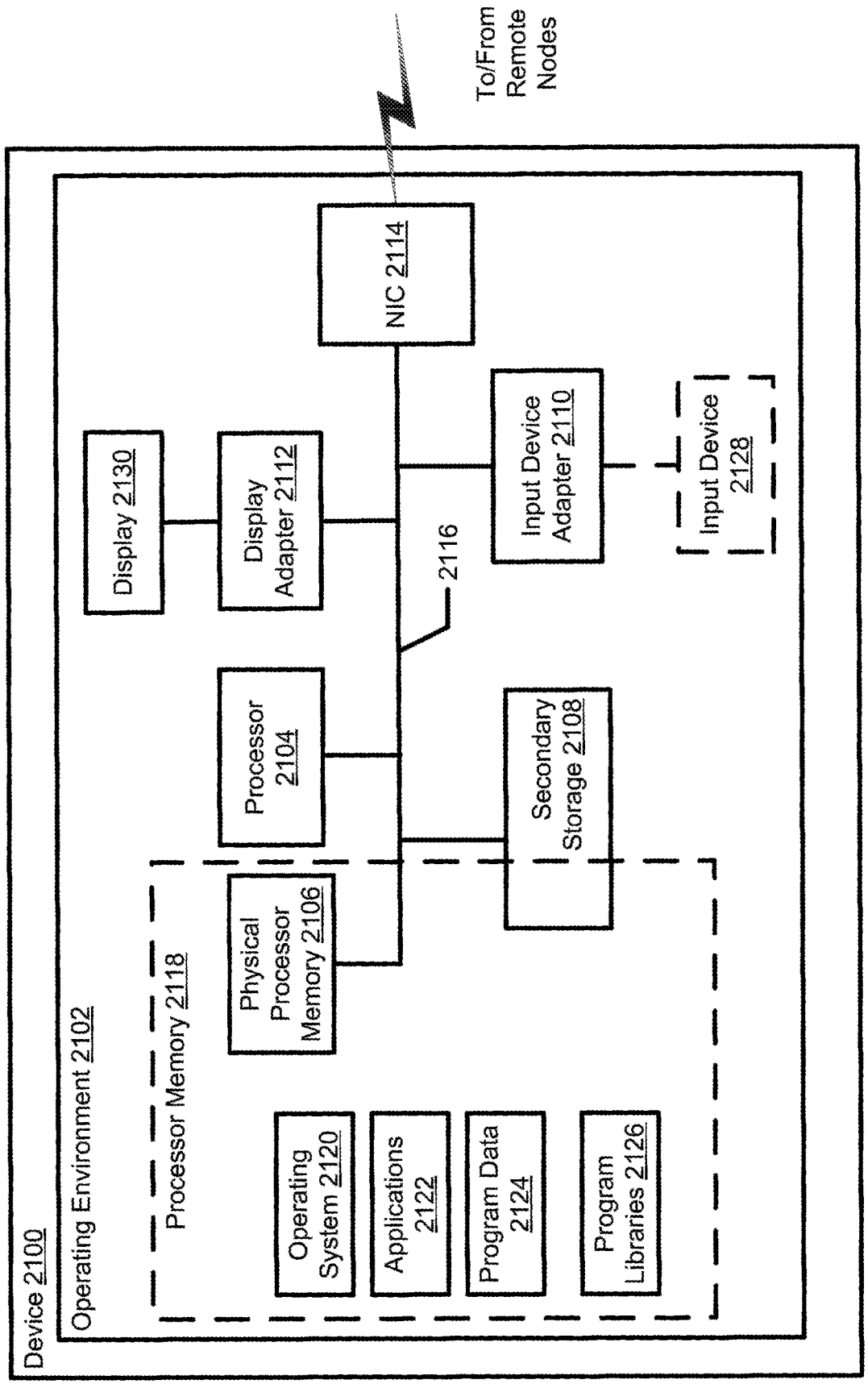
FIG. 9 is a block diagram illustrating an exemplary hardware device included in and/or otherwise providing an execution environment in which the subject matter may be implemented.

Those of ordinary skill in the art will appreciate that the components illustrated in FIG. 9 may vary depending on the execution environment implementation. An execution environment includes or is otherwise provided by a single device or multiple devices, which may be distributed. An execution environment may include a virtual execution environment including software components operating in a host execution environment. Exemplary devices included in or otherwise providing suitable execution environments for configuring according to the subject matter include personal computers, servers, hand-held and other mobile devices, multiprocessor systems, consumer electronic devices, and network-enabled devices such as devices with routing and/or switching capabilities.

With reference to FIG. 9, an exemplary system for configuring according to the subject matter disclosed herein includes hardware device 2100 included in execution environment 2102. Device 2100 includes an instruction processing unit illustrated as processor 2104; physical processor memory 2106 including memory locations that are identified by addresses in a physical address space of processor 2104; secondary storage 2108; input device adapter 2110; a presentation adapter for presenting information to a user illustrated as display adapter 2112; a communication adapter, such as network interface card (NIC) 2114, for communicating via a network; and bus 2116 that couples elements 2104-2114.

Bus 2116 may comprise any type of bus architecture. Examples include a memory bus, a peripheral bus, a local bus, a switching fabric, etc. Processor 2104 is an instruction execution machine, apparatus, or device and may comprise a microprocessor, a digital signal processor, a graphics processing unit, an application-specific integrated circuit (ASIC), a field programmable gate array (FPGA), etc.

Processor 2104 may be configured with one or more memory address spaces in addition to the physical memory address space. A memory address space includes addresses that identify corresponding locations in a processor memory. An identified location is accessible to a processor processing an address that is included in the address space. The address is stored in a register of the processor and/or identified in an operand of a machine code instruction executed by the processor.

FIG. 9 illustrates processor memory 2118 may have an address space including addresses mapped to physical memory addresses identifying locations in physical processor memory 2106. Such an address space is referred to as a virtual address space, its addresses are referred to as virtual memory addresses, and its processor memory is known as a virtual processor memory. A virtual processor memory may be larger than a physical processor memory by mapping a portion of the virtual processor memory to a hardware memory component other than a physical processor memory. Processor memory 2118 illustrates a virtual processor memory mapped to physical processor memory 2106 and to secondary storage 2108. Processor 2104 may access physical processor memory 2106 without mapping a virtual memory address to a physical memory address.

Thus at various times, depending on the address space of an address processed by processor 2104, the term processor memory may refer to physical processor memory 2106 or a virtual processor memory as FIG. 9 illustrates.

Program instructions and data are stored in physical processor memory 2106 during operation of execution environment 2102. In various embodiments, physical processor memory 2106 includes one or more of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Processor memory may also include nonvolatile memory technologies such as nonvolatile flash RAM (NVRAM), ROM, or disk storage. In some embodiments, it is contemplated that processor memory includes a combination of technologies such as the foregoing, as well as other technologies not specifically mentioned.

In various embodiments, secondary storage 2108 includes one or more of a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide volatile and/or nonvolatile storage of computer readable instructions, data structures, program components and other data for the execution environment 2102. As described above, when processor memory 2118 is a virtual processor memory, at least a portion of secondary storage 2108 is addressable via addresses in a virtual address space of the processor 2104.

A number of program components may be stored in secondary storage 2108 and/or in processor memory 2118, including operating system 2120, one or more applications programs (applications) 2122, program data 2124, and other program code and/or data components as illustrated by program libraries 2126.

Execution environment 2102 may receive user-provided commands and information via input device 2128 operatively coupled to a data entry component such as input device adapter 2110. An input device adapter may include mechanisms such as an adapter for a keyboard, a touch screen, a pointing device, etc. An input device included in execution environment 2102 may be included in device 2100 as FIG. 9 illustrates or may be external (not shown) to the device 2100. Execution environment 2102 may support multiple internal and/or external input devices. External input devices may be connected to device 2100 via external data entry interfaces supported by compatible input device adapters. By way of example and not limitation, external input devices may include a microphone, joystick, game pad, satellite dish, scanner, or the like. In some embodiments, external input devices may include video or audio input devices such as a video camera, a still camera, etc. Input device adapter 2110 receives input from one or more users of execution environment 2102 and delivers such input to processor 2104, physical processor memory 2106, and/or other components operatively coupled via bus 2116.

Output devices included in an execution environment may be included in and/or external to and operatively coupled to a device hosting and/or otherwise included in the execution environment. For example, display 2130 is illustrated connected to bus 2116 via display adapter 2112. Exemplary display devices include liquid crystal displays (LCDs), light emitting diode (LED) displays, and projectors. Display 2130 presents output of execution environment 2102 to one or more users. In some embodiments, a given device such as a touch screen functions as both an input device and an output device. An output device in execution environment 2102 may be included in device 2100 as FIG. 9 illustrates or may be external (not shown) to device 2100. Execution environment 2102 may support multiple internal and/or external output devices. External output devices may be connected to device 2100 via external data entry interfaces supported by compatible output device adapters. External output devices may also be connected to bus 2116 via internal or external output adapters. Other peripheral output devices, not shown, such as speakers and printers, tactile, and motion producing devices may be connected to device 2100. As used herein the term display includes image projection devices.

A device included in or otherwise providing an execution environment may operate in a networked environment using logical connections to one or more devices (not shown) via a communication interface. The terms communication interface and network interface are used interchangeably. Device 2100 illustrates network interface card (NIC) 2114 as a network interface included in execution environment 2102 to operatively couple execution environment 2102 to a network. The terms network node and node in this document both refer to a device having a network interface operatively coupled to a network.

A network interface included in a suitable execution environment, such as NIC 2114, may be coupled to a wireless network and/or a wired network. Examples of wireless networks include a BLUETOOTH network, a wireless personal area network (WPAN), a wireless 802.11 local area network (LAN), and/or a wireless telephony network (e.g., a cellular, PCS, or GSM network). Examples of wired networks include a LAN, a fiber optic network, a wired personal area network, a telephony network, and/or a wide area network (WAN). Such networking environments are commonplace in intranets, the Internet, offices, enterprise-wide computer networks and the like. In some embodiments, NIC 2114 or a functionally analogous component includes logic to support direct memory access (DMA) transfers between processor memory 2118 and other components.

In a networked environment, program components depicted relative to execution environment 2102, or portions thereof, may be stored in a remote storage device, such as, on a server. It will be appreciated that other hardware and/or software to establish a communications link between the node illustrated by device 2100 and other network nodes may be included.

Figure 10:
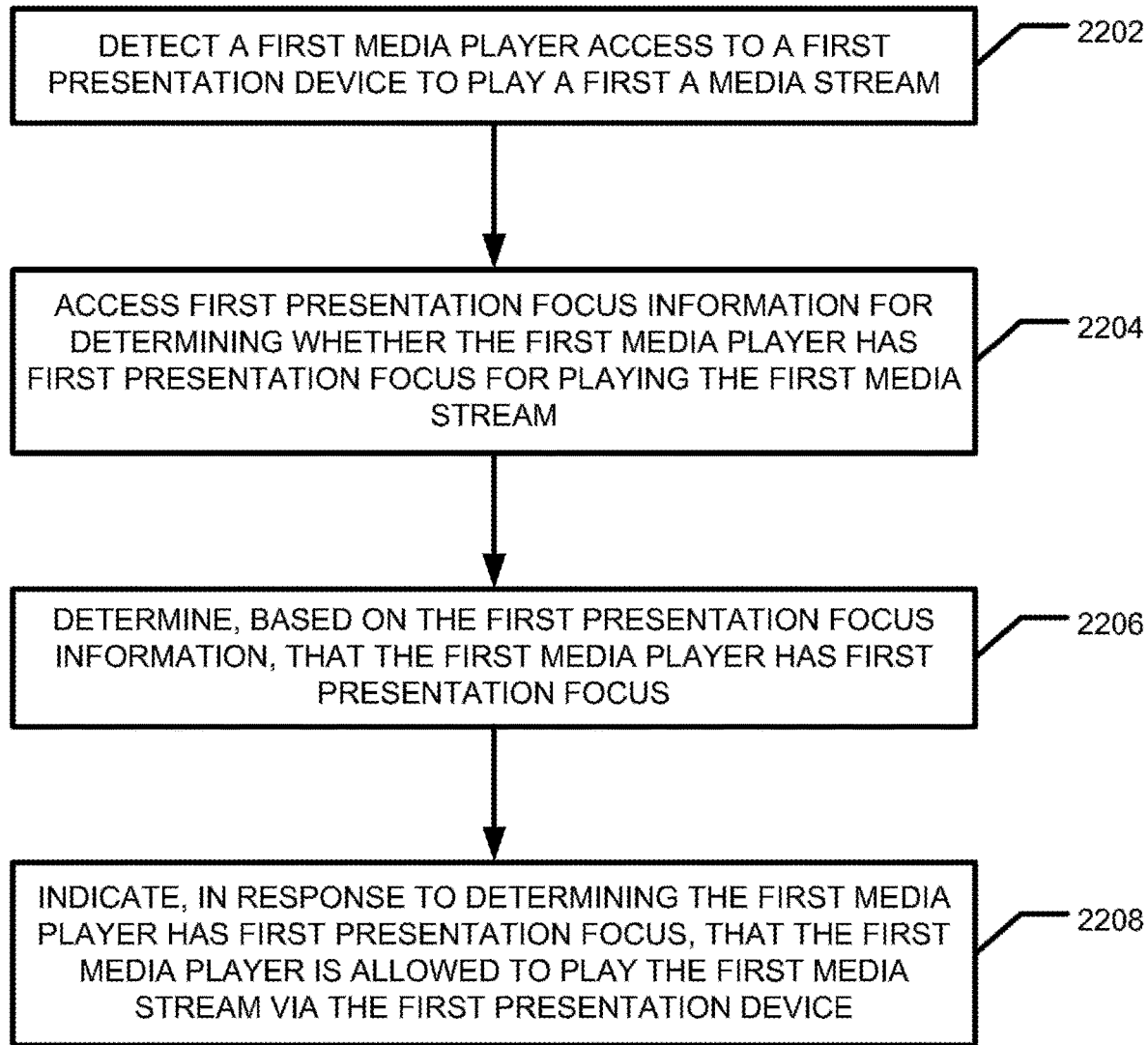
FIG. 10 is a flow diagram illustrating a method for coordinating playing of media streams according to an aspect of the subject matter described herein.
Figure 11:
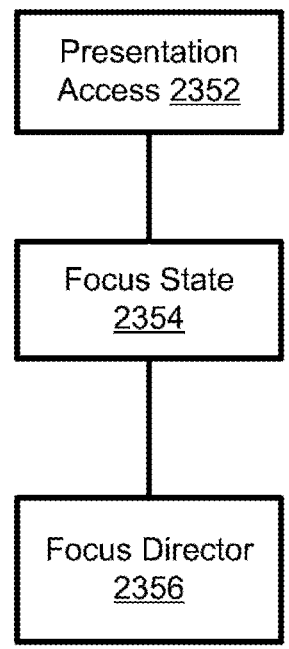
FIG. 11 is block a diagram illustrating an arrangement of components for coordinating playing of media streams according to another aspect of the subject matter described herein.

FIG. 10 is a flow diagram illustrating a method for coordinating playing of media streams according to an exemplary aspect of the subject matter described herein. FIG. 11 is a block diagram illustrating an arrangement of components for coordinating playing of media streams according to another exemplary aspect of the subject matter described herein.

A system for coordinating playing of media streams includes an execution environment, such as execution environment 2102, including an instruction processing unit, such as processor 2104, configured to process an instruction included in at least one of a presentation access component 2352, a focus state component 2354, and a focus director component 2356. The components illustrated in FIG. 11 may be adapted for performing the method illustrated in FIG. 10 in a number of execution environments. A general description is provided in terms of execution environment 2102.

With reference to FIG. 10, block 2202 illustrates the method includes detecting a first media player access to a first presentation device to play a first media stream. Accordingly, a system for coordinating playing of media streams includes means for detecting a first media player access to a first presentation device to play a first media stream. For example, as illustrated in FIG. 11, presentation access component 2352 is configured for detecting a first media player access to a first presentation device to play a first media stream.

FIG. 11 illustrates presentation access component 2352 which enables the arrangement of component in FIG. 11 to detect and/or otherwise have information identifying media streams that may currently be played on a presentation device, such as display 2130. In FIG. 11, presentation access component 2352 identifies such media streams by detecting, directly and/or indirectly, access to a presentation device, such as display 2130 to play a media stream by an application, referred to herein as a media player.

A device and/or node may include other types of presentation devices for playing corresponding types of media streams. Audio devices are commonly included in and/or operatively coupled to many devices and network nodes. Some devices include and/or are operatively coupled to presentation devices that provide tactile output and are configured to play streams of tactile data. A few devices currently exist that are configured to emit odors that users may smell. Odor data can be provided as a stream. Thus in various aspects a presentation device may include a visual, an audio, tactile, and/or odor producing presentation device. Correspondingly, exemplary media streams include a video or image data stream, an audio stream, and a stream of other presentable sensory data.

As used herein, the term media player refers to a component configured to present a media stream on a presentation device. A media player may include software and/or hardware components configured to access one or more types of presentation devices. An audio player, video player, and/or or other media player type may process and play audio data, video data, and/or other media data, respectively, in a compressed and/or uncompressed format. A media player may be a multimedia player configured to play multiple media streams concurrently, typically in a synchronized fashion. A movie player is an example of a multimedia player. Exemplary audio container formats include WAV, AIFF, and XMF. Exemplary container formats for video data include 3GP, ASF, MP4, and OGG. Containers for video formats often are defined to include audio and other types of data streams.

An access to a presentation device by a media player may be detected via an access to any program addressable entity and/or resource included in accessing the presentation device. An access to a presentation device may be detected by any component included in the operation of accessing the presentation device.

For example, in FIG. 9 an application 2122 may receive an indication such as a user input detected by input device 2128 to present data on display 2130. In receiving the indication, an access to display 2130 may be detected. Access to a corresponding presentation device may be detected via an application 2122 access of a function, a method, a data element, and/or other program entity included in and/or otherwise processed by a program library 2126 and/or operating system 2122 to play a media stream. For example, access to a memory location for buffering a media stream may be detected. In certain contexts, such an access is included in accessing display 2130 and/or display adapter 2112.

Those skilled in the art will see based on the descriptions included in this document that presentation access component 2352 may be included in and/or interoperate with any component configured to prepare for and/or access a presentation device, and/or configured to access a resource processed in accessing a presentation device. For example, in various aspects presentation access component 2352 and its analogs may be included in a media player application included in applications 2122; program libraries 2126; operating system 2120; a communications component for sending and/or receiving a media stream and/or for sending and/or receiving a resource for accessing a presentation device; an input processing component configured to detect an input for accessing a presentation device; display adapter 2112 and/or other presentation adapter(s); a presentation device driver; the presentation device accessed; an internet browser; a client of a network application operating in and/or or otherwise processed by the internet browser; the network application; and a proxy mediating communication between the network application and the browser.

In another aspect, presentation access component 2352 and/or an analog may be a component that is informed of an access and/or access attempt rather than or in addition to being a component included in accessing a presentation device. For example, presentation access component 2352 or an analog may be informed of an access to a presentation device by a component providing a resource and/or service for accessing the presentation device and/or a component configured to access the presentation device directly. Presentation access component 2352 or an analog may be a routine that is called prior to and/or during an access of a presentation device.

Exemplary resources in various aspects that may be included in a media player access to a presentation device include one or more of a semaphore; a lock; a presentation space such as display and/or audio buffer; a component of a user interface subsystem and/or library; a component of a user interface element; a component of an audio subsystem and/or library; a display adapter and/or resource of a display adapter; a display device and/or resource of a display device; an audio adapter and/or resource of an audio adapter, an audio presentation device and/or resource of an audio presentation device; a tactile output subsystem and/or resource of a tactile output subsystem; a tactile output device and/or resource of a tactile output device; an access control component and/or resource of an access control component; a serialization component and/or a resource of a serialization component; and/or a synchronization component and/or resource of a synchronization component.

As used in this document the term presentation space refers to a storage region allocated and/or otherwise provided for storing an audio, visual, tactile, and/or other sensory data component for presentation on a presentation device. For example a buffer for storing a video frame is a presentation space. A presentation space may be contiguous or non-contiguous. A presentation space may have a virtual as well as a physical representation. A presentation space may include a storage location in processor memory, secondary storage, a memory of a presentation adapter device, and storage medium of the first presentation device. A screen of a display is another example of a presentation space.

A user interface element is an element or visual component of a graphical user interface (GUI). Exemplary user interface elements include windows, dialog boxes, textboxes, various types of button controls including check boxes and radio buttons, sliders, list boxes, drop-down lists, spinners, various types of menus, toolbars, ribbons, combo boxes, tree views, grid views, navigation tabs, scrollbars, labels, tooltips, text in various fonts, balloons, and dialog boxes. Those skilled in the art will know that this list is not exhaustive. The terms visual representation, visual component, and user interface element are used interchangeably in this document.

A user interface (UI) element handler (UIEH) component is a component configured to send information representing a program entity for presenting a visual representation of the program entity by a display. The visual representation is presented based on the sent information. The sent information is referred to herein as representation information. Representation information includes data in one or more formats including image formats such as JPEG, video formats such as MP4, markup language data such as HTML and other XML-based markup, and/or instructions such as those defined by various script languages, byte code, and/or machine code. For example, a web page received by a browser from a remote application provider may include HTML, ECMAScript, and/or byte code for presenting one or more user interface elements included in a user interface of the remote application.

A program entity is an object included in and/or otherwise processed by an application or other program component. A representation of a program entity may be represented and/or otherwise maintained in a presentation space.

A presentation device may be included in an execution environment hosting an adaptation of the arrangement of components in FIG. 11 or an analog of the arrangement. Alternatively or additionally, a presentation device may be accessed via a network and may be included in and/or otherwise operatively coupled to a node included in and/or otherwise providing another execution environment.

An access may be detected by presentation access component 2352 and/or its analogs based on one or more interprocess communication mechanisms such as a hardware interrupt, a software interrupt, a pipe, and/or a message queue. An access may be detected base on a message received via a network such as request from a browser and/or a response from a server hosted application. An access may be detected based on a function and/or method call to presentation access component 2352 and/or other process including execution of a machine code branch instruction.

Returning to FIG. 10, block 2204 illustrates the method further includes accessing first presentation focus information for determining whether the first media player has first presentation focus for playing the first media stream. Accordingly, a system for coordinating playing of media streams includes means for accessing first presentation focus information for determining whether the first media player has first presentation focus for playing the first media stream. For example, as illustrated in FIG. 11, focus state component 2354 is configured for accessing first presentation focus information for determining whether the first media player has first presentation focus for playing the first media stream.

Focus state component 2354 may maintain and/or otherwise access information, referred to as presentation focus information. Presentation focus information identifies and/or otherwise enables the identification of one or more media players and whether the media players have presentation focus.

Presentation focus information may be maintained by and/or for one or more media players, media streams, and/or presentation devices. In an aspect, presentation focus information may identify a single media stream for playing on a presentation device. In another aspect, presentation focus information may identify more than one media stream of one or more media players for playing on one or more presentation devices. That is, multiple presentation devices may play media streams at the same time and/or multiple media players may play corresponding media streams on a shared presentation device.

Presentation focus for a media player is determined based on presentation focus information accessed by focus state component 2354. Focus state component 2354 may access presentation focus information via any of the means described above with respect to presentation access component 2352. Focus state component 2354 may be included in and/or otherwise interoperate with one or more presentation devices, and/or one or more media players.

As used herein, the term presentation focus refers to an attribute associated with a media player, directly and/or indirectly, indicating whether the media player is allowed to access one or more presentation devices for playing one or more corresponding media streams on the presentation devices. A media player may play a media stream on a device while the media player has presentation focus. Focus state component 2354 is configured to access presentation focus information to determine whether a particular media player has presentation focus for a media stream for playing on a presentation device.

Presentation focus differs from input focus. A user interface element with input focus is an element to which input from one or more particular input devices is directed. For example, when a dialog box has input focus with respect to a keyboard, keyboard input is directed to an application handling the dialog box. Presentation focus relates to output. Presentation focus is an attribute for restricting and coordinating access to an output device by one or more applications.

FIG. 11 illustrates focus state component 2354 operatively coupled to presentation access component 2352. In an aspect, when presentation access component 2352 detects a media player access to a presentation device to play a media stream, presentation access component 2352 may interoperate with focus state component 2354 to access corresponding presentation focus information.

Alternatively or additionally, focus state component 2354 may access presentation focus information and detect a change in presentation focus. In response to detecting the change, focus state component 2354 may interoperate with presentation access component 2352 to detect an access which may have occurred prior to the change and/or subsequent to the change.

In various aspects, presentation focus information may include and/or otherwise be based on input focus information, a position corresponding to a pointing device such as mouse and/or touch screen, a detected user input, a z-order of a user interface element including a presentation space for presenting a media stream, a measure of user visibility of a presentation space for presenting a media stream, an order of detected access, and/or a priority associated with a media stream and/or media player. Priority may be based on a content type of a media stream; a source of the stream, and/or a time a media stream and/or media player has been waiting for presentation focus. The list provided is exemplary and not exhaustive.

Returning to FIG. 10, block 2206 illustrates the method yet further includes determining, based on the first presentation focus information, that the first media player has first presentation focus. Accordingly, a system for coordinating playing of media streams includes means for determining, based on the first presentation focus information, that the first media player has first presentation focus. For example, as illustrated in FIG. 11, focus director component 2354 is configured for determining, based on the first presentation focus information, that the first media player has first presentation focus.

Focus director component 2356 is configured to determine and/or otherwise detect whether a media player has presentation focus for playing a media stream on a presentation device. The determination is based on presentation focus information which may include information for one or more media players, one or more corresponding media streams, and/or one or more presentation devices, as well as other information. The determining may include matching and/or otherwise processing the value of a focus state data variable, evaluating a policy based on identified attribute information, evaluating a matching expression, and/or checking a threshold. The determining may include interoperation with one or more media players and/or another component included in and/or configured to interoperate with focus director component 2356 such as a graphics subsystem, display adapter 2112, and/or display device 2130.

The determining, in various aspects, may be performed by focus director component 2356 and/or its analogs based on one or more interprocess communication mechanisms such as a hardware interrupt, a software interrupt, a pipe, and/or a message queue. Determining presentation focus may be based a message received via a network such as request from browser and/or a response from a server hosted application. Determining presentation focus may be based on a function and/or method call to and/or by focus director component 2356 and/or other process including execution of a machine code branch instruction.

Focus director component 2356 may be included in and/or otherwise interoperate with one or more presentation devices and/or one or more media players. In an aspect, presentation focus may be associated with a single media stream for playing on a presentation device. In another aspect, presentation focus may be associated with more than one media stream of one or more media players to access one or more media presentation devices.

FIG. 11 illustrates focus director component 2356 operatively coupled to focus state component 2354. In an aspect, when focus state component 2354 accesses presentation focus information, focus state component 2354 may interoperate with focus director component 2356 to correspondingly determine whether a media player has presentation focus. Alternatively or additionally, focus director component 2356 may interoperate with focus state component 2354 in response to presentation access component 2352 detecting a media player access to a presentation device to play a media stream.

In another aspect, determining whether the first media player has presentation focus may include determining that the first media player does not have presentation focus. In response to determining that the first media player does not have presentation focus, focus director component 2356 may interoperate with presentation access component 2352 to provide a no-play indication indicating that the first media player is not allowed to play the first media stream on the first presentation device. Focus director component 2356 may determine that the first media player does not have presentation focus based on the accessed presentation focus information.

Subsequently, focus state component 2354 may access presentation focus information based on a detected change in the information and/or an indication of a change in the information. Based on the detected change, focus state component 2354 may provide updated presentation focus information to focus director component 2356. Focus director component 2356 determines whether the first media player has presentation focus based on the updated presentation focus information and determines that the first media player has presentation focus.

A change in presentation focus information and a corresponding change in presentation focus for a media player playing a media stream on a presentation device may be based on any number of changes detected within an execution environment hosting an adaptation of the arrangement of components in FIG. 11 and/or an analog of the arrangement.

For example, a second media player may release presentation focus by and/or otherwise in response to changing its mode of operation from play mode to stop, pause, rewind, and/or fast forward mode. A second media stream on the first media device and/or a second media device may be halted or played by a component other than the second stream's media player affecting presentation focus information and thus presentation focus for a first media player.

A user input for identifying a particular media stream and/or player to play may be detected resulting in a change to presentation focus information. Alternatively or additionally, a change in an attribute of a user interface may be detected. For example, a z-order of a user interface element for presenting the first media stream by the first media play may change corresponding to a change in the user interface element being an element hidden from a user to a visible element. A z-order change may be absolute depending on a particular z-order value and/or may be relative depending on a relationship between the z-orders of two or more UI elements.

Alternatively or additionally, a relationship between input focus and presentation focus may be configured. Focus director component 2356 may determine that the first media player has presentation focus when it also has input focus. For example, execution environment 2102 may include a remote control device including controls for controlling a media player. When a media player component has input focus corresponding to the remote control device, it may be configured to have presentation focus for a presentation device corresponding to the remote control device.

A change in an attribute of a presentation device may result in a change in presentation focus information and presentation focus for a media player. For example, resolution of a screen of display 2130 may change allowing more UI elements to be visible at a given time. The opposite may occur as well restricting the number of UI elements that may be visible. A position of a UI element may change a size of a visible area of a presentation space for the first media stream. For example, focus director component 2356 may access a policy specifying a proportion and/or an absolute size of the presentation space that must be visible to a user before the first media player may have presentation focus.

In an aspect, the media player may receive and/or otherwise access a multi-media container such as an MPEG-4 file or message stream received and/or to be sent via a network for presentation on more than one presentation device. The MPEG-4 container may include a video stream and an audio stream to be played in a synchronized manner. The MPEG-4 container may include other streams as well.

In addition to accessing the first media player, for example display 2130, presentation access component 2352 may detect first media player accessing an audio device (not shown) to play the audio stream along with the video stream. Focus state component 2354 may access second presentation focus information which may be stored with, included in, and/or along with the first presentation focus information. The second presentation focus information may be defined for determining whether the first media player has access to the second presentation device. Focus director component 356 may then determine whether first media player has second presentation focus to play the second media stream on the second presentation device.

Focus director component 2356 may determine that first media player does not have second presentation focus based on the second presentation focus information. In response, focus director component 2356 may determine, that first media player does not have first presentation focus to the first presentation device. With respect to the multiple media streams in the media container, first media player does not have presentation focus for accessing the needed presentation devices. Presentation access component 2352 may provide a no-play indication indicating that first media player is not allowed to play the first media stream on display 2130.

Subsequently, focus state component 2354 may access second presentation focus information based on a detected change in the second presentation focus information. Based on the detected change, focus state component 2354 may provide updated second presentation focus information to focus director component 2356. Focus director component 2356 determines whether the first media player has second presentation focus based on the updated second presentation focus information. In response to determining that the first media player has both first presentation focus and second presentation focus, focus director component 2356 may determine that the first media player has presentation focus for presenting both media streams included in the media container on both the first and second presentation devices.

In an aspect, focus director component 2356 may determine that the first media player has presentation focus for the first presentation device and presentation access component 2352 may provide an indication that the first media player may play the video stream on display 2130 indicating that the first media player is allowed to play the first media stream. Whether all presentation devices requested are required for focus director component 2356 to determine that a media player has presentation focus may be based on a configuration of machine code in the components and/or may be based on stored configuration data provided by, for example, a user of the media player or a system administrator. Alternatively or additionally, the determination may be based on information received from a user prior to and/or during the determining. Focus director component 2356 may present and/or provide for presenting a user interface prompting the user for needed information.

In yet another aspect, while the first media player has presentation focus for playing the first stream on the first presentation device, presentation access component 2352 may detect a second media player access to the first presentation device to play a second media stream. In the aspect, the arrangement of components in FIG. 11 and/or an analog may prevent the second media player from accessing the first presentation device while the first media player has first presentation focus. Presentation access component 2352 may, thus, indicate the second media player is not allowed to play the second media stream on the first presentation device while the first media player has presentation focus for playing the first media stream. First media player may be granted exclusive presentation focus for the first presentation device based on a policy specifying serialized access to the presentation device.

Alternatively, the arrangement of components in FIG. 11 and/or an analog may allow a second media player access to the first presentation device while the first media player has presentation focus. That is, focus director component 2356 may determine, based on accessed second presentation information, that second media player has presentation focus for playing the second media stream on the second presentation device. In response to determining that the second media player has second presentation focus, focus director component 2356 may indicate that the second media player is allowed to play the second media stream via the first presentation device Determining that second media player has second presentation focus may be based on a condition such as a configured maximum number of media players allowed to concurrently access the first media presentation device.

Such a condition may be based on any number of factors including a count of media streams being played, a ranking of media streams being played, a size of the presentation space viewable by a user, a transparency level of a UI element, and/or an attribute of another UI element sharing a region of a display of a UI element including a presentation space for presenting at least some of the first media stream and/or the second media stream.

Returning to FIG. 10, block 2208 illustrates the method additionally includes indicating, in response to determining the first media player has first presentation focus, that the first media player is allowed to play the first media stream via the first presentation device. Accordingly, a system for coordinating playing of media streams includes means for indicating, in response to determining the first media player has first presentation focus, that the first media player is allowed to play the first media stream via the first presentation device. For example, as illustrated in FIG. 11, presentation access component 2352 is configured for indicating, in response to determining the first media player has first presentation focus, that the first media player is allowed to play the first media stream via the first presentation device.

In addition to detecting an access by a media player to play a media stream on a presentation device, presentation access component 2352 as illustrated in FIG. 11 is also configured to indicate whether the media player is allowed to play the media stream on the presentation device. That is, it monitors and provides access information. In other arrangements, these two capabilities may be provided by separate components.

In various aspects, a play and/or a no-play indication may be provided in different ways. In one aspect, presentation access component 2352 may call and/or otherwise instruct the first media player to change its mode of operation to play mode to provide a play indication. Similarly, presentation access component 2352 may instruct the first media player to enter a mode other than play mode in providing a no-play indication.

In another aspect, presentation access component 2352 may detect access by a first media player to the first presentation device by being included in and/or otherwise intercepting stream data sent from the first media player to the first presentation device. Presentation access component 2352 may process the data for presentation as configured, and/or pass it along unprocessed for processing by the first presentation device and/or another component included in the process of presenting the media stream, thus indicating the first media player is allowed to play the first media stream.

In yet another aspect, presentation access component 2352 may include and/or otherwise make use of a serialization mechanism such as a semaphore or lock. Presentation access component 2352 may provide a play indication by not blocking and/or by unblocking a thread of execution for presenting the first media stream on the first presentation device by the first media player. Alternatively or additionally, presentation access component 2352 may provide a play indication by being included in and/or otherwise interoperating with a thread/process scheduler to put one or more threads for playing the first media stream in a run state. Sending a no-play indicator may analogously be performed and/or otherwise provided for by presentation access component 2352 by causing one or more threads for playing the first media stream to be blocked from execution by processor 2104.

Providing a play indication may further include sending and/or receiving a message via a network to and/or from, respectively, a remote node where either the node hosting presentation access component 2352 or the remote node is operatively coupled to a presentation device for presenting a media stream. Presentation access component 2352 may be adapted to operate in a client node, a server node, and/or an intermediary node such as a proxy server. A no-play indicator may be provided similarly.

Coordination and control of media streams as described herein may prevent incomprehensible and sometimes unpleasant user experiences resulting from media streams playing simultaneously in an uncoordinated manner. Further, coordination and control of play of multiple media streams according to the subject matter described herein may save resources. For example, battery life may be extended in battery powered devices and less energy may be used in devices connected to an electricity grid.

The components illustrated in FIG. 11 may be adapted for performing the method illustrated in FIG. 10 in a number of execution environments. Adaptations of the components illustrated in FIG. 11 for performing the method illustrated in FIG. 10 are described operating in exemplary execution environment 2402 illustrated in various aspects as execution environment 2402a in FIG. 12a, execution environment 2402b in FIG. 12b, and execution environment 2402c in FIG. 12c. A further adaptation of the components illustrated in FIG. 11 for performing the method illustrated in FIG. 10 is described operating in exemplary execution environment 2502 illustrated in FIG. 13.

FIG. 9 illustrates key components of an exemplary device that may at least partially provide and/or otherwise be included in an exemplary execution environment, such as those illustrated in FIG. 12a, FIG. 12b, FIG. 12c, and FIG. 13. The components illustrated in FIG. 11, FIG. 12a, FIG. 12b, FIG. 12c, and FIG. 13 may be included in or otherwise combined with the components of FIG. 9 to create a variety of arrangements of components according to the subject matter described herein FIG. 14 illustrates a user node 2602 as an exemplary device included in and/or otherwise adapted for providing any of execution environments 2402 illustrated in FIG. 12a, FIG. 12b, and FIG. 12c each illustrating a different adaptation of the arrangement of components in FIG. 11. As illustrated in FIG. 14, user node 2602 is operatively coupled to network 2604 via a network interface, such as NIC 2114. Alternatively or additionally, an adaptation of execution environment 2402 includes and/or is otherwise provided by a device that is not operatively coupled to a network.

Figure 12A:
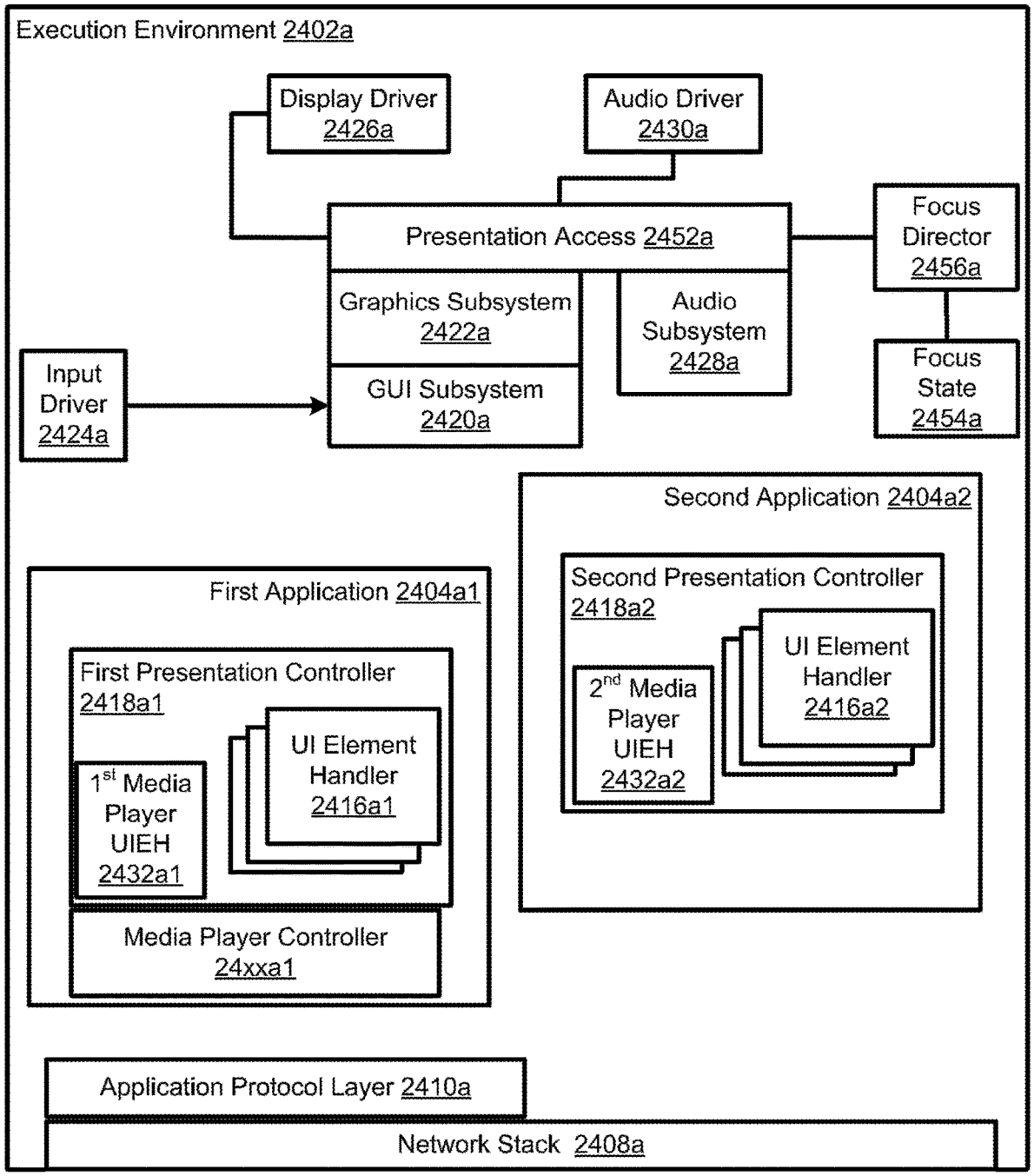
FIG. 12a is a block a diagram illustrating an arrangement of components for coordinating playing of media streams according to another aspect of the subject matter described herein.

FIG. 12a illustrates an adaptation of the arrangement of components in FIG. 11 configured to interoperate with various presentation components provided by execution environment 2402a. The arrangement is illustrated operating external to media player applications illustrated as first application 2404a1 and second application 2404a2.

Figure 12B:
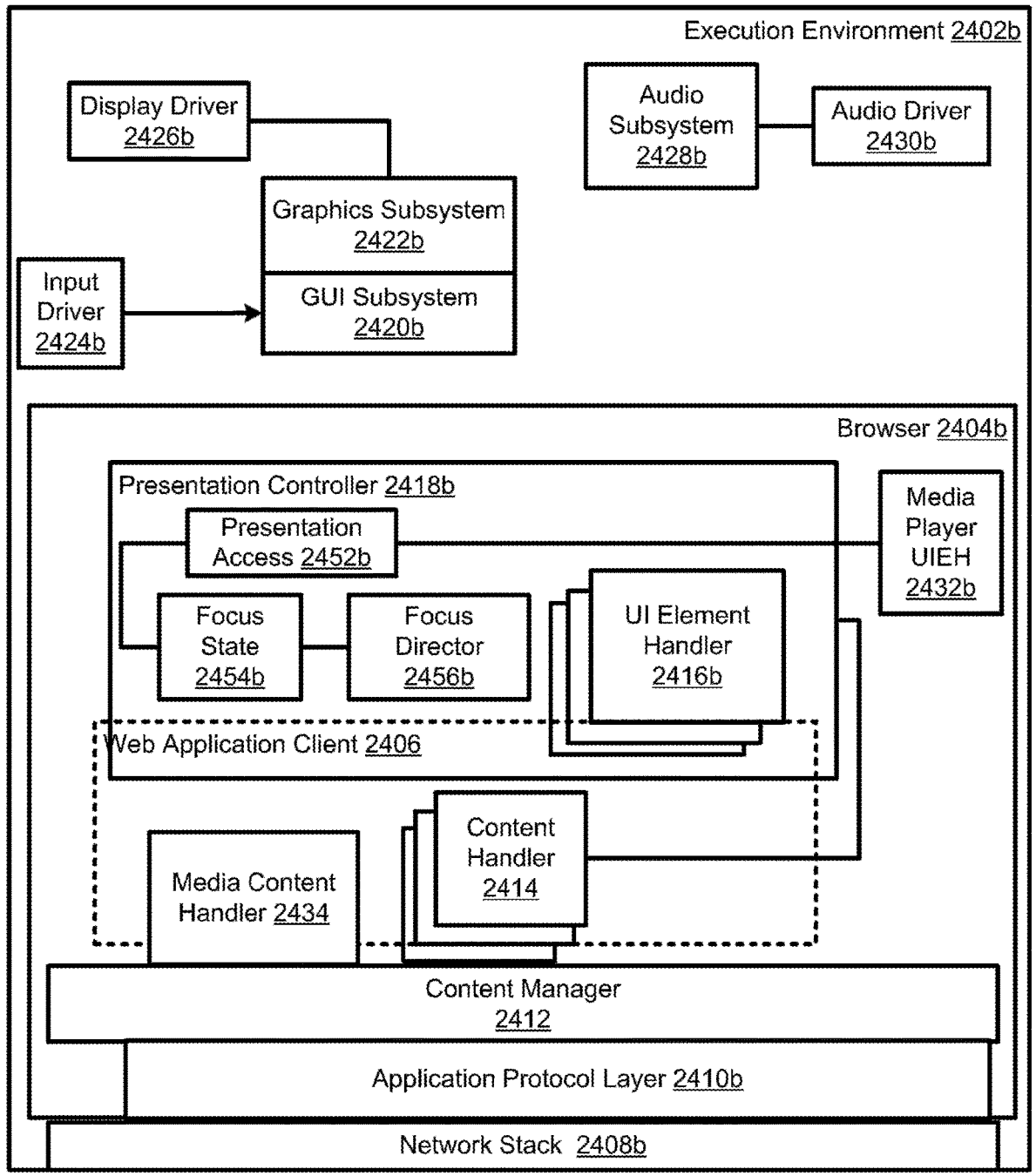
FIG. 12b is a block a diagram illustrating an arrangement of components for coordinating playing of media streams according to another aspect of the subject matter described herein.

FIG. 12b illustrates an adaptation of the arrangement of components in FIG. 11 operating as browser components or components of a browser extension such as a plug-in. Application 2404b is illustrated as a browser operating in execution environment 2402b providing at least part of an execution environment for web application client 2406 received from a remote application provider. FIG. 12b also illustrates an adaptation or analog of the components in FIG. 11 operating at least partially external to one or more web applications serviced by the arrangement and browser 2404b.

Figure 12C:
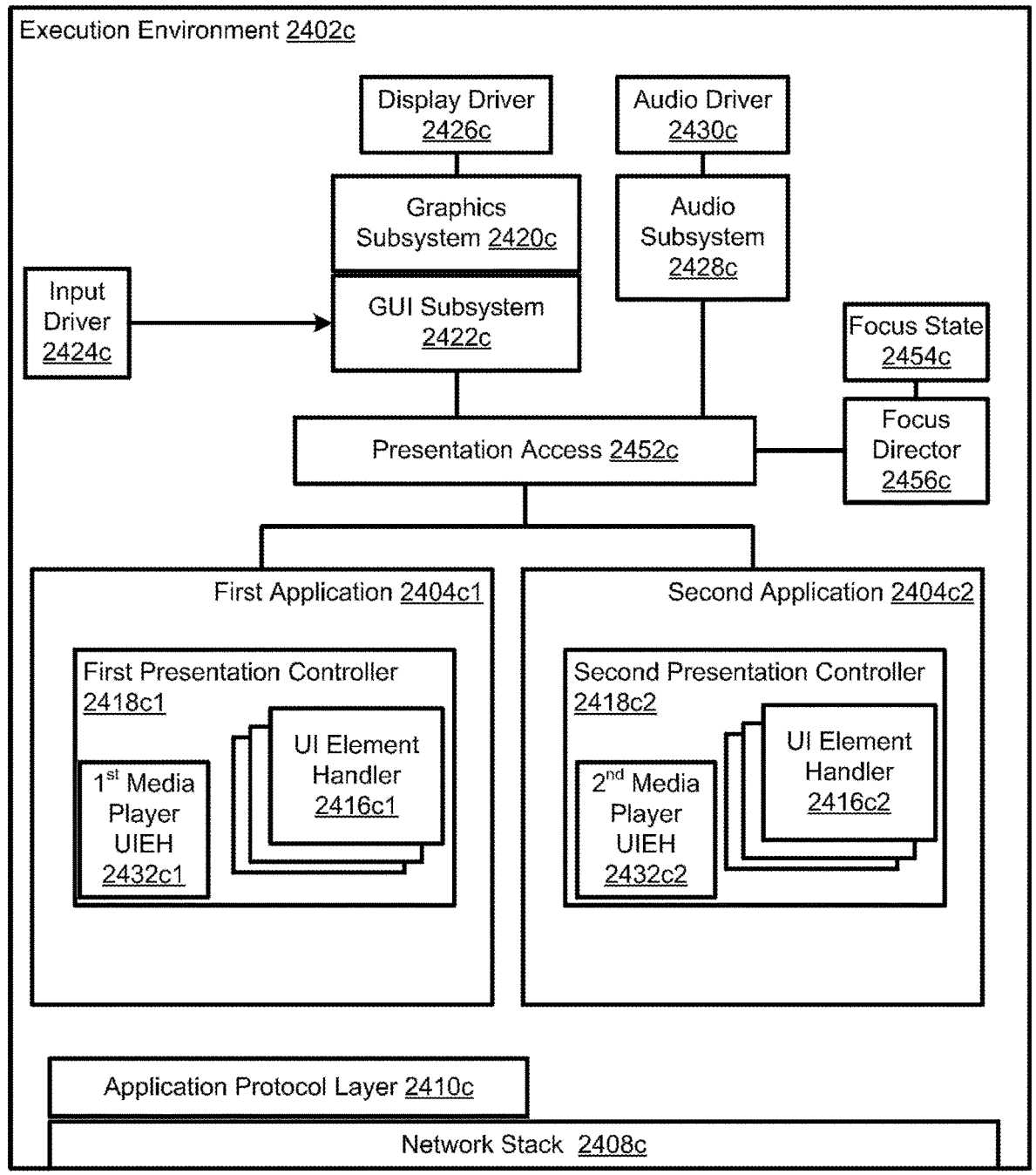
FIG. 12c is a block a diagram illustrating an arrangement of components for coordinating playing of media streams according to another aspect of the subject matter described herein.

FIG. 12c illustrates an arrangement of components in FIG. 11 adapted to operate as an interceptor of communications between media player applications illustrated as first application 2404c1 and second application 2404c2, and various presentation components provided by execution environment 2402c.

Components identifiers including letters in their identifiers in the figures are referred to collectively using the respective identifiers without the postfix including the letters and are, in some cases referred to generically across the figures in the same manner when the including description may apply to all adaptations of components identified in this way. Interpretation of the identifiers will be clear in the context of the including descriptive text in this document.

Figure 13:
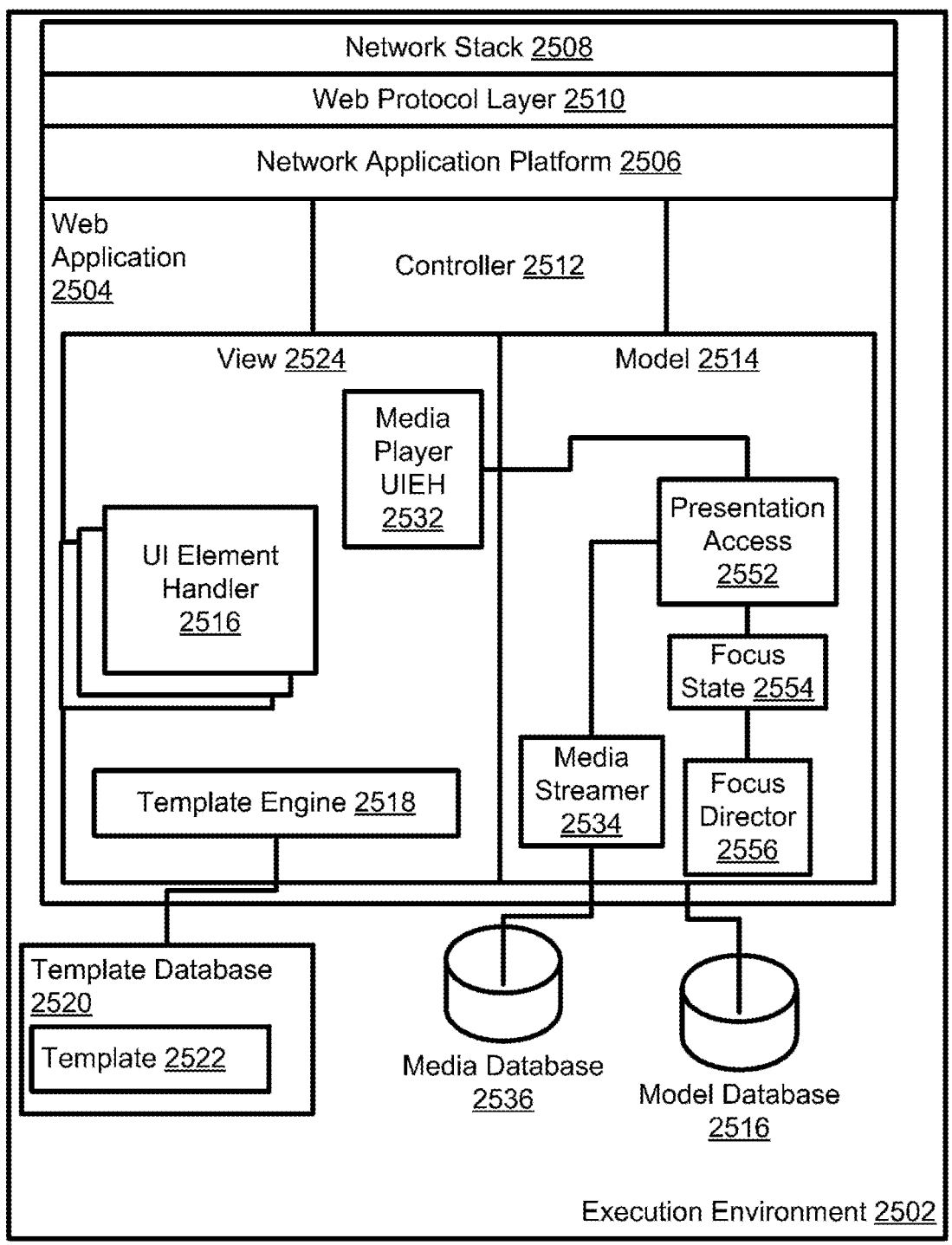
FIG. 13 is a block a diagram illustrating an arrangement of components for coordinating playing of media streams according to another aspect of the subject matter described herein.
Figure 14:
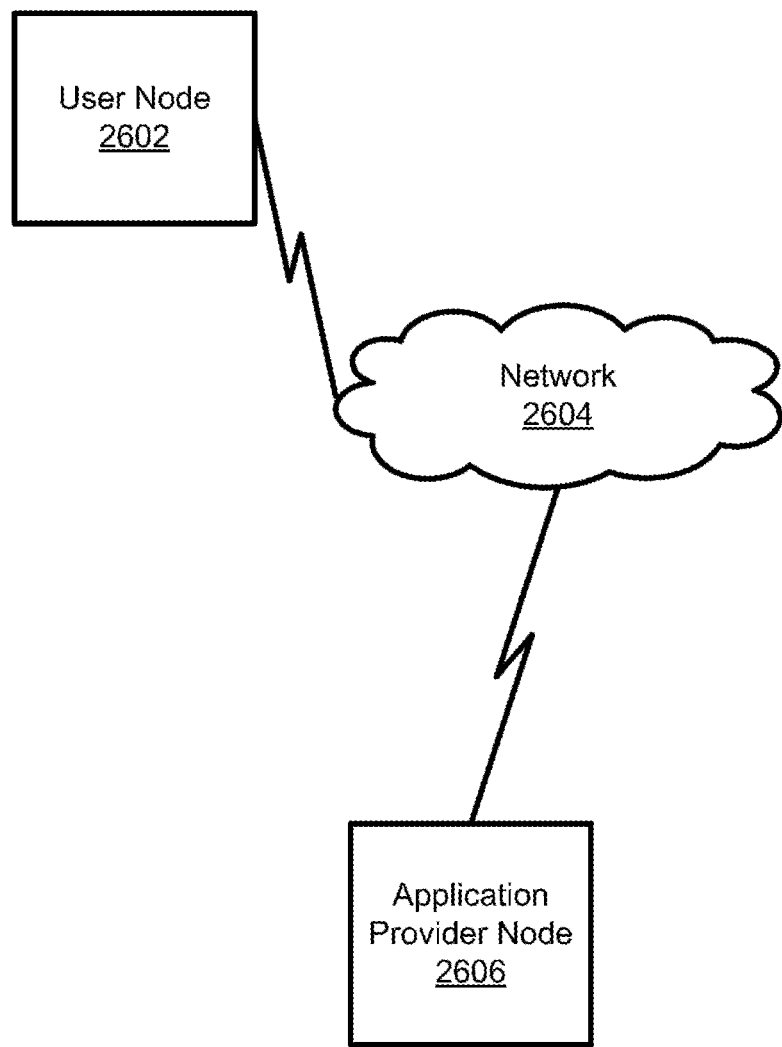
FIG. 14 is a network diagram illustrating an exemplary system for coordinating playing of media streams according to an aspect of the subject matter described herein.

FIG. 13 illustrates a remote application provider as web application provider 2504 hosting yet another adaptation or analog of the arrangement of components in FIG. 11. Network application platform 2506 may include a web server and/or a network application framework known to those skilled in the art.

Execution environment 2402 as illustrated in FIG. 12a, FIG. 12b, and in FIG. 12c may include and/or otherwise be provided by a device such as user node 2602 illustrated in FIG. 14. User node 2602 may communicate with one or more application providers, such as network application platform 2506 operating in execution environment 2502. Execution environment client 2502 may include and/or otherwise be provided by application provider node 2606 in FIG. 14. User node 2602 and application provider node 2606 may each include a network interface operatively coupling each respective node to network 2604.

FIG. 12a, FIG. 12b, and FIG. 12c illustrate network stacks 2408 configured for sending and receiving messages over network 2604, such as the Internet, via the network interface of user node 2602. FIG. 13 illustrates network stack 2508 serving an analogous role in application provider node 2606. Network stacks 2408 and network stack 2508 may support the same protocol suite, such as TCP/IP, or may communicate via a network gateway or other protocol translation device and/or service. Application 2404b in FIG. 12b and network application platform 2506 as illustrated in FIG. 13 may interoperate via their respective network stacks; network stack 2408b and network stack 2508.

FIG. 12a, FIG. 12b, and FIG. 12c illustrate applications 2404, and FIG. 13 illustrates web application 2504, respectively, which may be configured to communicate via one or more application layer protocols. FIG. 12a, FIG. 12b, and FIG. 12c illustrate application protocol layers 2410 exemplifying one or more application layer protocols. Exemplary application protocol layers include a hypertext transfer protocol (HTTP) layer and instant messaging and presence protocol, XMPP-IM layer. FIG. 13 illustrates a compatible application protocol layer as web protocol layer 2510. Matching protocols enabling user node 2602 to communicate with application provider node 2606 via network 2604 in FIG. 14 are not required if communication is via a protocol translator.

In FIG. 12b, application 2404b may receive web application client 2406 in one more messages sent from web application 2504 via network application platform 2506 and/or sent from web application 2504 via network application platform 2506 via the network stacks, network interfaces, and optionally via an application protocol layer in each respective execution environment. In FIG. 12b, application 2404b includes content manager 2412. Content manager 2412 may interoperate with one or more of the application layer components 2410b and/or network stack 2408b to receive the message or messages including some or all of web application client 2406.

Web application client 2406 may include a web page for presenting a user interface for web application 2504. The web page may include and/or reference data represented in one or more formats including hypertext markup language (HTML) and/or markup language, ECMAScript or other scripting language, byte code, image data, audio data, and/or machine code.

The data received by content manager 2412 may be received in response to a request sent in a message to web application 2504 and/or may be received asynchronously in a message with no corresponding request.

In an example, in response to a request received from browser 2404b, controller 2512, in FIG. 13, may invoke model subsystem 2514 to perform request specific processing. Model subsystem 2514 may include any number of request processors for dynamically generating data and/or retrieving data from model database 2516 based on the request. Controller 2512 may further invoke template engine 2518 to identify one or more templates and/or static data elements for generating a user interface for representing a response to the received request. FIG. 13 illustrates template database 2520 including an exemplary template 2522. FIG. 13 illustrates template engine 2518 as a component of view subsystem 2524 configured for returning responses to processed requests in a presentation format suitable for a client, such as browser 2404b. View subsystem 2524 may provide the presentation data to controller 2512 to send to application 2404b in response to the request received from application 2404b. Web application client 2406 may be sent to application 2404b via network application platform 2506 interoperating with network stack 2508 and/or application layer 2510.

While the example describes sending web application client 2406 in response to a request, web application 2504 additionally or alternatively may send some or all of web application client 2406 to browser 2404b via one or more asynchronous messages. An asynchronous message may be sent in response to a change detected by web application 2506. A publish-subscribe protocol such as the presence protocol specified by XMPP-IM is an exemplary protocol for sending messages asynchronously in response to a detected change.

The one or more messages including information representing web application client 2406 may be received by content manager 2412 via one or more of the application protocol layers 2410b and/or network stack 2408b as described above. FIG. 12b illustrates browser 2404b includes one or more content handler components 2414 to process received data according to its data type, typically identified by a MIME-type identifier. Exemplary content handler components 2414 include a text/html content handler for processing HTML documents; an application/xmpp-xml content handler for processing XMPP streams including presence tuples, instant messages, and publish-subscribe data as defined by various XMPP specifications; one or more video content handler components processing video streams of various types; and still image data content handler components for processing various images types. Content handler components 2414 process received data and provide a representation of the processed data to one or more user interface element handlers 2416b.

User interface element handlers 2416 are illustrated in presentation controller 2418 in FIG. 12a, FIG. 12b, and FIG. 12c. A presentation controller 2418 may manage the visual components of its including application as well as receive and route detected user and other inputs to components and extensions of its including application. A user interface element handler 2416b in various aspects may be adapted to operate at least partially in a content handler 2414 such as the text/html content handler and/or a script content handler. Additionally or alternatively a user interface element handler 2416 may operate in an extension of its including application, such as a plug-in providing a virtual machine for script and/or byte code.

Figure 15:
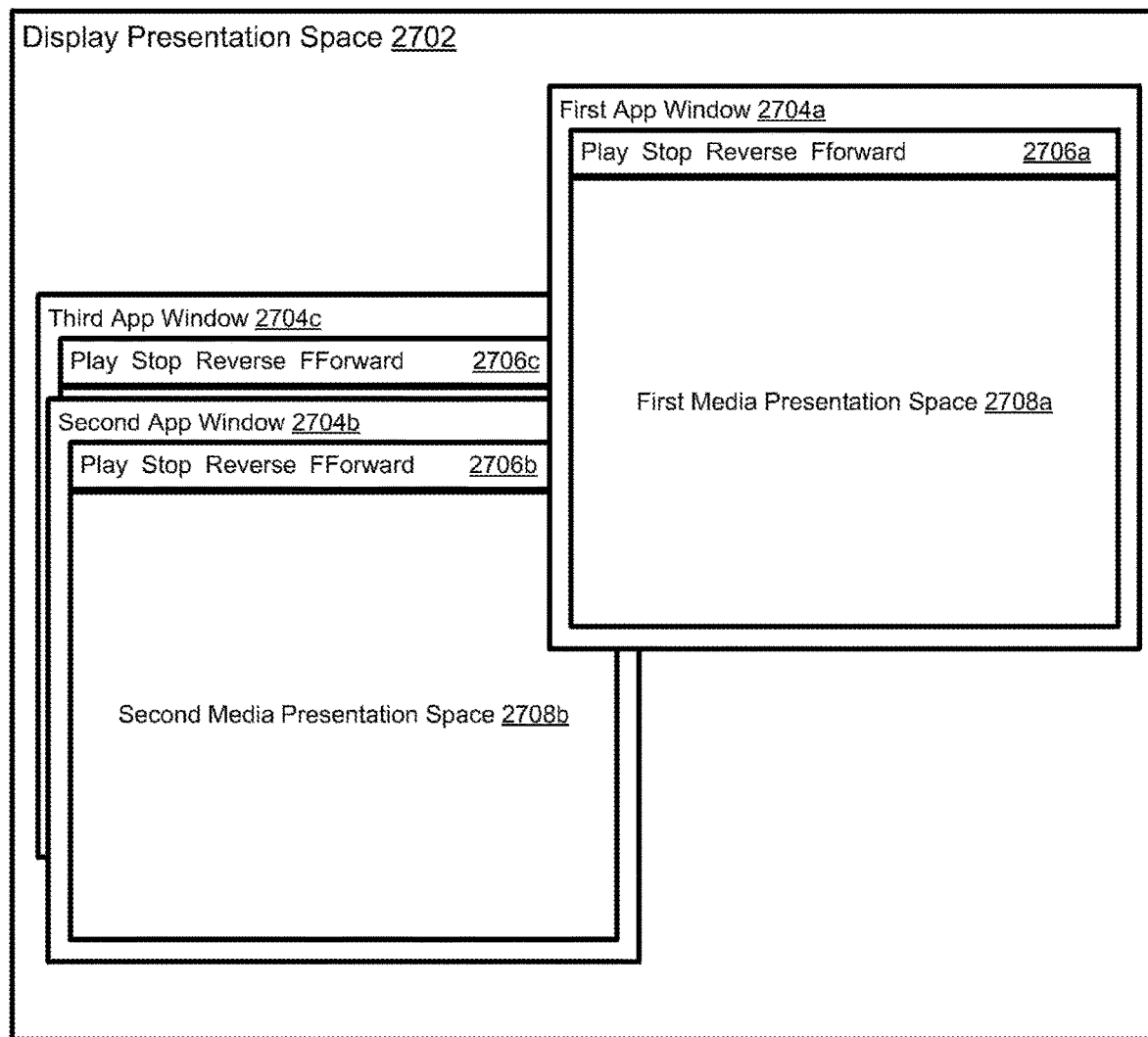
FIG. 15 is a diagram illustrating a user interface presented by a display according to an aspect of the subject matter described herein.

FIG. 15 illustrates a presentation space 2702 of display 2130 including application windows 2704 of several media player applications 2404. FIG. 15 is used to illustrate user interfaces of applications 2404 operating in execution environments in FIG. 12a, FIG. 12b, and FIG. 12c, and web application 2504 in FIG. 13. In some contexts, an execution environment in a specific figure is referred to and, in other contexts, the user interfaces of applications 2404 are described as if the execution environments in FIG. 12a, FIG. 12b, and FIG. 12c are a single execution environment 2402.

Application windows 2704 illustrate a number of user interface elements typically found in media player user interfaces. Application windows 2704 include respective command bars 2706 with input controls for receiving user input to change the operational state of the respective media players represented. Application windows 2704 also include respective user interface elements providing a presentation space 2708 for presenting a video media stream. Second App Window 2704b may be a browser window or tab presented by browser 2404b in FIG. 12b. Second app window 2704b includes a user interface of a web application provided by a remote node, such as web application 2504 in application provider node 2606.

The various user interface elements of applications 2404 and web application 2504 described above are presented by one or more user interface element handlers 2416, 2516. In an aspect illustrated in FIG. 12a, FIG. 12b, and in FIG. 12c, a user interface element handler 2416 of one or more of the applications 2404 is configured to send representation information representing a UI element, such as command bar 2706 illustrated in FIG. 15, to GUI subsystem 2420. GUI subsystem 2420 may instruct graphics subsystem 2422 to draw the user interface element in a region of a presentation space based on representation information received from a corresponding user interface element handler 2416.

Input may be received corresponding to a user interface element via input driver 2424. For example, FIG. 15 also illustrates command bar 2706. A user may move a mouse to move a pointer presented in display presentation space 2702 over an operation identified in command bar 2706. The user may provide an input detected by the mouse. The detected input may be received by GUI subsystem 2420 via input driver 2424 as an operation indicator based on the association of the shared location of the pointer and the operation identifier in display presentation space 2702.

FIGS. 12a-c illustrate presentation access components 2452 as adaptations of and/or analogs of presentation access component 2352 in FIG. 11. One or more presentation access components 2452 may operate in execution environment 2402. Accordingly, a system for coordinating playing of media streams includes means for detecting a first media player access to a first presentation device to play a first media stream. For example, as illustrated in FIGS. 12a-c, presentation access component 2452 is configured for detecting a first media player access to a first presentation device to play a first media stream.

FIG. 12a, FIG. 12b, and FIG. 12c illustrate various adaptations of presentation access components 2452. FIG. 12a, illustrates presentation access component 2452a included as a layer in the presentation subsystem of execution environment 2402a. Graphics subsystem 2422a may communicate with display driver 2426a to communicate with display adapter 2128 and display 2130 to present image data, such as a frame of a video stream, on display 2130. Audio subsystem 2428a may communicate with audio driver 2430a via presentation access component 2452a, analogously. Presentation subsystems for other types of sensorial data may be configured similarly. Image and audio data may be presented as directed by applications 2404a in FIG. 12a.

First app window 2704a in FIG. 15 illustrates a user interface presented by display 2130 as directed by first application 2404a1. Applications 2404a in FIG. 12a are illustrated including media player user interface element handlers (UIEH) 2432a configured to interoperate with GUI subsystem 2420a and/or audio subsystem 2428a to present one or more video and/or audio streams on display 2130 and/or an audio presentation device (not shown). Presentation access component 2452a may intercept one or more communications between graphics subsystem 2422a and display driver 2426a detecting access to display 2130 for playing a video stream by first media player UI element handler 2432a1 of first application 2404a1 in first media presentation space 2708a. Presentation access component 2452a may intercept one or more communications between audio subsystem 2428a and audio driver 2430a detecting access to the audio presentation device for playing an audio stream by second media player UI element handler 2432a2 of second application 2404a2. One or more of applications 2404a may include and/or otherwise be a multimedia player accessing display driver 2426a and audio driver 2430a via presentation access component 2452a.

FIG. 12b illustrates presentation access component 2452b included in browser 2404b. Browser 2404b may include one or more content handlers 2414 for processing media streams of various formats as described above. Content handlers for streaming media data are illustrated as media content handler 2434. A media content handler 2434 may present a media stream on a presentation device via media player UI element handler 2432b. A browser may include one or more media player UI element handlers 2432b, just as it may include one or more media content handlers 2434. A media player UI element handler 2432b may access a presentation device via interoperating with GUI subsystem 2422b, audio subsystem 2428b, and/or other sensorial presentation subsystem as described above.

In an aspect, at least part of a media player UI element handle 2432b may be included in web application client 2406 provided by a remote application, such as web application 2504, in FIG. 13, operating in application provider node 2606, in FIG. 14. In another aspect, media player UI element handler 2432b may be and/or may be included in an extension of browser 2404b. Media player UI element handler 2432b is shown operating outside presentation controller 2418b to illustrate media player UI element handler 2432b as an extension of browser 2404b. In still another aspect, media player UI element handler may be included in a media player application external to browser 2404b. Presentation access component 2452b may be configured to mediate access between a media content handler 2434 and a media player UI element handler 2432b in the various aspects.

For example, second app window 2704b in FIG. 15 illustrates a user interface presented by display 2130 as directed by browser 2404b. Presentation access component 2452b may be included in presenting a media stream and/or otherwise intercept one or more communications between media content handler 2434 and media UI element handler 2432b detecting access to a presentation device for playing a media stream by a media player, such as remote client application 2406 and/or web application 2504. In an aspect, remote client application 2406 accesses media player UI element handler 2432*b* via presentation access component 2452*b* to play a video stream in second media presentation space 2708*b* in FIG. 15.

FIG. 12*c* illustrates presentation access component 2452*c* included as a layer between applications 2404*c* and presentation subsystems of execution environment 2402*c*. First application 2404*c*1, for example, may communicate with GUI subsystem 2420*c* to access display adapter 2128 and display 2130 to present a video. Second application 2404*c*2 may communicate with audio subsystem 2428*c* to access an audio presentation device via audio driver 2430*c* to play an audio stream. Applications 2404*c* may interoperate with presentation subsystems for other types of sensorial data and may be configured similarly.

For example, third app window 2704*c* in FIG. 15 illustrates a user interface presented by display 2130 as directed by first application 2404*c*1. Applications 2404*c* in FIG. 12*c* are illustrated including media player user interface element handlers (UIEH) 2432*c* configured to interoperate with GUI subsystem 2420*c* and/or audio subsystem 2428*c* to present one or more video and/or audio streams on display 2130 and/or an audio presentation device (not shown). Presentation access component 2452*c* may intercept one or more communications between first application 2404*c*1 and GUI subsystem 2420*c* and/or audio subsystem 2428*c* to detect access to display 2130 for playing a video stream, for example by first media player UI element handler 2432*c*1 of first application 2404*c*1 in third media presentation space 2708*c* (hidden in FIG. 15). Presentation access component 2452*c* may intercept one or more communications between, for example, second application 2404*c*2 and audio subsystem 2428*c* detecting access to the audio presentation device for playing an audio stream by second media player UI element handler 2432*c*2. One or more of applications 2404*c* may include and/or otherwise be a multimedia player accessing GUI subsystem 2420*c* and audio subsystem 2428*c* via presentation access component 2452*c*.

FIGS. 12*a-c* illustrates focus state component 2454 as an adaptation of and/or analog of focus state component 2354 in FIG. 11. One or more focus state components 2454 may operate in execution environment 2402. Accordingly, a system for coordinating playing of media streams includes means for accessing first presentation focus information for determining whether the first media player has first presentation focus for playing the first media stream. For example, as illustrated in FIGS. 12*a-c*, focus state component 2454 is configured for accessing first presentation focus information for determining whether the first media player has first presentation focus for playing the first media stream.

The operation of various adaptations and aspects of focus state component are described above. FIG. 12*a*, FIG. 12*b*, and FIG. 12*c* illustrate some exemplary adaptations of focus state component 2354 in FIG. 11. Adaptations of focus state component 2454 in FIGS. 12*a-c* illustrate various patterns of communication among components in adaptations of the arrangement in FIG. 11.

In FIG. 12*a*, focus state component 2454*a* is operatively coupled to focus director component 2456*a*. In an aspect, focus state component 2454*a* accesses presentation focus information via interoperation with focus director component 2456*a*. Presentation access component 2452*a* may provide presentation focus information to focus state component 2454*a* in response to detecting access to display 2130 and/or other presentation devices. Presentation focus information provided by presentation access component 2452*a* identifies and/or enables identification of a media player and/or a media stream. Identification may be indirect or direct.

For example, presentation access component 2452*a* may detect an access to display 2130 to present video stream data, but may not be enabled to identify a particular application and/or media stream. Focus state component 2454*a* may interoperate with GUI subsystem 2420*a*, graphics subsystem 2422*a*, audio subsystem 2428*a*, and/or other presentation components to identify a particular media player and/or media stream.

Presentation focus information may include a correlator provided by GUI subsystem 2420*a*, graphics subsystem 2422*a*, audio subsystem 2428*a*, and/or other presentation components correlating the data intercepted by presentation access component 2452*a* with a particular media player accessing one or more presentation subsystem components.

Alternatively or additionally, media player information may be passed from GUI subsystem 2420*a*, graphics subsystem 2422*a*, audio subsystem 2428*a*, and/or other presentation components to presentation access component 2452*a*. Presentation access component 2452*a* may include and/or reference this information in presentation focus information. Based on presentation focus information received in response to detected media player accesses by presentation access component 2452*a*, focus state component 2454*a* may interoperate with focus director component 2456*a* to maintain presentation focus data identifying one or more media players with presentation focus.

In another aspect, focus state component 2454*a* may access presentation focus information from GUI subsystem 2420*a*, graphics subsystem 2422*a*, audio subsystem 2428*a*, and/or other presentation components, in response to a request from focus director component 2454*a*. Presentation focus information may include attributes such as z-order, input focus, and/or other attributes discussed above used in determining presentation focus.

In FIG. 12*b*, focus state component 2454*b* is included in browser 2404*b* and services media streaming applications, such as web application client 2406 and/or web application 2504 operating in and/or otherwise processed by browser 2404*b* and browser 2404*b* extensions. As described above with respect to FIG. 12*a*, focus state component 2454*b* may access presentation focus information from presentation access component 2452*b* in response to a detected access by a media player operating in and/or with browser 2404*b*. Alternatively, focus state component 2454*b* may provide presentation focus information upon request by focus director component 2456*b*. As described, the content of presentation focus information varies according to the various aspects that may be enabled. In FIG. 12*b*, attribute information for determining presentation focus may differ from attribute information available in the arrangements illustrated in FIG. 12*a* and in FIG. 12*c*.

In FIG. 12*c*, presentation access component 2452*c* interoperates with media player applications 2404*c* in a more direct fashion than in FIG. 12*a*. Presentation access component 2452*c* and focus state component 2454*c* may identify accessing media players without assistance from GUI subsystem 2420*c*, graphics subsystem 2422*c*, audio subsystem 2428*c*, and/or other presentation components. Focus state component 2454*c* may interoperate with GUI subsystem 2420*c*, graphics subsystem 2422*c*, audio subsystem 2428*c*, and/or other presentation components to access attribute information described above for determining presentation focus. As described with respect to FIG. 12*a* and FIG. 12*b*, focus state component 2454*c* may receive presentation focus information in response to detected media player accesses and/or may access presentation focus information as requested by focus director component 2456c. Presentation focus information may be received via asynchronous and/or synchronous communication in various aspects.

FIGS. 12a-c illustrates focus director component 2456 as an adaptation of and/or analog of focus director component 2356 in FIG. 11. One or more focus director components 2456 may operate in execution environment 2402. Accordingly, a system for coordinating playing of media streams includes means for determining, based on the first presentation focus information, that the first media player has first presentation focus. For example, as illustrated in FIGS. 12a-c, focus director component 2456 is configured for determining, based on the first presentation focus information, that the first media player has first presentation focus.

FIG. 12a, FIG. 12b, and FIG. 12c illustrate exemplary adaptations of focus director component. Determination of presentation focus has been described above and is not repeated here. In various adaptations, information available for inclusion and/or reference by presentation focus information may vary enabling different policies and capabilities. For example, focus director component 2456b in FIG. 4 may determine presentation focus in the context of browser 2404b. Focus director component 2456a and focus director component 2456c may determine presentation focus for applications operating in the broader context of execution environment 2402a and execution environment 2402c.

In an example, first app window 2704a in FIG. 15 is fully visible and at the top of the z-order with respect to second app window 2704b and third app window 2704c. In an aspect, presentation focus may be assigned to a media player with a media UI element having a media presentation space, such as first media presentation space 2708a, that is fully visible to a user. Otherwise, in the aspect, media players are determined to not have presentation focus indicating they must be paused and/or otherwise prevented from playing.

In another aspect, presentation focus for display 2130 may be determined based on a specified percentage or a particular portion of a media presentation space that is visible to a user. In FIG. 15, all of first media presentation space 2708a is visible, most of second media presentation space is visible, and second media presentation space has a definable central area that is fully visible. Third media presentation space 2708c included in third app window 2704c is hidden.

The media player having first media presentation space 2708a for playing a first video stream may be determined to have presentation focus for display 2130 given one or more visibility attributes of first app windows 2704a and/or its visual components. The media player having second media presentation space 2708b for playing a second video stream may be determined to have presentation focus for display 2130 as well given one or more visibility attributes of second app windows 2704b and/or its visual components. The media player having third media presentation space 2708c (hidden) for playing a third video stream may be determined to not have presentation focus for display 2130 given one or more visibility attributes of first app windows 2704c and/or its visual components.

In a further aspect, if third app window 2704c is moved to also be visible, in one aspect its media player may be assigned presentation focus based on, for example, a specified percentage of the window which is visible. In another aspect its media player may not have focus, when focus director 2456c is configured to limit the number of playing media streams on display 2130 to a maximum of two. The media player for third app window 2704c may be queued to wait for presentation focus. In a further aspect, a user input may be detected to raise a rank and/or priority associated with the media player for third app window 2704c to a level allowing it to have presentation focus. Presentation focus may be taken away from one of the other two media players halting play of one of their media streams. Based on the priority and/or rank assigned to the media player for third app window 2704c presentation focus may be taken from all other media players accessing display 2130.

Although it may be desirable to allow media players to share access to a presentation device as illustrated in the description of media streams in first media presentation space 2708a and second media presentation space 2708b both having presentation focus and allowed to play on display 2130, it might not be desirable in certain contexts which may depend on the type of presentation device. In an aspect, one of the audio streams associated with the two playing video streams may be prevented from playing simultaneously on user device 2602 speakers (not shown). Presentation focus for audio may be determined according to different rules than presentation focus for display 2130. For example, audio presentation focus in one aspect may be given to a media player that is most visible by a specified measure of visibility. For example, the audio stream associated with the video stream playing in first media presentation space 2708a may be determined to have presentation focus for user device 2602 speakers while other media players with audio streams to play may receive indications and/or otherwise be prevented from playing their audio streams on user device 2602 speaker(s).

Based on the descriptions provided herein, those skilled in the art will see that there are many possible variations for determining presentation focus and that these variations may be fixed and/or user configurable for various execution environments, presentation devices, browsers, and/or network application providers.

FIGS. 12a-c illustrates presentation access component 2452 as an adaptation of and/or analog of presentation access component 2352 in FIG. 11. One or more presentation access components 2452 may operate in execution environment 2402. Accordingly, a system for coordinating playing of media streams includes means for indicating, in response to determining the first media player has first presentation focus, that the first media player is allowed to play the first media stream via the first presentation device. For example, as illustrated in FIGS. 12a-c, presentation access component 2452 is configured for indicating, in response to determining the first media player has first presentation focus, that the first media player is allowed to play the first media stream via the first presentation device.

In FIG. 12a, presentation access component 2452a may indicate a media player is allowed to play a media stream by passing intercepted invocations and data to a driver for the targeted presentation devices. In FIG. 12b, presentation access component 2452b may indicate a media player is allowed to play a media stream by passing intercepted data from media content handler 2434 to media UI element handler 2432b allowing access to the targeted presentation device(s). In FIG. 12c, presentation access component 2452c may indicate a media player is allowed to play a media stream by passing intercepted data from media UI element handler 2432c to GUI subsystem 2420c, graphics subsystem 2422c, audio subsystem 2428c, and/or other presentation components allowing access to the targeted presentation device(s).

Alternatively or additionally, in FIG. 12a, FIG. 12b, and FIG. 12c, presentation access component 2452 may receive a request for permission to access a presentation device. Presentation access component 2452 may block or allow a requesting thread to run based on the determination by focus director component 2456 as described above. In another aspect, presentation access component 2452 may respond to a request for permission providing a play or a no-play identifier to the calling presentation subsystem component. The calling component may access or not access a corresponding presentation device based on the identifier.

FIG. 13 illustrates presentation access component 2552 as an adaptation of and/or analog of presentation access component 2352 in FIG. 11. One or more presentation access components 2552 may operate in execution environment 2502. Accordingly, a system for coordinating playing of media streams includes means for detecting a first media player access to a first presentation device to play a first media stream. For example, as illustrated in FIG. 13, presentation access component 2552 is configured for detecting a first media player access to a first presentation device to play a first media stream.

FIG. 13, illustrates presentation access component 2552 included in web application 2504. Web application 2504 may provide and/or identify a media stream to be played in a remote application client 2406, illustrated in FIG. 12b. In one aspect, presentation access component 2552 may be a request handler included in model subsystem 2514. When a web application client that includes and/or references a media stream for playing on a client, such as user node 2602, is detected, a media player access to a presentation device of user node 2602 is detected.

In another aspect, presentation access component 2552 may be configured to process a message from user node 2602 informing web application of a detected access to a presentation device for playing a media stream.

Presentation access component 2552 may detect media player accesses for media streams provided by and/or otherwise identified by web application 2504. Presentation access component 2552 may detect media player accesses for media streams provided by and/or otherwise identified by network applications interoperating with network application platform 2506 and/or otherwise operating in execution environment 2502.

Presentation access component 2552 may be configured to operate in and/or with network application platform 2506, in an aspect. In yet another aspect, presentation access component 2552 may receive access information for detecting media player accesses to one or more presentation devices of a remote client, such as user device 2602, to detect media player accesses for applications 2404 operating in user device 2602 other than and/or in addition to browser 2404b.

In an aspect, at least part of a media player UI element handler 2432b may be included in web application client 2406 provided by web application 2504 in FIG. 13, and/or at least part of a media player UI element handler 2532 may be included in web application 2506. Presentation access component 2552 may mediate access between media streamer component 2534 and a media player UI element, such as media player UI element 2532. Media streamer component 2534 may access one or more media streams from media database 2536 and/or may access media streams via network 2604 stored on another node (not shown).

Second app window 2704b in FIG. 15 illustrates a user interface presented by display 2130 as directed by web application 2504 via web application client 2406 in FIG. 12b. Presentation access component 2552 may be included in presenting a media stream and/or otherwise intercept one or more communications between media streamer 2534 and media UI element handler 2532 detecting access to a presentation device for playing a media stream by a media player, such as remote client application 2406. In an aspect, media player UI element handler 2532 generates and/or otherwise accesses some or all of web application client 2406 to provide to browser 2404b. A request for web application client 2406 may be received. Media player UI element handler 2532 may be invoked to generate some or all of the response data. Accesses to media player UI element handler 2532 may be mediated via presentation access component 2552 to play a video stream in second media presentation space 2708b in FIG. 15 on display 2130 of user device 2602.

FIG. 13 illustrates focus state component 2554 as an adaptation of and/or analog of focus state component 2354 in FIG. 11. One or more focus state components 2554 may operate in execution environment 2502. Accordingly, a system for coordinating playing of media streams includes means for accessing first presentation focus information for determining whether the first media player has first presentation focus for playing the first media stream. For example, as illustrated in FIG. 13, focus state component 2554 is configured for accessing first presentation focus information for determining whether the first media player has first presentation focus for playing the first media stream.

In FIG. 13 focus state component 2554 is operatively coupled to focus director component 2556. In an aspect, focus state component 2554 accesses presentation focus information via interoperation with presentation access component 2552. Presentation access component 2552 may provide presentation focus information to focus state component 2554 in response to detecting access to display media UI element handler 2532. Presentation focus information provided by presentation access component 2552 identifies a media player instance and/or a media stream.

Focus state component 2554 may interoperate with focus director component 2556 to maintain presentation focus data identifying one or more media players with presentation focus.

In another aspect, focus state component 2554 may access presentation focus information from session information maintained for a remote client, such as web application client 2406, in response to a request from focus director component 2554. Presentation focus information may include attributes obtained via web application client 2406, such as second app window's 2704b z-order, input focus, and/or other attributes discussed above with respect to determining presentation focus.

FIG. 13 illustrates focus director component 2556 as an adaptation of and/or analog of focus director component 2356 in FIG. 11. One or more focus director components 2556 may operate in execution environment 2502. Accordingly, a system for coordinating playing of media streams includes means for determining, based on the first presentation focus information, that the first media player has first presentation focus. For example, as illustrated in FIG. 13, focus director component 2556 is configured for determining, based on the first presentation focus information, that the first media player has first presentation focus.

FIG. 13 illustrates an exemplary adaptation of focus director component. Determination of presentation focus has been described above and is not repeated here. In various adaptations, information available for inclusion and/or reference by presentation focus information may vary enabling different policies and capabilities. For example, focus director component 2556 in FIG. 13 may determine presentation focus in the context of a number of active windows in browser 2404b in FIG. 12b provided by web application 2504.

FIG. 13 illustrates presentation access component 2552 as an adaptation of and/or analog of presentation access component 2352 in FIG. 11. One or more presentation access components 2552 may operate in execution environment 2502. Accordingly, a system for coordinating playing of media streams includes means for indicating, in response to determining the first media player has first presentation focus, that the first media player is allowed to play the first media stream via the first presentation device. For example, as illustrated in FIG. 13, presentation access component 2552 is configured for indicating, in response to determining the first media player has first presentation focus, that the first media player is allowed to play the first media stream via the first presentation device.

In FIG. 13, presentation access component 2552 may indicate a media player is allowed to play a media stream by passing intercepted invocations and data to media player UI element handler 2532 for a presenting on a presentation device of a client node, such as use node 2602. In FIG. 13, presentation access component 2552 may indicate a media player is allowed to play a media stream by passing intercepted data from media streamer 2534 to media UI element handler 2532.

Alternatively or additionally, in FIG. 13, presentation access component 2552 may receive a request for permission to access media player UI element handler 2532, media streamer 2534, and/or another component included in playing a media stream. Presentation access component 2552 may block or allow a requesting thread to run based on the determination by focus director component 2556 as described above. In another aspect, presentation access component 2552 may respond to a request for permission providing a play or a no-play return value and/or parameter value to the calling component. The calling component may access or not access a corresponding presentation device based on the return value and/or parameter value.

Figure 16:
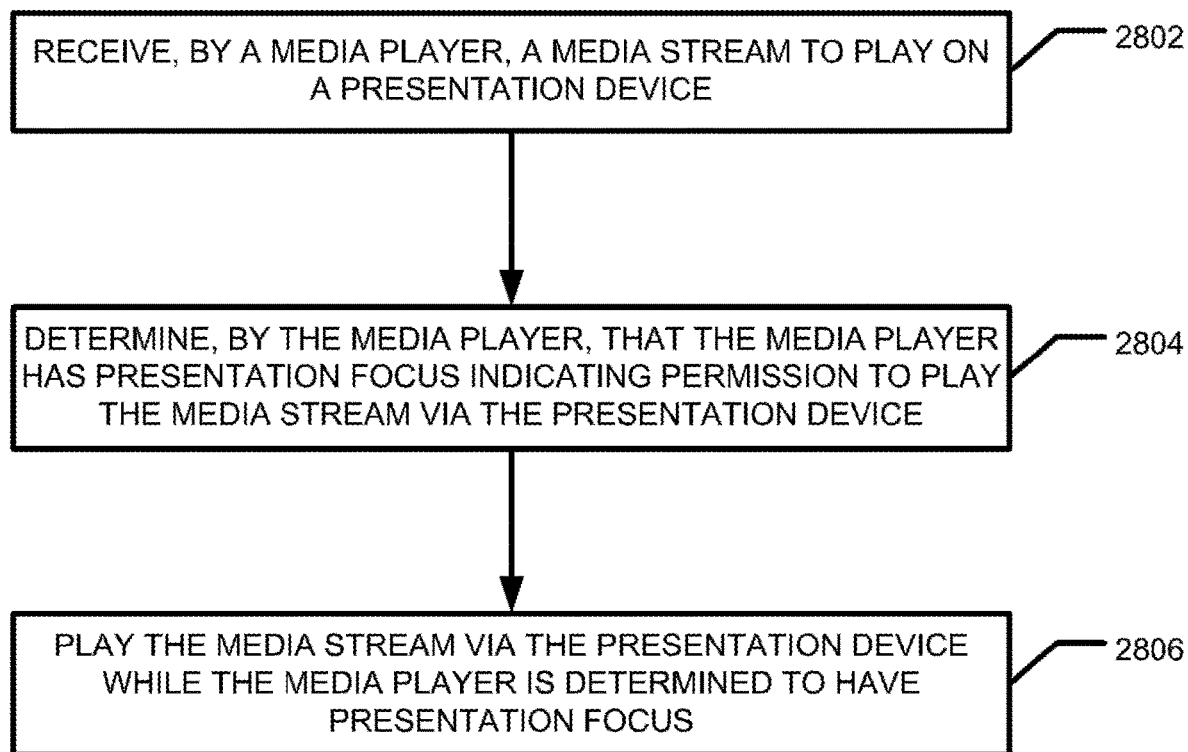
FIG. 16 is a flow diagram illustrating another method for coordinating playing of media streams according to an aspect of the subject matter described herein.

FIG. 16 is a flow diagram illustrating a method for coordinating playing of media streams according to an exemplary aspect of the subject matter described herein. FIG. 11 is a block diagram illustrating an arrangement of components for coordinating playing of media streams according to another exemplary aspect of the subject matter described herein. The method depicted in FIG. 16 may be carried out by some or all of the exemplary arrangements and their analogs.

A system for coordinating playing of media streams includes an execution environment, such as execution environment 2102, including an instruction processing unit, such as processor 2104, configured to process an instruction included in at least one of a presentation access component and a focus director component. The components illustrated in FIG. 11 may be adapted for performing the method illustrated in FIG. 16 in a number of execution environments.

With reference to FIG. 16, block 2802 illustrates the method includes receiving, by a media player, a media stream to play on a presentation device. Accordingly, a system for coordinating playing of media streams includes means for receiving, by a media player, a media stream to play on a presentation device. For example, as illustrated in FIG. 11, presentation access component 2352 is configured for receiving, by a media player, a media stream to play on a presentation device.

Returning to FIG. 16, block 2804 illustrates the method further includes determining, by the media player, that the media player has presentation focus indicating permission to play the media stream via the presentation device. Accordingly, a system for coordinating playing of media streams includes means for determining, by the media player, that the media player has presentation focus indicating permission to play the media stream via the presentation device. For example, as illustrated in FIG. 11, focus director component 2354 is configured for determining, by the media player, that the media player has presentation focus indicating permission to play the media stream via the presentation device.

Returning to FIG. 16, block 2806 illustrates the method yet further includes playing the media stream via the presentation device while the media player is determined to have presentation focus. Accordingly, a system for coordinating playing of media streams includes means for playing the media stream via the presentation device while the media player is determined to have presentation focus. For example, as illustrated in FIG. 11, presentation access component 2356 is configured for playing the media stream via the presentation device while the media player is determined to have presentation focus.

The arrangement of components in FIG. 11 and various adaptations of the arrangement for performing the method illustrated in FIG. 8 are described above with respect to execution environments illustrated in FIG. 9, FIGS. 12a-c, and FIG. 13.

It is noted that the methods described herein, in an aspect, are embodied in executable instructions stored in a non-transitory computer readable storage medium for use by or in connection with an instruction execution machine, apparatus, or device, such as a computer-based or processor-containing machine, apparatus, or device. It will be appreciated by those skilled in the art that for some embodiments, other types of non-transitory computer readable storage media are included which may store data that is accessible by a computer, such as magnetic cassettes, flash memory cards, digital video disks, Bernoulli cartridges, random access memory (RAM), read-only memory (ROM), and the like.

As used here, a "non-transitory computer readable storage medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include in one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components is implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

I claim:

1. A computer program product comprising computer executable instructions stored on a non-transitory computer readable medium of a presentation device that when executed by one or more processors in communication with non-transitory memory and a touchscreen, cause the one or more processors to:
   present, utilizing the touchscreen, a first media player application window associated with a first media player application of a plurality of applications including the first media player application, a second media player application, and a third application;
   detect, utilizing the touchscreen, a hot key user input;
   in response to the detection of the hot key user input, present, utilizing the touchscreen, a control user interface adjacent and exterior to the first media player application window associated with the first media player application, the control user interface including selectable representations identifying a subset of the plurality of applications that are executed, the selectable representations including: a second media player application window representation associated with the second media player application and having a first z-order attribute, and a third application window representation associated with the third application and having a second z-order attribute;
   detect, utilizing the touchscreen, a selection of one of the selectable representations of the control user interface including the second media player application window representation associated with the second media player application;
   in response to the detection of the selection of the one of the selectable representations of the control user interface, indicate that the second media player application is allowed to play one or more media streams in addition to the first media player application being allowed to play one or more other media streams, where the first media player application window associated with the first media player application is simultaneously presented, utilizing the touchscreen, with a second media player application window associated with the second media player application, such that the first media player application window is presented with at least one first input control and the second media player application window is presented with at least one second input control, the at least one first input control and the second input control each including at least one of a play input control or a pause input control;

detect, utilizing the touchscreen, a selection of the at least one first input control presented with the first media player application window;

in response to the detection of the selection of the at least one first input control presented with the first media player application window, present, utilizing the touchscreen, a first media stream in the first media player application window;

detect, utilizing the touchscreen and while the first media stream is being presented in the first media player application window, a selection of the at least one second input control presented with the second media player application window; and in response to the detection of the selection of the at least one second input control presented with the second media player application window while the first media stream is being presented in the first media player application window, pause the presentation of the first media stream in the first media player application window, and present, utilizing the touchscreen, a second media stream in the second media player application window.

2. The computer program product of claim 1, wherein the one or more processors execute the instructions to:
detect, utilizing the touchscreen, user input in connection with at least one of the selectable representations of the control user interface; and
in response to the detection of the user input, re-size, utilizing the touchscreen, the at least one of the selectable representation of the control user interface.

3. The computer program product of claim 1, wherein the one or more processors execute the instructions to:
detect, utilizing the touchscreen, user input in connection with at least one of the selectable representations of the control user interface; and
in response to the detection of the user input, change, utilizing the touchscreen, a z-order attribute of the at least one selectable representation of the control user interface.

4. The computer program product of claim 1, wherein the one or more processors execute the instructions to:
detect a new application;
refrain from identifying the new application with a corresponding selectable representation in the control user interface;
detect a user input in connection with the new application; and
in response to the detection of the user input in connection with the new application and the new application being executed, present the corresponding selectable representation in the control user interface.

5. The computer program product of claim 1, wherein the presentation device is configured such that the second media player application includes a browser application, and one of the selectable representations of the control user interface associated with the second media player application has associated therewith a plurality of media players.

6. The computer program product of claim 1, wherein the indication is such that the second media player application is allowed to play one or more media streams, at a first given time, in addition to the first media player application being allowed to play one or more other media streams, at a second given time, where the one or more media streams allowed to play utilizing the first media player application is different than the one or more media streams allowed to play utilizing the second media player application, and the subset of the plurality of applications that are executed are operating.

7. The computer program product of claim 1, wherein the presentation device is configured such that the selectable representations scroll at least in part.

8. The computer program product of claim 1, wherein the presentation device is configured such that the selectable representations spin at least in part, and scroll at least in part.

9. The computer program product of claim 1, wherein the one or more processors execute the instructions to automatically play at least one media stream.

10. The computer program product of claim 1, wherein the presentation device is configured such that at least one of the selectable representations identifies a corresponding application in addition to at least one media stream that is capable of being presented via the corresponding application.

11. The computer program product of claim 1, wherein the one or more processors execute the instructions to:
detect user input in connection with the first media player application window associated with the first media player application, which includes a browser application; and
in response to the detection of the user input in connection with the first media player application window, select the third application which is a video player application and change a visibility thereof.

12. The computer program product of claim 11, wherein the presentation device is configured such that the third application is unselected, prior to the detection of the user input.

13. The computer program product of claim 1, wherein the one or more processors execute the instructions to:
determine that at least one of the subset of the plurality of applications is no longer executed; and
in response to the determination, remove at least one of the selectable representations from the control user interface that corresponds with the at least one of the subset of the plurality of applications determined to be no longer executed.

14. The computer program product of claim 13, wherein the presentation device is configured such that the at least one of the subset of the plurality of applications is no longer executed, in response to a detection of a user closing a visual element associated with the at least one of the subset of the plurality of applications.

15. The computer program product of claim 1, wherein the presentation device is configured such that the simultaneous presentation is performed in response to the detection of the selection of the one of the selectable representations of the control user interface.

16. The computer program product of claim 1, wherein, in another scenario, the one or more processors execute the instructions to:

detect, while the first media stream is being presented in the first media player application window, the selection of the at least one second input control presented with the second media player application window; and in response to the detection of the selection of the at least one second input control presented with the second media player application window while the first media stream is being presented in the first media player application window, the presentation of the first media stream in the first media player application window continues during a presentation of the second media stream via a separate presentation device.

17. The computer program product of claim 16, wherein, in yet another scenario, the one or more processors execute the instructions to:

in response to the detection of the selection of the at least one second input control presented with the second media player application window while the first media stream is being presented in the first media player application window, cause a pause of the presentation of the first media stream in the first media player application window and via the separate presentation device, and cause a presentation of the second media stream in the second media player application window and via the separate presentation device.

18. The computer program product of claim 17, wherein, in each scenario:

the presentation device is configured such that no more than a single media stream is presented via the presentation device at a time, and no more than a single media stream is presented via the separate presentation device at a time;

the presentation device is configured such that the first media player and the second media player remain simultaneously presented; and the presentation device is configured to limit a number of media players on the touchscreen to a maximum of two media players.

19. The computer program product of claim 18, wherein, in each scenario, the presentation device is configured such that, while the first media player application window and the second media player application window are simultaneously presented, the first media player application is prevented from being utilized to present any media stream if a visibility of the first media player application window exists but is less than a predetermined amount.

20. The computer program product of claim 1, wherein the presentation device is configured such that at least one unselected executed application is capable of being selected from a different selected executed application, for initiation of play of one or more media streams via the at least one unselected executed application in response to a detection of a user action in connection with the different selected executed application.

* * * * *